United States Patent [19]

Itoh et al.

[11] Patent Number: 5,052,980

[45] Date of Patent: Oct. 1, 1991

[54] HYDRAULIC CONTROL APPARATUS FOR VEHICLE POWER TRANSMITTING SYSTEM HAVING CONTINUOUSLY VARIABLE TRANSMISSION

[75] Inventors: Hiroshi Itoh, Toyota; Masami Sugaya; Yoshinobu Soga, both of Susono; Kunio Morisawa, Toyota; Ryoji Habuchi, Aichi; Katsumi Kouno, Toyota; Yuji Hattori; Takashi Hayashi, both of Susono, all of Japan

[73] Assignee: Toyota Jidosha Kabushiki Kaisha, Toyota, Japan

[21] Appl. No.: 476,527

[22] Filed: Feb. 7, 1990

[30] Foreign Application Priority Data

| Feb. 13, 1989 | [JP] | Japan | 1-33141 |
|---|---|---|---|
| Feb. 13, 1989 | [JP] | Japan | 1-33143 |
| Feb. 13, 1989 | [JP] | Japan | 1-33144 |
| Feb. 13, 1989 | [JP] | Japan | 1-33145 |
| Apr. 7, 1989 | [JP] | Japan | 1-89153 |
| Dec. 21, 1989 | [JP] | Japan | 1-331840 |

[51] Int. Cl.⁵ ............................................. F16H 11/02
[52] U.S. Cl. .................................... 474/11; 474/28
[58] Field of Search .............. 474/8, 11, 12, 17, 18, 474/28, 69, 70; 74/865–868

[56] References Cited

U.S. PATENT DOCUMENTS

| 4,152,947 | 5/1979 | van Deursen et al. | 474/28 X |
| 4,403,975 | 9/1983 | Rattunde | 474/18 |
| 4,522,086 | 6/1985 | Haley | 74/867 |
| 4,669,336 | 6/1987 | Okada et al. | 74/867 |
| 4,718,306 | 1/1988 | Shigematsu et al. | 74/866 |
| 4,857,034 | 8/1989 | Kouno et al. | 474/28 |
| 4,867,632 | 9/1989 | Soga et al. | 474/28 |

FOREIGN PATENT DOCUMENTS

| 52-98861 | 8/1977 | Japan. |
| 58-94664 | 6/1983 | Japan. |
| 60-53258 | 3/1985 | Japan. |
| 60-104846 | 6/1985 | Japan. |
| 61-2958 | 1/1986 | Japan. |
| 62-106164 | 5/1987 | Japan. |
| 62-196445 | 8/1987 | Japan. |
| 63-30641 | 2/1988 | Japan. |
| 63-57952 | 3/1988 | Japan. |

Primary Examiner—Thuy M. Bui
Attorney, Agent, or Firm—Oblon, Spivak, McClelland, Maier & Neustadt

[57] ABSTRACT

A hydraulic control apparatus for a power transmitting system for an automotive vehicle having a continuously variable transmission which has a first and a second shaft, a pair of variable-diameter pulleys provided on the first and second shafts, a belt connecting the pulleys, and a pair of hydraulic actuators for changing diameters of the pulleys, wherein a tension of the belt is controlled by regulating an actuating pressure in a driven side actuator of the hydraulic actuators which is provided on a driven one of the two shafts. The apparatus includes a pressure regulating valve which has a valve spool for regulating the actuating pressure in the driven side actuator, and a pressure-reducing chamber for receiving a pressure-reducing pilot pressure for biasing the spool for reducing the actuating pressure. The apparatus further includes a pilot pressure generator for generating the pressure-reducing pilot pressure to be applied to the pressure-reducing chamber, when the detected vehicle running speed exceeds a predetermined value.

9 Claims, 38 Drawing Sheets

FIG.10

| CVT SHIFT MODE | | 1ST SOLENOID VALVE 266 | 2ND SOLENOID VALVE 268 |
|---|---|---|---|
| I | RAPID SHIFT DOWN | ON | OFF |
| II | MEDIUM SHIFT DOWN | ON | DUTY CYCLING |
| III | SLOW SHIFT DOWN | ON | ON |
| IV | SLOW SHIFT UP | OFF | OFF |
| V | MEDIUM SHIFT UP | OFF | DUTY CYCLING |
| VI | RAPID SHIFT UP | OFF | ON |

FIG.23

| | HYDRAULIC CONTROL MODE | 3RD SOLENOID VALVE 330 | 4TH SOLENOID VALVE 346 | LOCK-UP CLUTCH 36 (EXCEPT WHERE SHIFT LEVER IS IN POSITION "R") | REVERSE INHIBIT (WHERE SHIFT LEVER IS IN POSITION "R") | 2ND LINE PRESSURE REDUCING CONTROL |
|---|---|---|---|---|---|---|
| A | LOCK-UP CLUTCH RELEASE | OFF | OFF | OFF | OFF | OFF |
| B | LOCK-UP CLUTCH RAPID RELEASE | OFF | ON | OFF | OFF | OFF |
| C | ACCUMULATOR BACK PRESSURE CONTROL | OFF | DUTY CYCLING | OFF | OFF | OFF |
| D | REVERSE INHIBIT | ON | OFF | ON | ON | OFF |
| E | 2ND LINE PRESSURE REDUCTION | ON | ON | ON | ON | ON |

FIG. 35

| | 1 | 2 | 3 | 4 |
|---|---|---|---|---|
| 3RD SOLENOID VALVE 330 | OFF | OFF | ON | ON |
| 4TH SOLENOID VALVE 346 | OFF | ON | OFF | ON |
| CHAMBER 136 OF 2ND PRESSURE REGULATING VALVE 102 | ATMOSPHERIC PRESSURE | ATMOSPHERIC PRESSURE | ATMOSPHERIC PRESSURE | Pe |
| CHAMBER 130 OF 2ND PRESSURE REGULATING VALVE 102 | ATMOSPHERIC PRESSURE | ATMOSPHERIC PRESSURE | Pe | Pe |

FIG.39

| | 3RD SOLENOID VALVE 330 | 4TH SOLENOID VALVE 346 |
|---|---|---|
| Pℓ2 INCREASED | OFF | ― (ON OR OFF) |
| NORMAL PRESSURE | ON | OFF |
| Pℓ2 LOWERED | ON | ON |

FIG. 41

|  | 1 | 2 | 3 | 4 |
|---|---|---|---|---|
| 3RD SOLENOID VALVE 330 | OFF | OFF | ON | ON |
| 4TH SOLENOID VALVE 346 | OFF | ON | OFF | ON |
| CHAMBER 130 OF 2ND PRESSURE REGULATING VALVE 102 | ATMOSPHERIC PRESSURE | ATMOSPHERIC PRESSURE | $P_e$ | ATMOSPHERIC PRESSURE |
| CHAMBER 512 OF 2ND PRESSURE REGULATING VALVE 102 | PRESSURE $\fallingdotseq$ 0 | PRESSURE $\fallingdotseq$ 0 | ATMOSPHERIC PRESSURE | $P_{sol}\,3$ |

FIG.46

| θ / Nin | 0% | 10% | 20% | 40% | 60% | 80% | 100% |
|---|---|---|---|---|---|---|---|
| 0 rpm | 100 | 70 | 105 | 110 | 100 | 100 | 100 |
| 2000rpm | 100 | 70 | 105 | 110 | 100 | 100 | 100 |
| 4000rpm | 40 | 20 | 90 | 120 | 135 | 135 | 135 |
| 6000rpm | 100 | 100 | 40 | 110 | 135 | 135 | 135 |

(km/h)

ISO-ΔP DIAGRAM (AT GIVEN THROTTLE ANGLE θth)

HYDRAULIC CONTROL APPARATUS FOR VEHICLE POWER TRANSMITTING SYSTEM HAVING CONTINUOUSLY VARIABLE TRANSMISSION

BACKGROUND OF THE INVENTION

1. Field of the Invention

The present invention relates to a hydraulic control apparatus for a hydraulically operated power transmitting system for automotive vehicles having a continuously variable transmission.

2. Discussion of the Prior Art

A continuously variable transmission incorporated in a power transmitting system for motor vehicles is known, for example, according to U.S. Pat. No. 4,857,034 (laid-open Publication No. 52-98861 of unexamined Japanese Patent Application). The continuously variable transmission disclosed therein includes a first and a second shaft, a pair of variable-diameter pulleys provided on the first and second shafts, a belt connecting the pulleys, and a pair of hydraulic actuators for changing diameters of the pair of pulleys.

Such a continuously variable transmission is controlled by a hydraulic control apparatus having a pressure regulating valve which is adapted to regulate the actuating pressure in the driven side actuator, i.e., the pressure in one of the two actuators which is provided on the driven one of the first and second shafts, so that the tension of the belt is adjusted to a permissible minimum value, depending upon the current amount of torque transmitted through the continuously variable transmission, and/or the current speed ratio of the transmission. In the conventional hydraulic control apparatus, the actuating pressure in the driven side actuator inevitably rises due to a centrifugal force when the driven side pulley rotates at a high speed, that is, when the vehicle is running at a relatively high speed. This centrifugal pressure rise in the driven side actuator results in unnecessarily increasing the tension of the transmission belt, thereby deteriorating the durability of the belt.

In view of the above problem, a hydraulic control apparatus is proposed in laid-open Publication No. 60-53258 of unexamined Japanese Patent Application. In this control apparatus, the rotating speed of the driven shaft of the continuously variable transmission is detected, and the centrifugal pressure rise in the driven side actuator due to the centrifugal force is calculated based on the detected speed of the driven shaft. The calculated centrifugal pressure rise is subtracted from a desired or optimum value of the line pressure to be applied to the driven side actuator, so that the nominal optimum line pressure is compensated for the centrifugal pressure rise. The actual line pressure to be applied to the driven side actuator is continuously regulated by a pressure regulating servo valve equipped with a linear solenoid, such that the line pressure coincides with the compensated optimum value.

However, the proposed hydraulic control apparatus is disadvantageous in terms of the cost of manufacture due to the use of the relatively expensive pressure regulating valve equipped with the linear solenoid.

In a continuously variable transmission as disclosed in laid-open Publication No. 62-196445 of unexamined Japanese Patent Application, a first line pressure and a second line pressure lower than the first line pressure are applied to one and the other of the pair of hydraulic actuators, respectively, so that the speed ratio of the transmission is controlled. At the same time, the tension of the belt is adjusted to the required minimum value, by regulating the second line pressure based on a suitable parameter such as the detected speed ratio or throttle opening angle. To this end, a hydraulically pilot-operated second pressure regulating valve is used for regulating the second line pressure, in addition to a first pressure regulating valve for regulating the first line pressure. At a given value of the throttle opening angle, the second line pressure as regulated by such second pressure regulating valve is continuously lowered as the actual speed ratio of the transmission increases. However, the ideal or desired curve of the second line pressure is such that the pressure decreases to a certain level with an increase in the speed ratio, but the rate of decrease in the desired or ideal second line pressure is considerably low after the pressure is lowered below that certain level. If the second pressure regulating valve is designed for obtaining the desired second line pressure when the speed ratio is relatively high, the actually regulated second line pressure tends to be unnecessarily high, causing an excessive increase of the tension of the transmission belt. This is undesirable for the durability of the belt. If the second pressure regulating valve is designed for obtaining the desired second line pressure when the speed ratio is relatively low, the regulated second line pressure tends to be lower than required to enable the transmission to operate without slipping of the belt o the pulleys.

In the continuously variable transmission disclosed in the above-identified laid-open Publication No. 62-196445, the rates of supply and discharge flows of the fluid into and out of the one and other of the two hydraulic actuators are determined by a difference between the first and second line pressures, so that the shifting response of the transmission is not affected by the speed ratio. If the first line pressure is unnecessarily high, extra power is unnecessarily consumed for driving an oil pump used as the hydraulic source of the system, resulting in a power loss of the vehicle engine. If the first line pressure is insufficient, the transmission cannot be shifted at a sufficiently high speed, or the rate of change in the speed ratio of the transmission cannot be sufficiently high. For this reason, it is desirable that the first line pressure be adjusted to a required minimum level. On the other hand, it is required that the first line pressure be set higher than the required minimum level by a suitable amount so as to accommodate a potential difference in the actual thrusts of the hydraulic actuators from one transmission to another, or accommodate a possible variation in the thrusts and operating characteristics of the actuators due to chronological change during use. In this respect, the conventional hydraulic control apparatus still suffers from power loss of the engine due to unnecessarily large power to drive the hydraulic source of the power transmitting system.

In view of the above, the assignee of the present application proposed a hydraulic control apparatus as disclosed in laid-open Publication No. 63-57952, wherein the first line pressure is regulated to be higher by a suitable amount than a higher one of the pressures within the two hydraulic actuators. This apparatus permits better regulation of the first line pressure with reduced engine power loss, irrespective of the difference in the thrusts of the hydraulic actuators of the individual transmissions (used on individual vehicles) and the chronological variation in the thrusts.

When the vehicle is stopped, however, the fluid in the hydraulic actuator on the side of the engine (first actuator) is sometimes discharged to the drain line of the system, to rapidly reduce the speed ratio of the continuously variable transmission to the lower limit. In this case, the first line pressure cannot be rapidly raised to the normal operating level when the engine is re-started while the first and second actuators are drained. This tendency causes inadequate regulation of the speed ratio of the transmission upon starting of the vehicle, and reduced drivability and driving comfort of the vehicle.

SUMMARY OF THE INVENTION

It is therefore a first object of the present invention to provide a comparatively inexpensive, highly reliable hydraulic control apparatus for vehicle power transmitting system having a continuously variable transmission, which is capable of preventing an excessive tension of a belt of the continuously variable transmission which would arise from a pressure rise in a driven side hydraulic actuator due to a centrifugal force during high speed rotation of the corresponding pulley.

A second object of the invention is to provide a hydraulic control apparatus for a vehicle continuously variable transmission, which has a hydraulically operated pressure regulating valve capable of regulating the second line pressure along the desired curve, for maintaining an optimum tension of the transmission belt.

A third object of the invention is to provide a hydraulic control apparatus for a vehicle continuously variable transmission, which permits the first line pressure to be rapidly raised to the normal operating level.

The first object may be achieved according to one aspect of the present invention, which provides a hydraulic control apparatus for a power transmitting system for an automotive vehicle having a continuously variable transmission which has a first and a second shaft, a pair of variable-diameter pulleys provided on the first and second shafts, a belt connecting the pulleys, and a pair of hydraulic actuators for changing diameters of the pair of pulleys, wherein a tension of the belt is controlled by directly or indirectly regulating an actuating pressure in a driven side actuator of said pair of hydraulic actuators which is provided on a driven one of said first and second shafts, and wherein the improvement comprises: (a) a pressure regulating valve including a valve spool for regulating the actuating pressure in the driven side actuator, the pressure regulating valve having a pressure-reducing chamber for receiving a pressure-reducing pilot pressure for biasing the spool in one direction for reducing the actuating pressure; (b) detecting means for detecting a running speed of the vehicle; and (c) pilot pressure generating means for generating the pressure-reducing pilot pressure to be applied to the pressure-reducing chamber, when the running speed of the vehicle exceeds a predetermined value.

In the hydraulic control apparatus constructed as described above, when the vehicle speed exceeds the predetermined value, the pressure-reducing pilot pressure is generated and applied to the pressure-reducing chamber of the pressure regulating valve, whereby the pressure regulating valve operates to lower the actuating pressure in the driven side actuator. Thus, the present control apparatus is free from the conventionally experienced excessive increase in the tension of the transmission belt which would arise from a pressure rise in the driven side actuator due to the centrifugal force during rotation of the driven side pulley while the vehicle is running at a high speed. Since a conventionally used expensive pressure regulating valve equipped with a linear solenoid is not used for regulating the pressure for the actuators, the present hydraulic control apparatus is comparatively inexpensive. The driven side actuator is the actuator provided on a driven one of the first and second shafts of the continuously variable transmission to which torque is transmitted. When the vehicle is running with a positive drive torque transmitted from an engine to drive wheels, the driven side actuator is the actuator provided on the shaft which is nearer to the drive wheels than to the engine. When the vehicle is running in an engine-braking manner with a negative torque transmitted from the drive wheels to the engine, the driven side actuator is the actuator provided on the shaft which is nearer to the engine than to the drive wheels.

The first object indicated above may also be achieved according to another aspect of the present invention, which provides a hydraulic control apparatus for a power transmitting system for an automotive vehicle having a continuously variable transmission which has a first and a second shaft, a pair of variable-diameter pulleys provided on the first and second shafts, a belt connecting the pulleys, and a pair of hydraulic actuators for changing the diameters of the pair of pulleys, wherein a tension of the belt is controlled by directly or indirectly regulating an actuating pressure in a driven side actuator of said pair of hydraulic actuators which is provided on a driven one of said first and second shafts, and wherein the improvement comprises: (a) a pressure regulating valve including a valve spool for regulating the actuating pressure in the driven side actuator, and having a pressure-reducing chamber for receiving a pressure-reducing pilot pressure for biasing the spool in one direction for reducing the actuating pressure, and a pressure-increasing chamber for receiving a pressure-increasing pilot pressure for biasing the spool in a direction opposite to the above-indicated one direction, for increasing the actuating pressure in the driven side actuator; (b) detecting means for detecting a running speed of the vehicle; and (c) pilot pressure generating means for generating the pressure-reducing pilot pressure and applying the pressure-reducing pilot pressure to the pressure-reducing chamber when the running speed of the vehicle exceeds an upper limit of a predetermined speed range, and generating the pressure-increasing pilot pressure and applying the pressure-increasing pilot pressure to the pressure-increasing chamber when the running speed falls below a lower limit of the predetermined speed range.

In the hydraulic control apparatus constructed as described above, the actuating pressure in the driven side actuator is lowered by the pressure regulating valve with the pressure-reducing pilot pressure applied to the pressure-reducing chamber, when the vehicle running speed exceeds the upper limit of the suitably determined speed range. Therefore, the excessive tension of the belt may be avoided, and the present apparatus has the same advantages as described above with respect to the first aspect of the invention. Further, the present apparatus provides an additional advantage, when the vehicle speed falls below a predetermined lower limit. Namely, when the speed of the vehicle falls below the lower limit of the predetermined speed range, the pressure-increasing pilot pressure is generated and applied to the pressure-increasing chamber of the pressure regulating valve, whereby the actuating pressure in the driven side actuator is increased by the pressure regulating valve. This arrangement is advantageous when an abrupt or rapid stop of the vehicle is desired. Usually, a lock-up clutch disposed between the engine and the continuously variable transmission is released when the vehicle running speed is lowered below a certain level, i.e., before the vehicle is stopped. According to the present arrangement, the continuously variable transmission may be smoothly shifted toward the lowest speed-ratio position since the actuating pressure in the driven side actuator is increased when the vehicle speed is lowered down to a level at which the lock-up clutch is released. Thus, the transmission may be smoothly shifted down, and the vehicle may be brought to a stop in a relatively short time.

The first object may also be achieved according to a further aspect of the present invention, which provides a hydraulic control apparatus for a power transmitting system for an automotive vehicle having a continuously variable transmission which has a first and a second shaft, a pair of variable-diameter pulleys provided on the first and second shafts, a belt connecting the pulleys, and a pair of hydraulic actuators for changing the diameters of the pair of pulleys, wherein a tension of the belt is controlled by directly or indirectly regulating an actuating pressure in a driven side actuator of the pair of hydraulic actuators which is provided on a driven one of the first and second shafts, and wherein the improvement comprises: (a) a pressure regulating valve including a valve spool for regulating the actuating pressure in the driven side actuator, and having a pressure-reducing chamber for receiving a pressure-reducing pilot pressure for biasing the spool in one direction for reducing the actuating pressure, and a pressure-increasing chamber for receiving a pressure-increasing pilot pressure for biasing the spool in a direction opposite to the one direction, for increasing the actuating pressure; (b) detecting means for detecting a running speed of the vehicle; (c) detecting means for detecting a currently required output of an engine of the vehicle; (d) detecting means for detecting a speed of the engine; (e) judging means for determining, based on the detected currently required output and speed of the engine and the detected running speed of the vehicle, whether or not a running condition of the vehicle satisfies a predetermined condition in which the actuating pressure in the driven side actuator should be lowered; and (f) pilot pressure generating means generating the pressure-reducing pilot pressure and applying the pressure-reducing pilot pressure to the pressure-reducing chamber, when the judging means determines that the running condition of the vehicle satisfies the predetermined condition.

In the hydraulic control apparatus constructed as described just above, the actuating pressure in the driven side actuator is lowered by the pressure regulating valve with the pressure-reducing pilot pressure applied to the pressure-reducing chamber, when the judging means determines that the running condition of the vehicle satisfied the predetermined condition. Thus, the same advantages as described above with respect the reduction of the actuating pressure are provided.

Further, the determination as to whether the actuating pressure should be reduced is effected based not only on the vehicle running speed, but also on the currently required output and running speed of the engine. In other words, the condition for reducing the actuating pressure is determined based on the engine output and speed as well as the vehicle speed. This arrangement permits better regulation of the actuating pressure in the driven side actuator for optimum adjustment of the tension of the transmission belt, than the arrangement in which the reduction of the actuating pressure is effected based on whether the vehicle speed exceeds a predetermined constant reference value. In this respect, it is noted that the actual output of the engine depends not only on the opening angle of a throttle valve, for example, but also on the rotating speed of the engine. If the nominal actuating pressure is determined based on the throttle opening angle and the speed ratio of the continuously variable transmission and is reduced when the vehicle speed exceeds a fixed constant value, the actuating pressure cannot be suitably regulated for each value of the transmission torque, i.e., torque transmitted by the continuously variable transmission. In this case, the reduced actuating pressure in the driven side actuator is generally higher than the optimum level. According to the present aspect of the invention, the currently required output and speed of the engine are used as additional control parameters, in addition to the vehicle running speed, which is used as a single control parameter in the control apparatus according to the first aspect of the invention. Thus, the control apparatus according to this third aspect of the invention is advantageous for better adjustment of the belt tension.

The second object indicated above may be accomplished according to a still further aspect of the present invention, which provides a hydraulic control apparatus for a power transmitting system for an automotive vehicle having a continuously variable transmission which has a first and a second shaft, a pair of variable-diameter pulleys provided on the first and second shafts, a belt connecting the pulleys, and a pair of hydraulic actuators for changing diameters of the pair of pulleys, wherein a first line pressure and a second line pressure lower than the first line pressure are applied to one and the other of the pair of hydraulic actuators, so as to change a speed ratio of the continuously variable transmission, and wherein the improvement comprises a speed-ratio sensing valve for regulating the second line pressure into a speed-ratio pressure which varies with the speed ratio of the continuously variable transmission, and a pressure regulating valve responsive to the speed-ratio pressure, for reducing the second line pressure in relation to the speed ratio of the transmission.

In the hydraulic control apparatus constructed according to the above aspect of the invention, the second line pressure is used by the speed-ratio sensing valve to produce the speed-ratio pressure. Therefore, the speed ratio pressure will not exceed the second line pressure, while the second line pressure is regulated by the pressure regulating valve such that the second line pressure is lowered in relation to the speed ratio of the transmission. In this arrangement, the speed-ratio pressure substantially coincides with the second line pressure when the speed ratio of the transmission rises to a certain level. In other words, the second line pressure as regulated by the pressure regulating valve at a given value of the throttle opening angle is lowered with an increase in the speed ratio, until the speed ratio reaches a given level, but is held substantially constant after the speed ratio exceeds that given level. Accordingly, the second line pressure is adjusted by the pressure regulating valve based on the speed-ratio pressure such that the curve of the second line pressure substantially coincides with the desired or ideal curve for maintaining the belt tension within an optimum range. Thus, the present hydraulic control apparatus eliminates the conventionally experienced problems such as an excessive rise in the second line pressure when the transmission speed ratio is relatively low, or an excessive decrease in the second line pressure and resulting slipping of the belt when the speed ratio is relatively high.

The present hydraulic apparatus is simple in the hydraulic circuit construction, as compared with an apparatus which uses a limit valve for limiting the speed-ratio pressure. Consequently, the hydraulic valve block incorporating the hydraulic control assembly for the continuously variable transmission is made small-sized and available at a relatively reduced cost. Further, the reliability of the apparatus in regulating the second line pressure is improved, in the absence of the limit valve as described above, which includes a movable spool.

Preferably, the speed-ratio sensing valve is adapted to increase the speed-ratio pressure with an increase in the transmission speed ratio, such that the fluid supplied to the sensing valve from the second pressure line for the second line pressure through a flow restrictor is discharged at a rate which changes with an amount of displacement of a sensing rod which is moved as the width of a V-groove of one of the variable-diameter pulleys is changed.

The third object indicated above may be achieved according to a yet further aspect of the present invention, which provides a hydraulic control apparatus for a power transmitting system connected to an engine of an automotive vehicle having a continuously variable transmission which has a first and a second shaft, a pair of variable-diameter pulleys provided on the first and second shafts, a belt connecting the pulleys, and a pair of hydraulic actuators for changing diameters of the pair of pulleys, wherein a first line pressure and a second line pressure lower than the first line pressure are applied to one and the other of the pair of hydraulic actuators, so as to change a speed ratio of the continuously variable transmission, and wherein the improvement comprises a pressure regulating valve for generating the first line pressure. The pressure regulating valve includes a valve spool for regulating a pressure of a pressurized fluid delivered from a hydraulic source through a first pressure line, into the first line pressure, and a plunger adapted to receive the second line pressure and an actuating pressure in one of the pair of hydraulic actuators provided on one of the first and second shafts which is located nearer to the engine. The plunger biases the valve spool by a force corresponding to a higher one of the second line pressure and the pressure in the above-indicated one actuator.

In the hydraulic control apparatus constructed as described just above, the plunger of the pressure regulating valve receives the second line pressure and the pressure in the above-indicated one hydraulic actuator, and biases the valve spool by a force which corresponds to the higher one of the second line pressure and the pressure in the above-indicated one actuator. In this arrangement, the pressure regulating valve operates to adjust the first line pressure to a level higher than one of the second line pressure and the pressure in the above-indicated one hydraulic actuator whichever is higher. Therefore, even if the two hydraulic actuators are drained upon re-starting of the engine, a force corresponding to the second line pressure acts on the valve spool of the pressure regulating valve, whereby the first line pressure is rapidly raised to a level which is higher by a suitable amount than the second line pressure, permitting the vehicle to be started with the speed ratio of the transmission adequately controlled.

BRIEF DESCRIPTION OF THE DRAWINGS

The above and other objects, features and advantages of the present invention will become more apparent by reading the following detailed description of presently preferred embodiments of the present invention, when considered in conjunction with the accompanying drawings, in which:

FIG. 10 is a view indicating a relationship between on-off states of a first and a second solenoid valve of the valve assembly of FIG. 9 and a shifting mode of the CVT;

FIG. 23 is a view showing on-off states of the third and fourth solenoid valves in different hydraulic control modes A, B, C, D and E;

FIG. 35 is a view for explaining operating conditions for increasing and reducing the second line pressure in the embodiment of FIG. 31;

FIGS. 39 and 40 are views for explaining the operating conditions for increasing and reducing the second line pressure in the embodiments of FIGS. 32 and 33, respectively;

FIG. 41 is a view for explaining the operation condition for increasing and reducing the second line pressure in the embodiment of FIG. 34;

FIG. 46 is a view showing a relationship used in step SS20' of the flow chart of FIG. 45;

DETAILED DESCRIPTION OF THE PREFERRED EMBODIMENTS

Figure 1:
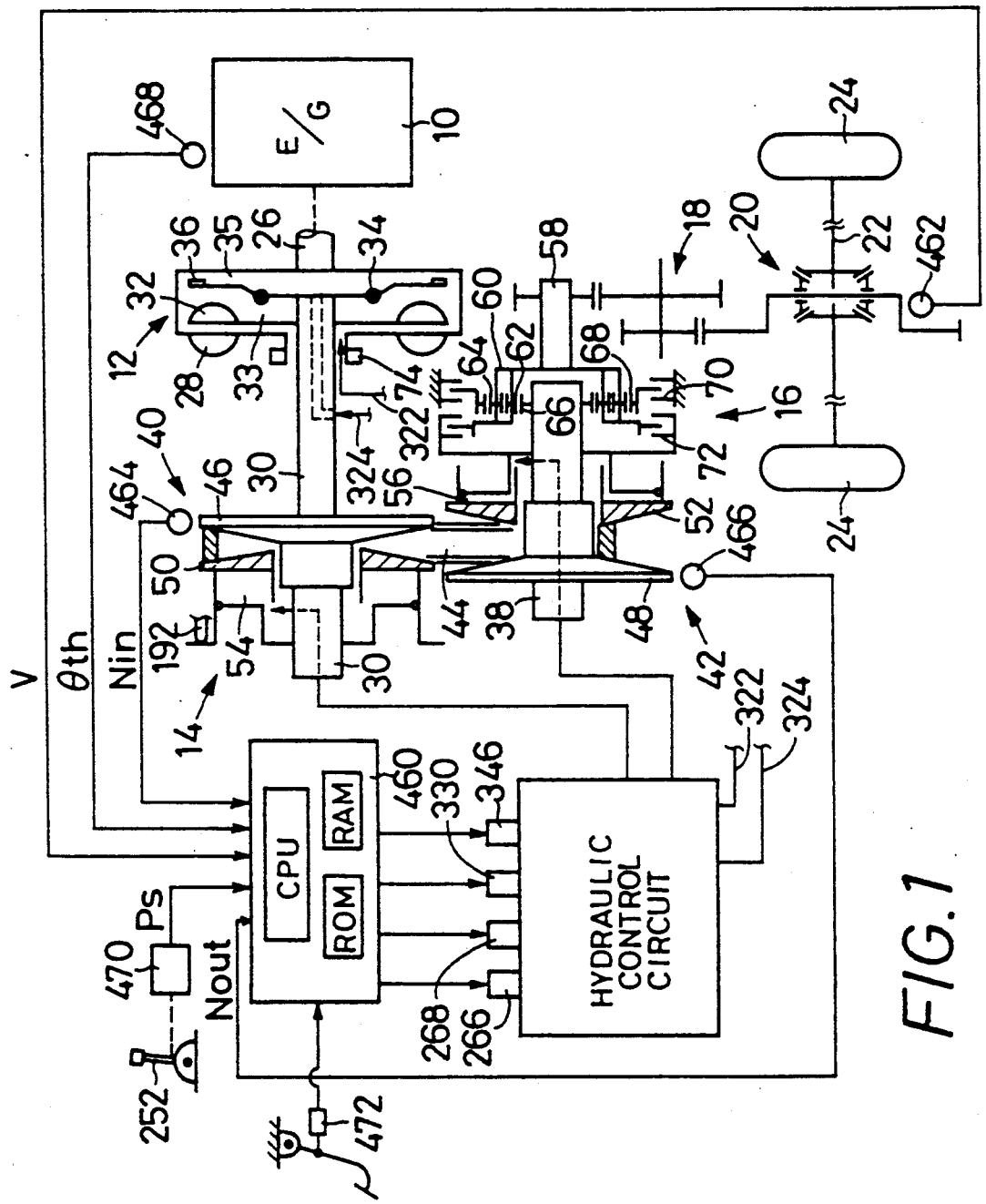
FIG. 1 is a schematic view of a vehicle power transmitting system equipped with a hydraulic control apparatus constructed according to one embodiment of the present invention.

Referring first to FIG. 1, there is illustrated a power transmitting system of an automotive vehicle, for transmitting power from an engine 10 to drive wheels 24, 24. The power transmitting system includes: a fluid coupling 12 connected to the engine 10 through a crankshaft 26 and equipped with a lock-up clutch 36; a continuously variable transmission (hereinafter referred to as "CVT") 14 connected to the fluid coupling 12; a reversing device 16 connected to the CVT 14, for selecting a forward or a reverse running of the vehicle, an intermediate gear device 18 connected to the reversing device 16; a differential gear device 20 connected to the intermediate gear device 18; and a drive axle 22 connected to the differential gear device 20 and drive wheels 24.

The fluid coupling 12 includes a pump impeller 28 connected to the crankshaft 26 of the engine 10; a turbine impeller 28 which is fixed to an input shaft 30 of the CVT 14 and rotated by means of a working fluid from the pump impeller 32; the lock-up clutch 36 indicated above, which is fixed to the input shaft 30 through a damper 34; and means for defining an engaging chamber 33 communicating with an engaging line 322 (which will be described), and a releasing chamber 35 communicating with a releasing line 324 (which will be described). The fluid coupling 12, which is filled with the working fluid, is operated to effect engagement of the lock-up clutch 36 for direct connection of the crankshaft 26 to the input shaft 30, when the speed of the vehicle, engine 10 or pump impeller 28, for example, exceeds a predetermined value. In this case, the fluid is fed into the engaging chamber 33 while the fluid in the releasing chamber 35 is discharged. When the vehicle speed or other speed indicated above falls below the predetermined value, on the other hand, the lock-up clutch 36 is disengaged or released such that the fluid is fed into the releasing chamber 35 and discharged from the engaging chamber 33.

The CVT 14 has a pair of variable-diameter pulleys 40, 42 having a same diameter which are provided on the input shaft 30 and an output shaft 38, respectively. These pulleys 40, 42 are connected by a transmission belt 44, and have respective stationary rotors 46, 48 fixed to the respective input and output shafts 30, 38, and respective axially movable rotors 50, 52 which are axially movable on the respective shafts 30, 38 and rotated with these shafts. The movable rotors 50, 52 are moved by respective first and second hydraulic actuators in the form of first and second hydraulic cylinders 54, 56, whereby the effective widths of V grooves of the pulleys 40, 42, i.e., the effective diameters engaging the belt 44 are changed, to change a speed ratio "e" of the CVT 14 (speed Nout/Nin, where Nout = speed of the output shaft 38, and Nin = speed of the input shaft 30).

Since the variable-diameter pulleys 40, 42 have the same diameter, the corresponding first and second hydraulic cylinders 54, 56 have a same pressure-receiving area. Generally, the tension of the transmission belt 44 is determined primarily by the pressure in one (hereinafter referred to as "driven side cylinder") of the first and second hydraulic cylinders 54, 56 which corresponds to the driven one of the pulleys 40, 42 (hereinafter referred to as "driven side pulley"). The driven side cylinder 54 or 56 is supplied with a second line pressure Pl2 which is adjusted by a second pressure regulating valve 102 (which will be described), whereby the tension of the belt 44 is adjusted to within an optimum range in which the belt 44 does not slip on the pulleys 40, 42.

The reversing device 16 is a well known double-pinion type planetary gear mechanism, which includes: a carrier 60 fixed on an output shaft 58; a pair of planetary gears 62, 64 which are rotatably supported by the carrier 60 and which mesh with each other; a sun gear 66 which is fixed on the input shaft 38 (output shaft of the CVT 14) and which meshes with the inner planetary gear 62; a ring gear 68 meshing with the outer planetary gear 64; a REVERSE brake 70 for stopping the rotation of the ring gear 68; and a FORWARD clutch 72 for connecting the carrier 60 and the input shaft 38.

The REVERSE brake 70 and FORWARD clutch 72 are hydraulically operated, frictionally coupling devices. The reversing device 16 is placed in a neutral position thereof when the brake 70 and the clutch 72 are both in the disengaged or released positions. In this state, the reversing device 16 does not transmit power to the intermediate gear device 18. When the FORWARD clutch 72 is engaged, the output shaft 38 (input shaft of the device 16) of the CVT 14 and the output shaft 58 of the device 16 are connected to each other, whereby power is transmitted from the CVT 14 to the intermediate gear device 18, so as to run the vehicle in the forward direction. When the REVERSE brake 70 is engaged, on the other hand, the direction of rotation of the output shaft 58 of the reversing device 16 is reversed with respect to the direction of rotation of the output shaft 38 of the CVT 14, whereby power is transmitted so as to run the vehicle in the reverse direction.

Figure 2:
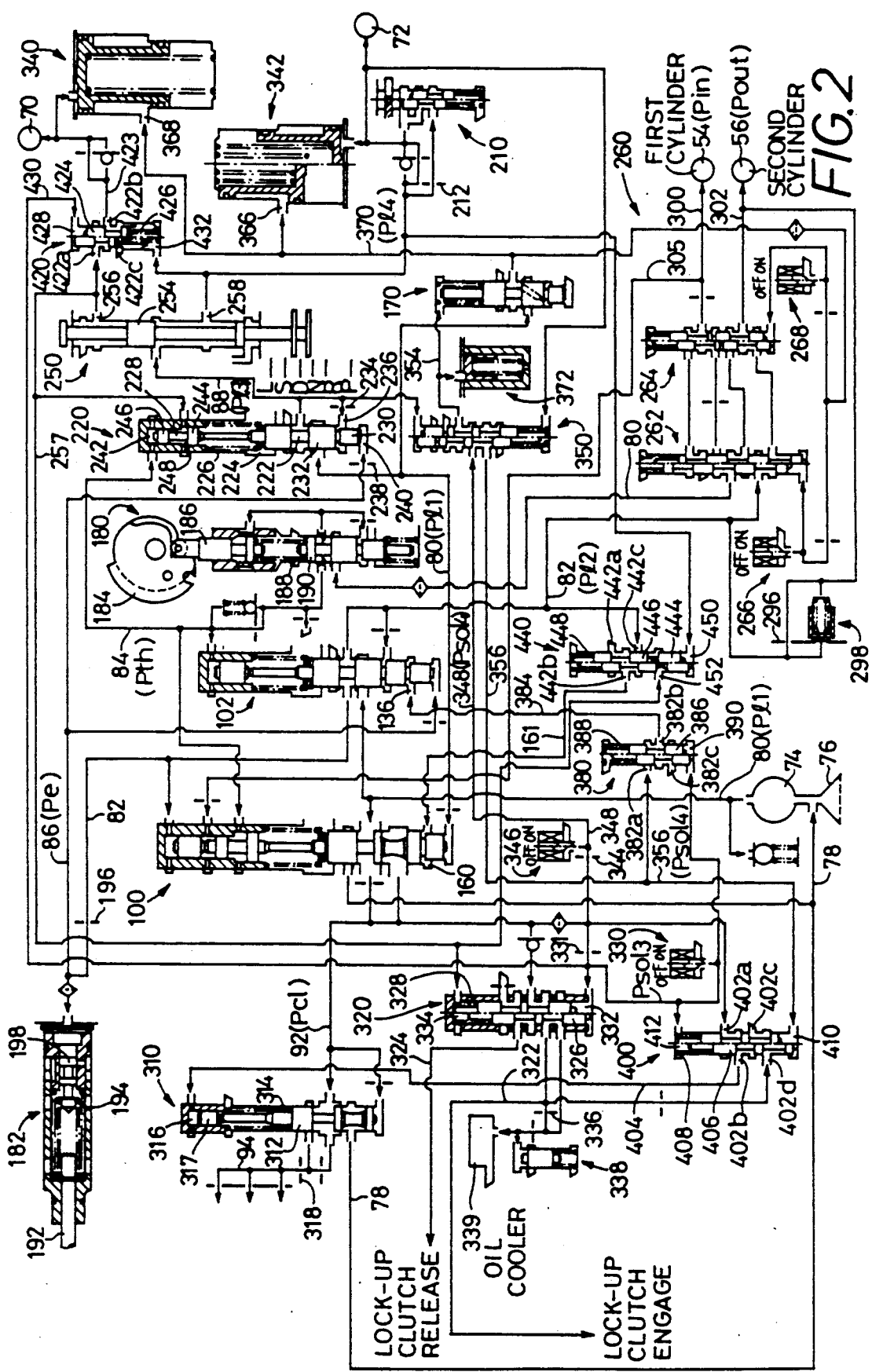
FIG. 2 is a hydraulic circuit diagram showing the hydraulic control apparatus adapted to control the power transmitting system of FIG. 1.

Referring next to FIG. 2 showing a hydraulic control circuit for controlling the vehicle power transmitting system of FIG. 1, reference numeral 74 designates an oil pump serving as a hydraulic power source of the hydraulic system, which constitutes a part of a hydraulic control apparatus constructed according to the instant embodiment of the present invention, which will be described. The oil pump 74 is connected to the pump impeller 28 of the fluid coupling 12, whereby the pump 74 is always rotated with the crankshaft 26 of the engine 10. In operation, the pump 74 pumps up a working fluid through a strainer 76 from a reservoir to which the fluid is returned. The pump 74 also communicates with a suction line 78, so that the fluid returned through the suction line 78 is sucked into the pump 74. The pressurized fluid produced by the pump 74 is delivered as a first line pressure Pl1 into a first pressure line 80. In the present embodiment, the first line pressure Pl1 is regulated by an overflow or relief type first pressure regulating valve 100 which discharges the fluid in the first pressure line 80 into the suction line 78 and a lock-up clutch line 92. The first line pressure Pl1 is lowered by the above-indicated second pressure regulating valve 102, to produce the above-indicated second line pressure Pl2 in a second pressure line 82. The second pressure regulating valve 102 is of a pressure reducing type, contrary to the overflow type of the first pressure regulating valve 100.

Figure 3:
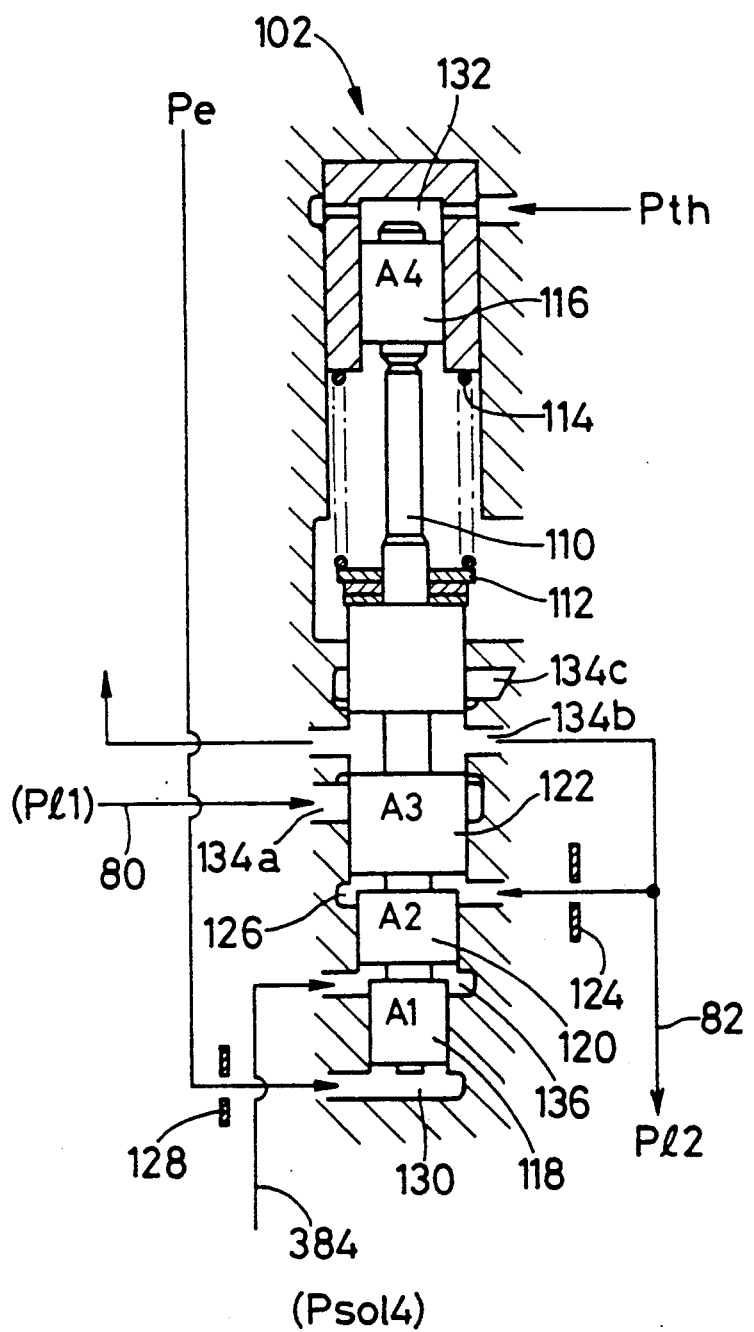
FIG. 3 is a view illustrating in detail a second pressure regulating valve incorporated in the apparatus of FIG. 2.

The second pressure regulating valve 102 will be first described in detail, by reference to FIG. 3.

This pressure regulating valve 102 includes a valve spool 110 for effecting connection and disconnection of the first pressure line 80 to and from the second pressure line 82, a spring sheet 112, a return spring 114, and a plunger 116. The valve spool 110 is provided at one axial end portion thereof remote from the plunger 116, with a first, a second and a third land 118, 120 and 122, which have different diameters. The first land 118 at the extreme end of the spool 110 has the smallest diameter, while the axially innermost third land 118 has the larger diameter. Between the second and third lands 120, 122, there is formed a chamber 126 to which is applied as a feedback pressure the second line pressure Pl2 through a flow restrictor 124, so that the valve spool 110 is biased toward its closed position by the second line pressure Pl2. Another chamber 130 is formed adjacent to the first land 118 at the above-indicated one end of the valve spool 110. To this chamber 130, there is applied a SPEED-RATIO pressure Pe (which will be described) through a flow restrictor 128. This pressure Pe also biases the valve spool 110 toward the close position.

The return spring 114 disposed around the valve spool 110 biases the spool 110 toward its open position, through the spring sheet 112. The second pressure regulating valve 102 has another chamber 132 adjacent to the plunger 116. This chamber 132 is adapted to receive a THROTTLE pressure Pth which will be described. The valve spool 110 is positioned under equilibrium of forces according to the following equation (1):

$$Pl2 = (A4 \cdot Pth + W - A1 \cdot Pe)/(A3 - A2) \qquad (1)$$

where,
A1: pressure-receiving area of the first land 118
A2: cross sectional area of the second land 120
A3: cross sectional area of the third land 122
A4: pressure-receiving area of the plunger 116
W: biasing force of the return spring 114

Figure 7:
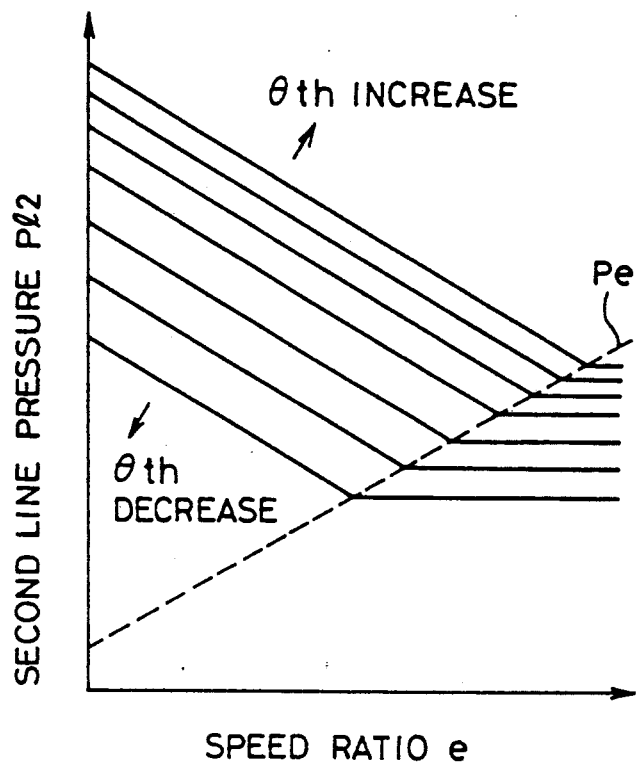
FIG. 7 is a graph showing an output characteristic of the second pressure regulating valve of FIG. 3.

Namely, the valve spool 110 is axially moved according to the equation (1), so as to repeatedly alternately establish communication between a port 134a and a port 134b for permitting a flow of the fluid from the first pressure line 80 into the second pressure line 82, and communication between the port 134b and a drain port 134c for draining the second pressure line 82 through the drain port 134c. As a result, the second line pressure Pl2 is produced. Since the second pressure line 82 is a closed hydraulic circuit, the second line pressure Pl2 can be adjusted the second pressure regulating valve 102, by lower the relatively high first line pressure Pl1, as indicated in FIG. 7.

Between the first and second lands 118, 120 of the valve spool 110 of the second pressure regulating valve 102, there is formed a chamber 136 adapted to receive a PRESSURE REDUCING pilot pressure Pso14 through a second line pressure reducing control valve 380 which will be described. As the valve spool 110 is biased toward its closed position by the pilot pressure Pso14 which varies with the vehicle running speed, the second line pressure Pl2 is accordingly reduced. This reduction in the second line pressure will be described later in more detail. The chamber 136 will be referred to as a pressure-reducing chamber, when appropriate, for the reason which will become apparent.

Figure 4:
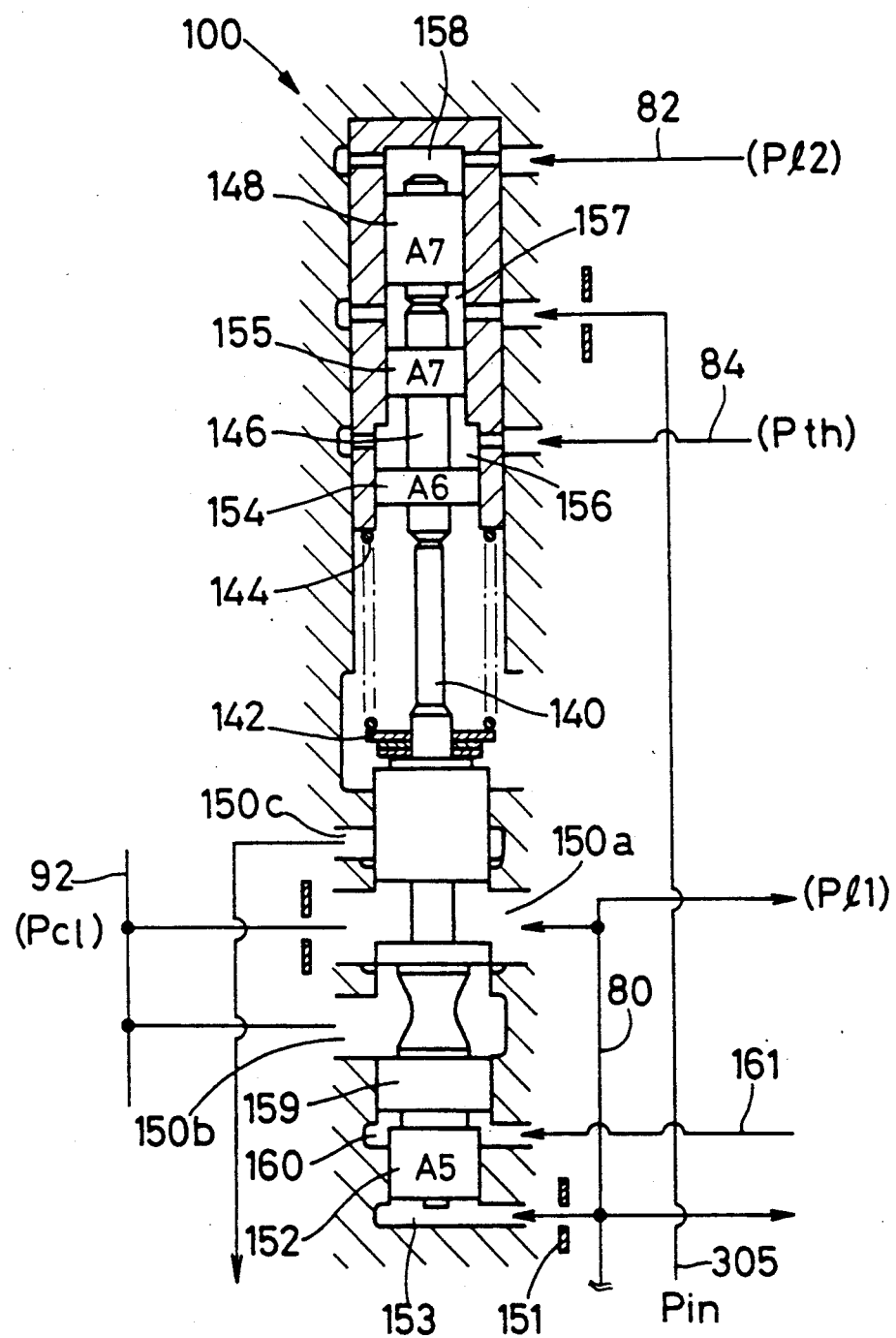
FIG. 4 is a view illustrating in detail a first pressure regulating valve also incorporated in the apparatus of FIG. 2.

Referring next to FIG. 4, the first pressure regulating valve 100 will then be described. This valve 100 includes a valve spool 140, a spring sheet 142, a return spring 144, a first plunger 146, and a second plunger 148 whose diameter is the same as a second land 155 of the first plunger 146. The valve spool 100 is operated to effect selective connection and disconnection of a port 150a communicating with the first pressure line 80, to and from a drain port 150b or 150c. The valve spool 140 has a first land 152 at one axial end thereof remote from the first and second plungers 146, 148. Adjacent to the first land 152 of the spool 140, there is formed a chamber 153 which receives as a feedback pressure the first line pressure Pl1 through a flow restrictor 151. The valve spool 140 is biased toward its closed position by this first line pressure Pl1. The first plunger 146, which is coaxial with the valve spool 140, has a first land 154 which cooperates with the above-indicated second land 155 to define a chamber 156 adapted to receive the THROTTLE pressure Pth. Between the second land 155 of the first plunger 146 and the second plunger 148, there is formed a chamber 157 adapted to receive a pressure Pin in the first hydraulic cylinder 54, through a branch line 305. Further, a chamber 158 is formed adjacent to the end face of the second plunger 148. The chamber 158 receives the second line pressure Pl2. The biasing force of the above-indicated return spring 144 acts on the valve spool 140 through the valve sheet 142 so as to bias the spool 140 toward its open position. The valve spool 140 is positioned under equilibrium of forces according to the following equation (2):

$$Pl1 = [(Pin \text{ or } Pl2) \cdot A7 + Pth(A6 - A7) + W]/A5 \quad (2)$$

where
- A5: pressure-receiving area of the first land 152 of the valve spool 140
- A6: cross sectional area of the first land 154 of the first plunger 146
- A7: cross sectional area of the second land 155 of the first plunger 146 (second plunger 148)
- W: biasing force of the return spring 144

In the first pressure regulating valve 100, the first and second plungers 146, 148 are separated from each other and a thrust due to the pressure Pin in the first cylinder 54 acts on the valve spool 140 in the direction toward the closed position, when the pressure Pin is higher than the second line pressure Pl2 (which is normally equal to the pressure Pout in the second cylinder 56). When the pressure Pin is lower than the second line pressure Pl2, the first and second plungers 146, 148 are held in abutting contact with each other, whereby a thrust due to the second line pressure Pl2 acting on the end face of the second plunger 148 acts on the valve spool 140 in the direction toward its closed position. That is, the second plunger 148 receiving the pressure Pin and the second line pressure Pl2 applies to the spool 140 a force based on the higher one of the pressures Pin and Pl2, so that the spool 140 is biased toward its closed position.

Between the first and second lands 152 and 159 of the valve spool 140, there is formed a chamber 160 adapted to receive the second line pressure Pl2 which is applied through a line 161 from a first line pressure reducing control valve 440 (which will be described). The pressure Pl2 in this chamber 160 acts on the valve spool 140 in a direction that causes the first line pressure Pl1 to be lowered. When the control valve 440 is operated to apply the second line pressure Pl2 to the chamber 160 while a shift level 252 (FIG. 1) of the vehicle is placed in an operating position "N" (NEUTRAL) or "P" (PARKING), the first line pressure Pl1 is lowered. This reduction in the first line pressure will be described later in more detail.

Figure 5:
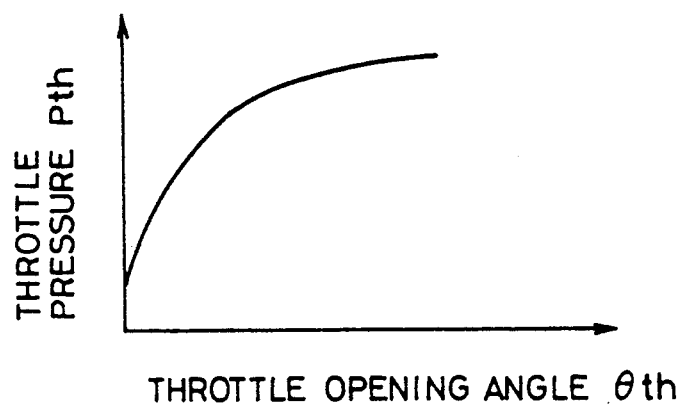
FIG. 5 is a graph indicating an output characteristic of a flow restrictor sensing valve incorporated in the apparatus of FIG. 2.

Referring back to FIG. 2, the THROTTLE pressure Pth representing an actual opening angle θth of a throttle valve of the engine 10 is generated by a flow restrictor sensing valve 180. Further, the SPEED-RATIO pressure Pe representing an actual speed ratio "e" of the CVT 14 is generated by a speed-ratio sensing valve 182. Described specifically, the throttle sensing valve 180 includes: a cam 184 rotated as the throttle valve is operated; a plunger 186 which engages a cam surface of the cam 184 and which is axially moved by a distance corresponding to an angle of rotation of the cam 184; a spring 188; and a valve spool 190 which receives a thrust through the spring 188 from the plunger 186, and a thrust due to the first line pressure Pl1. These two thrust forces act on the spool 190 in the opposite directions. The valve spool 190 is moved to a position of equilibrium of the above two thrust forces, whereby the first line pressure Pl1 is reduced so as to produce the THROTTLE pressure Pth corresponding to the actual opening angle θth of the throttle valve. The relationship between the THROTTLE pressure Pth and the opening angle θth is indicated in the graph of FIG. 5. The THROTTLE pressure Pth is applied through a line 84 to the above-described first and second pressure regulating valves 100, 102, and to a third pressure regulating valve 220.

Figure 6:
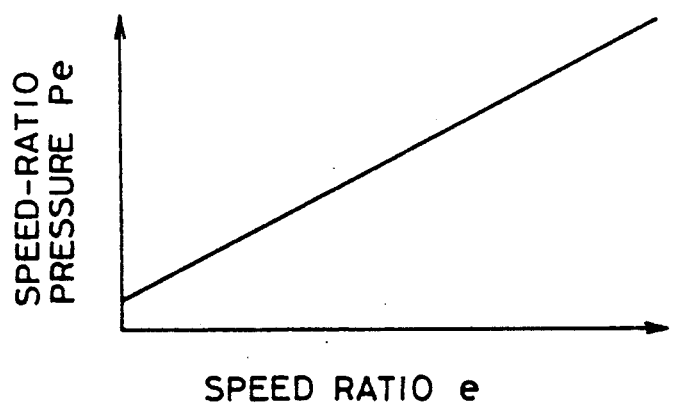
FIG. 6 is a graph indicating an output characteristic of a speed-ratio sensing valve incorporated in the apparatus of FIG. 2.

The speed-ratio sensing valve 182 includes: a sensing rod 192 which slidably contacts the axially movable rotor 50 on the input shaft 30 of the CVT 14 and which is axially displaced by a distance equal to an amount of axial movement of the movable rotor 50; a spring 194 whose biasing force varies as the axial position of the rod 192 is changed; and a valve spool 198 which receives the biasing force of the spring 194 and the second line pressure P(2. The valve spool 196 is moved to a position of equilibrium of the biasing force of the spring 194 and a thrust force based on the second line pressure Pl2, whereby the amount of discharge flow of the fluid from the second pressure line 82 into the drain is adjusted depending upon the speed-ratio "e" of the CVT 14. For example, as the movable rotor 50 is moved toward the stationary rotor 46 so as to reduce the effective width of the V-groove of the pulley 40 and thereby increase the speed ratio "e", the sensing rod 192 is moved in a direction to compress the spring 194, thereby reducing the rate of flow of the fluid which is supplied from the second pressure line 82 through an orifice 196 and discharged into the drain by a resulting movement of the valve spool 198. As a result, the pressure in a portion of the line 82 downstream of the orifice 196 is increased. This pressure is utilized as the SPEED-RATIO pressure Pe, which increases with an increase in the speed ratio "e" of the CVT 14, as indicated in the graph of FIG. 6. The pressure Pe is applied through a line 86 to the second and third pressure regulating valves 102 and 220.

Figure 8:
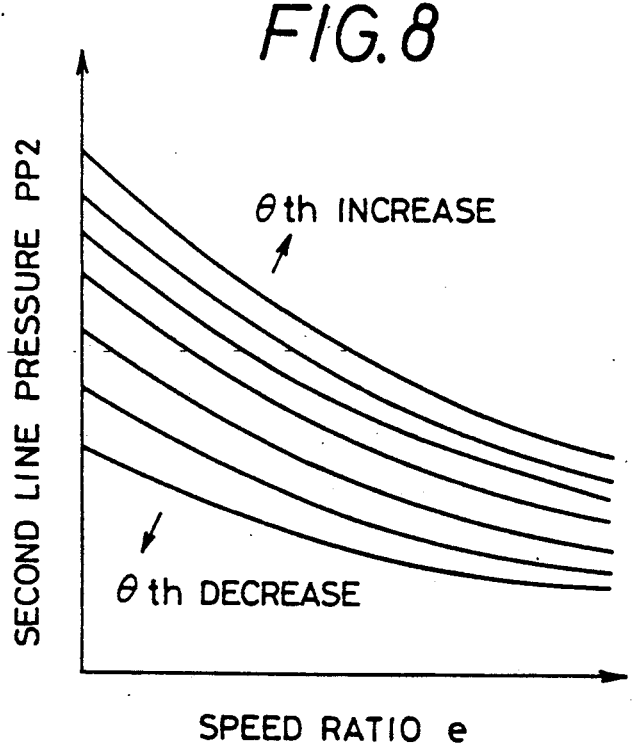
FIG. 8 is a graph showing an ideal relationship of a second line pressure of the apparatus of FIG. 2 with a speed ratio of a CVT of the power transmitting system and an opening angle of a flow restrictor valve of the vehicle.

It will be understood from the above description of the speed-ratio sensing valve 182 that since the SPEED-RATIO pressure Pe is produced by changing the amount of discharge of the fluid supplied from the second pressure line 82 through the orifice 196, the pressure Pe will not exceed the second line pressure Pl2. Further, the second line pressure Pl2 is lowered with an increase in the pressure Pe, by the second pressure regulating valve 102 according to the equation (1) indicated above. Therefore, when the pressure Pe increases up to the level of the second line pressure Pl2, both of the pressures Pe and Pl2 are held constant, as indicated in the graph of FIG. 7, which shows that the lower limit of the second line pressure Pl2 adjusted by the second pressure regulating valve 102 is determined by the SPEED-RATIO pressure Pe, i.e., the speed ratio "e" of the CVT 14. Namely, the present hydraulic arrangement assures the curve of the second line pressure Pl2 (as indicated in FIG. 7) which is similar or approximate to an ideal curve as shown in FIG. 8 that permits the tension of the belt 44 to be maintained at an optimum value. In other words, the present hydraulic arrangement does not require an electromagnetically operated pressure control servo valve controlled by a microcomputer for controlling the second line pressure Pl2. In this respect, the present hydraulic control apparatus provides significant reduction in the cost of manufacture.

The third pressure regulating valve 220 is adapted to produce a third line pressure Pl3 suitable for operating the REVERSE brake 70 and FORWARD clutch 72 of the reversing device 16. This valve 220 includes a valve spool 222 for effecting selective connection and disconnection of the first pressure line 80 to and from a third pressure line 88, a spring sheet 224, a return spring 226, and a plunger 228. The valve spool 222 has a first and a second land 230, 232, between which is formed a chamber 236, which is adapted to receive the third line pressure Pl3 as a feedback pressure through a flow restrictor 234, so that the spool 222 is biased toward its closed position by the pressure Pl3. Adjacent to the first land 230 of the spool 222, there is formed another chamber 240 which receives the SPEED-RATIO pressure Pe through a flow restrictor 238, so that the spool 222 is biased toward the closed position by the pressure Pe. In the third pressure regulating valve 220, a biasing force of the return spring 226 acts on the spool 222 through the spring sheet 224, so that the spool 222 is biased toward its open position by the spring 226. Adjacent to the end face of the plunger 228, there is formed a chamber 242 adapted to receive the THROTTLE pressure Pth, so that the spool 222 is biased toward the open position by the pressure Pth. The plunger 228 has a first land 244, and a second land 246 having a smaller diameter than the first land 244. Between these first and second lands 244, 246, there is formed a chamber 248 adapted to receive the third line pressure Pl3 only when the vehicle runs in the reverse direction with the REVERSE brake 70 placed in the engaged position. In the third pressure regulating valve 220 constructed as described above, the valve spool 222 is moved to a position of equilibrium of forces according to an equation similar to the equation (1), so that the third line pressure Pl3 is controlled to an optimum level based on the SPEED-RATIO and THROTTLE pressures Pe and Pth. The optimum level is a permissible lowest value required to permit the reversing device 16 to transmit received input torque without slipping of the brake 70 or clutch 72.

When the REVERSE brake 70 is placed in the engaged position, the third line pressure Pl3 is applied to the chamber 248, whereby the force biasing the spool 222 toward the open position is increased, to thereby increase the third line pressure Pl3. This arrangement assures optimum torque transmitting capacity of the FORWARD clutch 72 and REVERSE brake 70 during engagement of the clutch 72 or brake 70 to run the vehicle in the forward or reverse direction.

The thus regulated third line pressure Pl3 is applied to the FORWARD clutch 72 or REVERSE brake 70 by means of a shift lever valve 250. This shift lever valve 250 has a valve spool 254 which is moved in response to an operation of the shift lever 252, which has six operating positions, i.e., NEUTRAL "N", PARKING "P", LOW "L", SECOND "S", DRIVE "D" and REVERSE "R". The shift lever valve 250 has an output port 256 and an output port 258. When the shift lever 252 is placed in the NEUTRAL position "N", the third line pressure Pl3 is not supplied from the output ports 256, 258. When the shift lever 252 is placed in one of the LOW, SECOND and DRIVE positions "L", "S" and "D", the third line pressure Pl3 is supplied primarily through the output port 258 to the FORWARD clutch 72, a chamber 450 of the first line pressure reducing control valve 440 (referred to above) and a chamber 432 of a REVERSE INHIBIT valve 420, while at the same time the fluid is discharged from the brake 70. When the shift lever 252 is placed in the REVERSE position "R", the third line pressure Pl3 is supplied through the output port 256 to the third pressure regulating valve 220, lock-up clutch control valve 320, a chamber 452 of the first line pressure reducing control valve 440 and a port 422a of the REVERSE INHIBIT valve 420, so that the pressure Pl3 is applied to the REVERSE brake 70 through the REVERSE INHIBIT valve 420, while at the same time the fluid is discharged from the FORWARD clutch 72. When the shift lever 252 is placed in the PARKING position "P", the fluid is discharged from the brake 70 and clutch 72 at the same time. As indicated in FIG. 2, the spool 254 of the shift lever valve 250 has six operating positions "L", "S", "D", "N", "R" and "P" corresponding to those of the shift lever 252.

Accumulators 340 and 342 are connected to the brake 70 and clutch 72, respectively, for the purpose of slowly raising the pressure applied to the brake and clutch 70, 72, so that the frictionally coupling devices of the brake and clutch may be smoothly engaged. A shift timing valve 210 connected to the clutch 72 functions to prevent a transient excessively high rate of flow of the fluid to the clutch 72, such that a flow restrictor 212 is closed with a rise in the pressure in the cylinder of the clutch 72.

The first and second line pressures Pl1 and Pl2 adjusted by the first and second pressure regulating valves 100, 102, respectively, are applied to the one and the other of the first and second hydraulic cylinders 54, 56 of the CVT 14 through a shift control valve assembly 260, for controlling the speed ratio "e" of the CVT 14. The shift control valve assembly 260 has a directional control valve 262 and a flow control valve 264. These control valves 262, 264 receive through a fourth pressure line 370 a fourth line pressure Pl4 which is produced by a fourth pressure regulating valve 170 based on the first line pressure Pl1.

Figure 9:
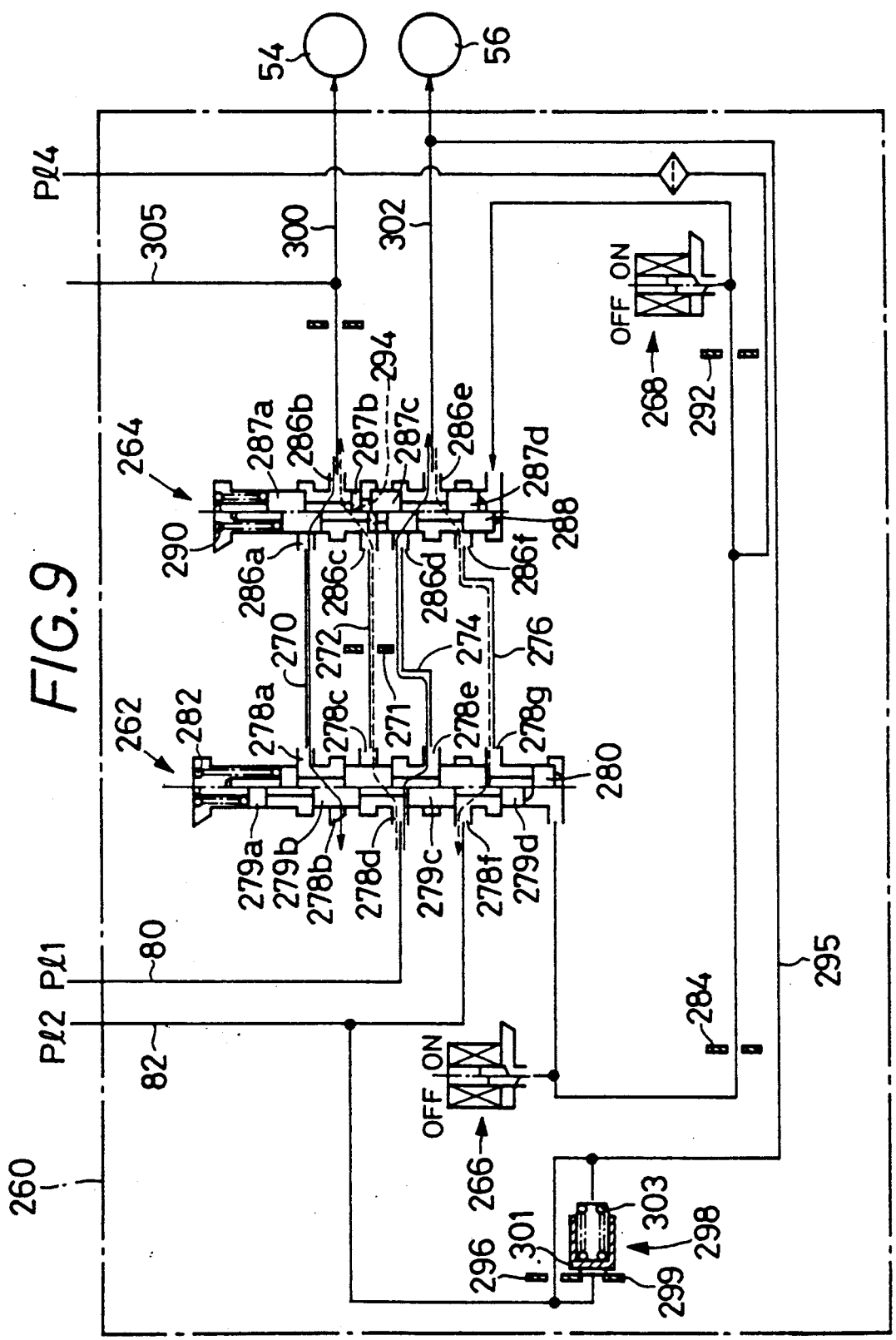
FIG. 9 is a view illustrating in detail a shift control valve assembly of the apparatus of FIG. 2.

Referring to FIG. 9 which shows the details of the shift control valve assembly 260, the directional control valve 262 is a spool valve controlled by a first solenoid-operated valve 266. The valve 262 has ports 278a, 278c, 278e and 278g which communicate with respective first, second, third and fourth connecting lines 270, 272, 274 and 276 that are connected to the flow control valve 264. The line 272 is provided with a flow restrictor 271. The directional control valve 262 further has a drain port 278b communicating with the drain, a port 278d communicating with the first pressure line 80 to receive the first line pressure Pl1, and a port 278f communicating with the second pressure line 82 to receive the second line pressure Pl2. The valve 262 includes a valve spool 280 which is axially slidably movable between a first position corresponding to one end (upper end as viewed in FIG. 9) of an operating stroke thereof, and a second position corresponding to the other end (lower end as viewed in FIG. 9) of the operating stroke. The spool 280 is biased by a spring 282 toward its second position.

The valve spool 280 has four lands 279a, 279b, 279c and 279d which open and close the above-indicated ports of the valve 262. The upper end of the spool 280 on the side of the spring 282 is exposed to the atmospheric pressure, with no hydraulic pressure applied thereto. On the other hand, the lower end of the spool 280 is exposed to the fourth line pressure Pl4 when the first solenoid-operated valve 266 is placed in the OFF or closed position. With the valve 266 placed in the ON or open position, however, the fourth line pressure Pl4 is released through the valve 266 located downstream of a flow restrictor 284, whereby the fourth line pressure Pl4 is not applied to the lower end of the valve spool 280. In this arrangement, while the first solenoid-operated valve 266 is ON, the spool 280 is placed in its second position. In this state, the ports 278a and 278b are connected to each other and the ports 278d and 278e are connected to each other, while the ports 278d and 278c are disconnected from each other and the ports 278f and 278g are disconnected from each other. While the solenoid-operated valve 266 is OFF, the spool 280 is placed in the first position, whereby the ports 278a and 278b are disconnected and the ports 278d and 278e are disconnected, while the ports 278d and 278c are connected and the ports 278f and 278g are connected.

The flow control valve 264 of the shift control valve assembly 260 is a spool valve controlled by a second solenoid-operated valve 268. The valve 264 has ports 286a, 286c, 286d and 286f which communicate with the above-indicated first, second, third and fourth connecting lines 270, 272, 274 and 276. The flow control valve 264 further has a port 286b communicating with the first hydraulic cylinder 54, and a port 286e communicating with the second hydraulic cylinder 56. The valve 264 includes a valve spool 288 which is axially slidably movable between a first position on the side of one end (upper end as viewed in FIG. 9) of an operating stroke thereof, and a second position on the side of the other end (lower end as viewed in FIG. 9) of the operating stroke. The spool 288 is biased by a spring 290 toward its second position.

The valve spool 288 has four lands 287a, 287b, 287c and 287d which open and close the above-indicated ports of the valve 264. As in the valve 262, the upper end of the spool 288 on the side of the spring 290 is exposed to the atmospheric pressure, with no hydraulic pressure applied thereto. On the other hand, the lower end of the spool 288 is exposed to the fourth line pressure Pl4 when the second solenoid-operated valve 268 is placed in the OFF or closed position. With the valve 268 placed in the ON or open position, however, the fourth line pressure Pl4 is released through the valve 268 located downstream of a flow restrictor 292, whereby the fourth line pressure Pl4 is not applied to the lower end of the valve spool 288. In this arrangement, while the second solenoid-operated valve 268 is ON (with the duty cycle set at 100%), the spool 288 is placed in its second position. In this state, the ports 286c and 286b are connected to each other and the ports 286f and 286e are connected to each other, while the ports 286a and 286b are disconnected from each other and the ports 286d and 286e are disconnected from each other. While the solenoid-operated valve 286 is OFF (with the duty cycle set at 0%), the spool 288 is placed in the first position, whereby the ports 286c and 286b are disconnected and the ports 286f and 286e are disconnected, while the ports 286a and 286b are connected and the ports 286d and 286e are connected.

While the second solenoid-operated valve 268 is OFF, the ports 286c and 286b are held in restricted communication with each other through a flow restrictor 294. The second hydraulic cylinder 56 communicates with the second pressure line 82 through a flow restrictor 296 and a check valve 298 which are connected in parallel. These restrictor and check valve 296, 298 are provided to prevent a rapid decrease in the pressure Pout (=Pl1) in the second hydraulic cylinder 56 with the fluid being discharged from the cylinder 56 into the second pressure line 82, when the first line pressure Pl1 is applied to the cylinder 56, during a shift-down operation of the CVT 14 which requires the pressure Pout to be higher than the pressure Pin in the first cylinder 54, or during an engine-braking operation in which torque is transmitted in the direction from the output shaft 38 of the CVT 14 to the input shaft 30.

When the first solenoid-operated valve 266 is turned ON, the pressurized fluid in the first pressure line 80 is fed into the second cylinder 56 through the port 278d, port 278e and a third connecting line 274, port 286d, port 286e and second cylinder line 302, as indicated in solid line in FIG. 9, while the fluid in the first cylinder 54 is discharged to the drain through a first cylinder line 300 and the port 286b, port 286a, first connecting line 270, port 278a and port 278b, as also indicated in solid line in FIG. 9. As a result, the speed ratio "e" of the CVT 14 is reduced so as to reduce the speed of the vehicle, i.e., the CVT 14 is shifted down.

When the first solenoid-operated valve 266 is turned OFF, the pressurized fluid in the first pressure line 80 is fed into the first cylinder 54 through the port 278d, port 278c, second connecting line 272, port 286c, port 286b and first cylinder line 300, as indicated in broken line in FIG. 9, while the fluid in the second cylinder 56 is discharged to the second pressure line 82 through the second cylinder line 302, port 286e, port 286f, fourth connecting line 276, port 278g and port 278f, as also indicated in broken line in FIG. 9. As a result, the speed ratio "e" of the CVT 14 is increased so as to increase the speed of the vehicle, i.e., the CVT 14 is shifted up. A flow restrictor 273 is provided between the port 286b of the flow control valve 264 and a connecting point between the first cylinder line 300 and a branch line 305 leading to the first pressure regulating valve 100.

Referring to FIG. 10, there are shown shift modes of the CVT 14 in relation to the operating states (ON and OFF states) of the first and second solenoid-operated valves 266 and 268. The shift modes have different shifting directions and different rates of change in the speed ratio "e". Namely, the shift mode IV is established when both of the first and second solenoid-operated valves 266, 268 are OFF. In this shift mode IV, the pressurized fluid in the first pressure line 80 is fed into the first cylinder 54 through a flow restrictor 294 formed in through the valve spool 288 of the flow control valve 264, while the fluid in the second cylinder 56 is discharged at a relatively low rate into the second pressure line 82 through the flow restrictor 296. The shift mode III is established when the first and second solenoid-operated valves 266, 268 are both ON. In this mode III, the fluid in the second pressure line 82 is fed into the second cylinder 56 through a flow restrictor 296 provided in the by-pass line 295, and through the check valve 298. The flow restrictor 296 and check valve 298 are disposed in parallel with each other. At the same time, the fluid in the first cylinder 54 is discharged at a relatively low rate through a small clearance which is purposely or inherently formed or provided between the piston and the mating sliding surface of the cylinder 54.

The by-pass line 295 provided between the second cylinder 56 and the second pressure line 82 as described above effectively prevents or minimizes a phenomenon of pulsation of the pressure Pout in the second cylinder 56 which would occur in synchronization with the duty cycling operation of the flow control valve 264. More specifically, the upper peak of the spike of the pressure Pout is released through the flow restrictor 296, while the lower peak of the pressure Pout is compensated for by the check valve 298. The check valve 298 includes a valve seat 299 having a flat seat surface, a valve member 301 having a flat operating surface which is abutable on the valve seat 299, and a spring 303 for biasing the valve member 301 against the seat 299. This check valve 298 is adapted to be opened when a pressure difference across the valve exceeds about $0.2$ $kg/cm^2$.

Figure 11:
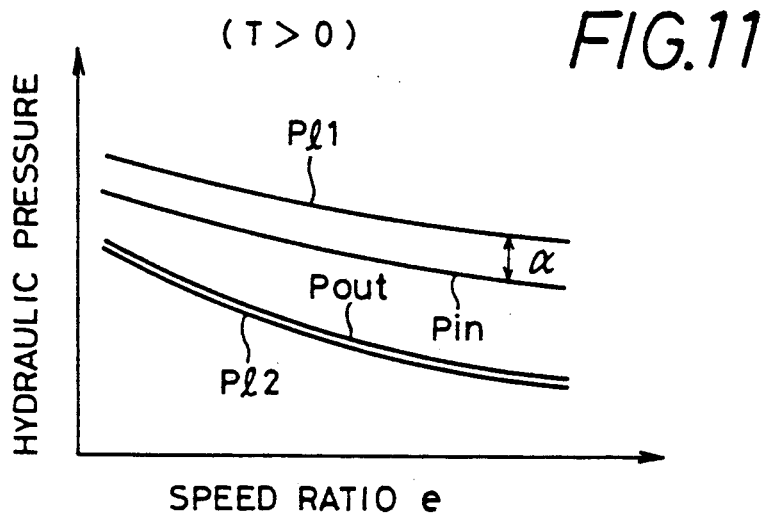
FIGS. 11, 12 and 13 are graphs indicating relationships between the speed ratio of the CVT and hydraulic pressures at different locations of the apparatus of FIG. 2, where the vehicle is running in normal, engine-brake and non-load running conditions, respectively.
Figure 12:
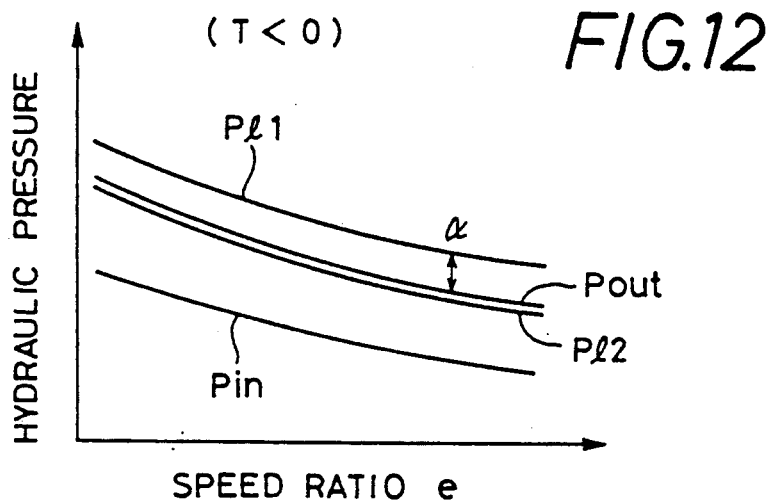
Figure 13:
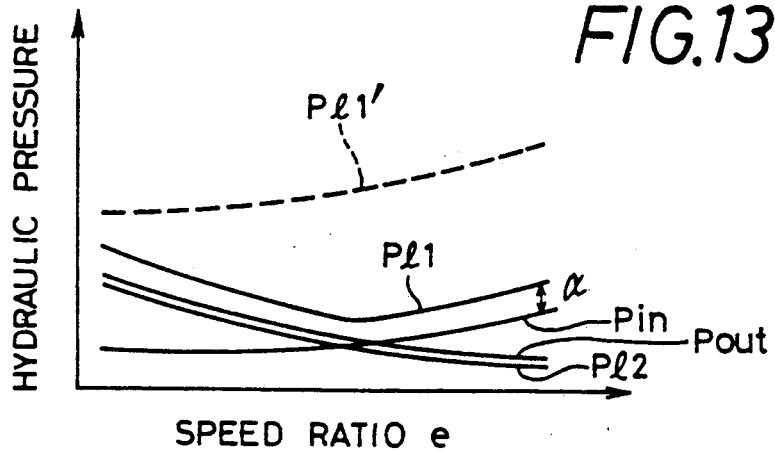

In the CVT 14, it is desirable that the first line pressure Pl1 have an optimum value with respect to the second line pressure Pl2 and the cylinder pressures Pin and Pout, as indicated in FIG. 11 when torque T is transmitted through the CVT 14 in the forward direction from the input shaft 30 toward the output shaft 38 (when the torque T is positive), and as indicated in FIG. 12 when the torque T is transmitted in the reverse direction from the output shaft 30 toward the input shaft 30 as in an engine-brake running of the vehicle (when the torque T is negative). The optimum value of the first line pressure Pl1 as shown in FIGS. 11 and 12 varies with the speed ratio "e" of the CVT 14, with the torque of the input shaft 30 held constant at a given level. In the present embodiment wherein the first and second hydraulic cylinders 54, 56 have the same pressure-receiving area, the pressure Pin in the first cylinder 54 is higher than the pressure Pout in the second cylinder 56 during the positive-torque running of the vehicle, as indicated in FIG. 11. On the other hand, the pressure Pout is higher than the pressure Pin during the negative-torque running (engine-brake running) of the vehicle, as indicated in FIG. 12. That is, the pressure in the driving side cylinder 54, 56 is higher than the pressure in the driven side cylinder 54, 56. In the positive-torque running of FIG. 11, the pressure Pin in the driving side cylinder 54 provides a thrust which determines the speed ratio "e" of the CVT 14. In view of this, the first line pressure Pl1 is desirably adjusted so as to be higher than the pressure Pin by an extra amount $\alpha$ which is a minimum value required to establish the desired speed ratio "e" with a minimum power loss. However, it is impossible to adjust the first line pressure Pl1 based on one of the pressures Pin and Pout of the two cylinders 54, 56. In view of this, the first pressure regulating valve 100 is provided with th second plunger 148, so that the valve spool 140 of the valve 100 receives a biasing force based on a higher one of the pressure Pin and the second line pressure Pl2. According to this arrangement, the first line pressure Pl1 is determined based on the higher one of the pressures Pin and Pl2 whose curves intersect each other as indicated in FIG. 13, i.e., based on the higher pressure Pin or Pl2 while the vehicle is running with no load applied to the CVT 14. More precisely, the optimum first line pressure Pl1 is determined by adding the above-indicated required minimum extra value $\alpha$, so that the first line pressure Pl1 is a minimum level required to obtain the desired speed ratio "e" with a minimum power loss. A curve indicated in broken line in FIG. 13 represents the first line pressure Pl1' where the first pressure regulating valve 100 is not provided with the second plunger 148. This curve indicates that the first line pressure Pl1' is unnecessarily high when the desired speed ratio "e" is relatively high.

Figure 14:
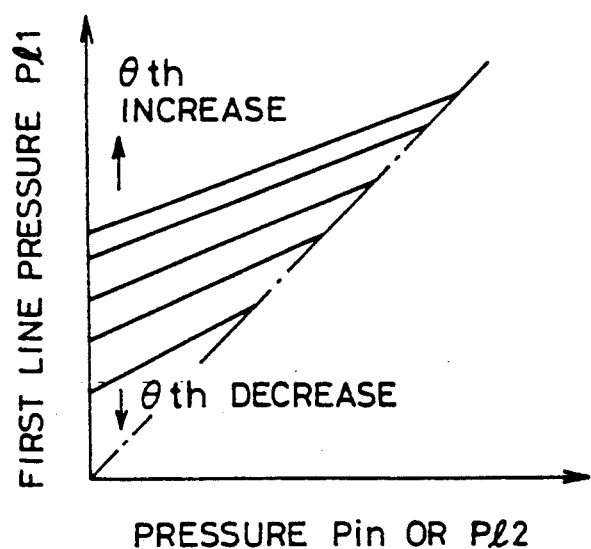
FIG. 14 is a graph indicating an output characteristic of the first pressure regulating valve of FIG. 4, i.e., a relationship between a first line pressure and a second line pressure or a pressure in a first hydraulic cylinder of the CVT.

As indicated above, the extra value $\alpha$ is a minimum value which is required to change the speed ratio "e" of the CVT 14 over its entire range available. It will be understood from the above equation (2) that the first line pressure Pl1 increases in relation to the THROTTLE pressure Pth, since the pressure-receiving areas of the relevant elements of the first pressure regulating valve 100 and the biasing force of the spring 144 are so determined. Although the first line pressure Pl1 adjusted by the first pressure regulating valve 100 increases with the pressure Pin or Pl2 and the THROTTLE pressure Pth, the pressure Pl1 is saturated at a highest value which varies with the THROTTLE pressure Pth ($\theta$th), as indicated in FIG. 14. This arrangement prevents an excessive rise in the first line pressure Pl1 (higher than the pressure Pin in the first cylinder 54 by the extra value $\alpha$), even if the pressure Pin increases while the speed ratio "e" is the highest value with the minimum width of the V-groove of the first pulley 40 (while the movement of the movable rotor 50 is mechanically prevented).

The fluid discharged from the port 150b of the first pressure regulating valve 100 is fed into the lock-up clutch line 92, and directed to a lock-up pressure regulating valve 310 for producing as a LOCK-UP CLUTCH pressure Pcl suitable for operating the lock-up clutch 36 of the fluid coupling 12. The lock-up pressure regulating valve 310 has a valve spool 312 which receives as a feedback pressure the LOCK-UP CLUTCH pressure Pcl. The spool 312 is biased by this feedback pressure Pcl toward its open position. The valve 310 further has a spring 314 for biasing the spool 312 to the closed position, a chamber 316 to which is applied the LOCK-UP CLUTCH pressure Pcl through a rapid release valve 400 (which will be described) upon rapid releasing of the lock-up clutch 36, and a plunger 317 which receives the pressure in the chamber 316 to thereby bias the spool 312 toward the closed position. The valve spool 312 is moved to a position of equilibrium between a thrust based on the feedback pressure Pcl and a biasing force of the spring 314, whereby the LOCK-UP CLUTCH pressure Pcl in the lock-up clutch line 92 is suitably adjusted. When the LOCK-UP CLUTCH pressure Pc1 is applied to the chamber 316 upon rapid releasing of the lock-up clutch 36, the pressure Pc1 is further raised to further accelerate the releasing of the lock-up clutch 36. The fluid delivered from the lock-up clutch regulating valve 310 is supplied to various portions of the power transmitting system through a flow restrictor 318 and a lubrication line 94, and is returned to the suction line 78 of the oil pump 74.

The thus regulated LOCK-UP CLUTCH pressure Pc1 is applied selectively to the engaging and releasing lines 322, 324 of the fluid coupling 12 through a lock-up clutch control valve 320, whereby the lock-up clutch 36 is engaged and disengaged or released. The lock-up clutch control valve 320 has a valve spool 326 for selective connection of the lock-up clutch line 92 with the engaging and releasing lines 322, 324, the spool 326 is biased by a spring 328 toward a releasing position for releasing the lock-up clutch 36. Adjacent to the upper end of the spool 326 (on the side of the spring 328), there is formed a chamber 334 which receives the third line pressure Pl3 supplied from the output port 256 of the shift lever valve 250 through a line 257 only when the shift lever 252 is placed in the REVERSE position "R". With the shift lever 252 placed in the other positions, the chamber 334 is drained. Adjacent to the lower end of the spool 326 remote from the spring 328, there is formed a chamber 332 which receives a pilot pressure Pso13 when a normally open third solenoid-operated valve 330 is placed in the ON or closed position. That is, when the third solenoid-operated valve 330 is ON, the pressure in a portion of the line connected to the chamber 332 which is downstream of a flow restrictor 331 is equal to the LOCK-UP CLUTCH pressure Pc1 and is used as the pilot pressure Pso13. However, when the valve 330 is OFF or open, the above-indicated portion of the line connected to the chamber 332 is drained, whereby the chamber 332 is drained. The flow restrictor 331 and the third solenoid-operated valve 320 constitute means for producing the pilot pressure Pso13, which is applied to the chamber 332 of the lock-up clutch control valve 320, and to the second line pressure reducing control valve 380, lock-up clutch rapid release valve, and REVERSE INHIBIT valve 420.

While the third solenoid-operated valve 330 is ON with the shift lever 252 placed in one of the positions other than the REVERSE position "R", therefore, the pilot pressure Pso13 is applied to the chamber 332 of the valve 330, while the chamber 334 is exposed to the atmospheric pressure, whereby the spool 326 is moved to its stroke end on the side of the spring 328. Consequently, the fluid in the lock-up clutch line 92 is supplied to the engaging line 322, and the lock-up clutch 36 is engaged. With the valve 330 turned OFF, on the other hand, the chamber 332 is exposed to the atmospheric pressure, and the spool 326 is moved under the biasing action of the spring 328, to the other stroke end (lower end as viewed in FIG. 2). Consequently, the fluid in the line 92 is supplied to the releasing line 324, and the lock-up clutch 36 is released.

When the shift lever 252 is operated to the REVERSE position "R", the third line pressure Pl3 is applied to the chamber 334, whereby the spool 326 is moved to its lower stroke end (as viewed in FIG. 2) to release the lock-up clutch 36, irrespective of the ON-OFF state of the third solenoid-operated valve 330, since a sum of the biasing force of the spring 328 and a force based on the pressure Pl3 exceeds a force based on the pilot pressure Pso13 acting on the spool 326.

The fluid discharged through a flow restrictor 336 upon engagement of the lock-up clutch 36, and the fluid which is returned from the clutch 36 through the engaging line 322 and discharged from the valve 320 upon releasing of the clutch 36, are regulated by a cooler pressure control valve 338 so that the pressure of the discharged fluid is lowered to a suitable level. The fluid whose pressure is thus adjusted by the valve 338 is returned to an oil reservoir (not shown) via an oil cooler 339.

There will next be described the manner in which the back pressures of the accumulators 342, 340 for the FORWARD clutch 72 and REVERSE brake 70 are controlled.

Figure 15:
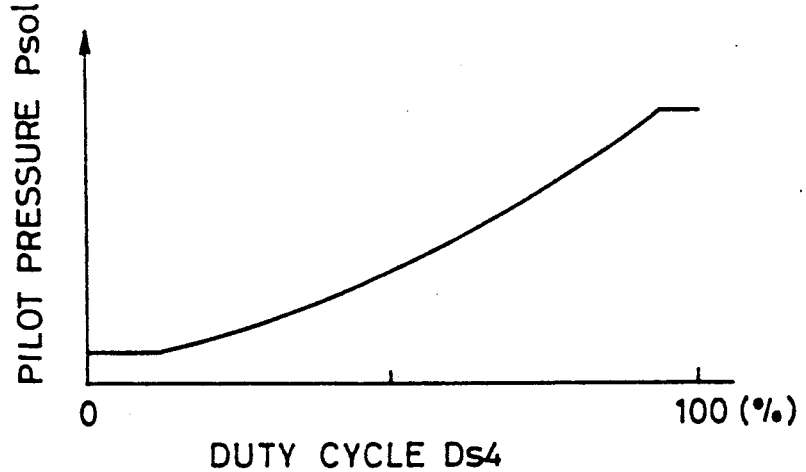
FIG. 15 is a graph indicating a relationship between the duty cycle of a fourth solenoid valve of the apparatus of FIG. 2 and a pilot pressure continuously changed with the duty cycle.
Figure 16:
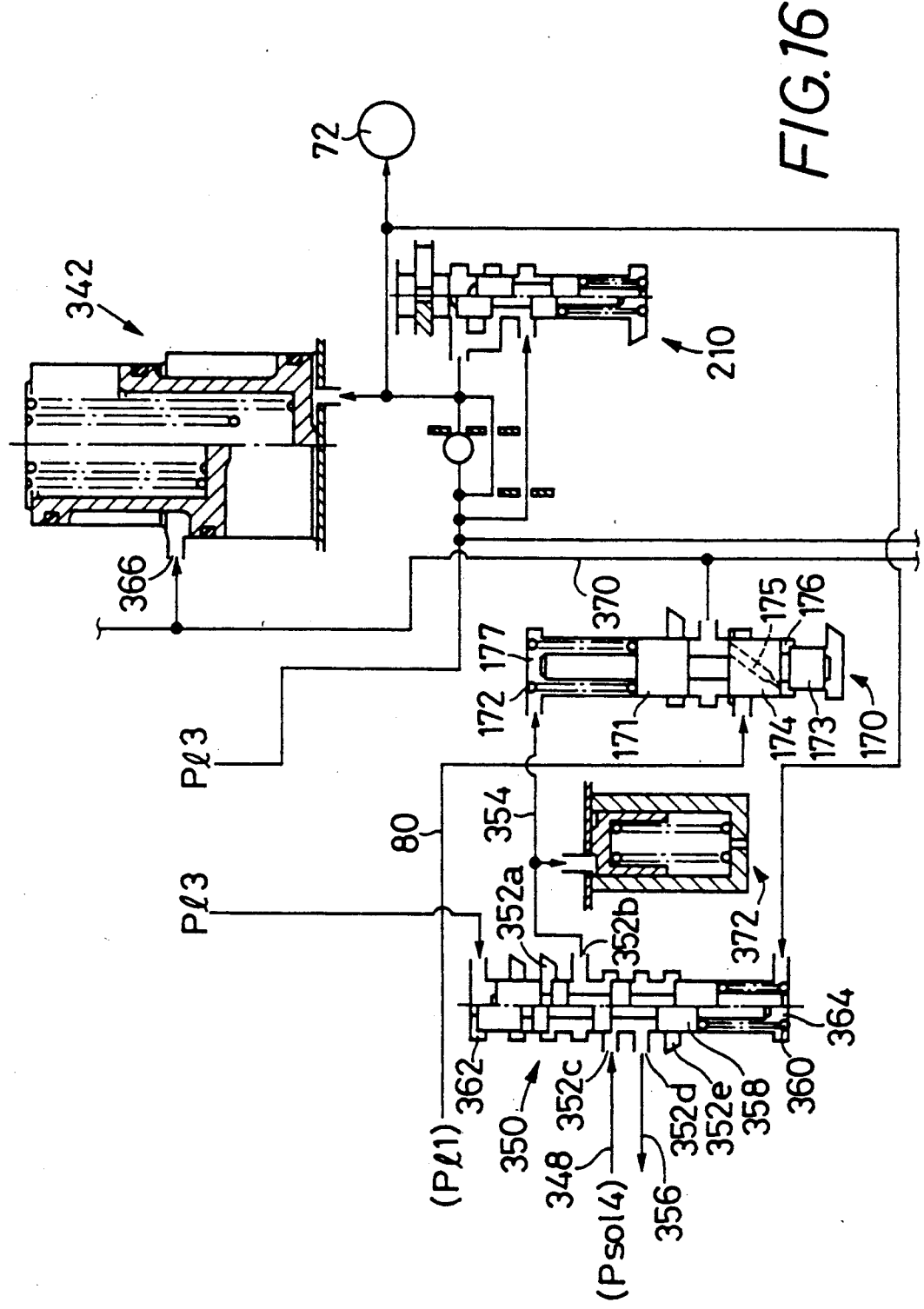
FIG. 16 is a view showing in detail a pilot pressure switch valve and the fourth solenoid valve of the apparatus of FIG. 2.

The lock-up clutch line 92 is connected through a flow restrictor 344 to a normally open fourth solenoid-operated valve 346, so that the pressure downstream of the restrictor 344 is regulated as a pilot pressure Pso14 in relation to the duty cycle Ds4 of the solenoid-operated valve 346, as indicated in FIG. 15. Namely, the restrictor 44 and the fourth solenoid-operated valve 346 constitute means for producing the pilot pressure Pso14. This pilot pressure Pso14 thus adjusted by the controlled duty cycle Ds4 of the solenoid-operated valve 246 is applied to a pilot pressure switch valve 350 through a line 348. As shown in FIG. 16, the switch valve 350 has a drain port 352a, a port 352b communicating with a line 354, a port 352c communicating with the line 348, a port 352d communicating with a line 356, and a drain port 352e. The switch valve 350 further has a valve spool 358 slidably movable between a first position corresponding to one end (upper end as viewed in FIG. 16) of the operating stroke, and a second position corresponding to the other end (lower end as viewed in FIG. 16) of the operating stroke. The spool 358 is biased by a spring 360 toward the first position. Adjacent to the upper end of the spool 358, there is formed a chamber 362 which is always exposed to the third line pressure Pl3. Adjacent to the lower end of the spool 358 (on the side of the spring 360), there is formed a chamber 364 adapted to receive the pressure in the FORWARD clutch 72. When the shift lever 252 is placed in one of the PARKING, REVERSE and NEUTRAL positions "P", "R" and "N", the hydraulic cylinder of the FORWARD clutch 72 is drained by the shift lever valve 250, whereby the chamber 364 is drained. As a result, the valve spool 358 is moved to the second position by the third line pressure Pl3 in the chamber 362, whereby the ports 352c and 352b are connected to each other, while the ports 352d and 352e are connected to each other. Consequently, the pilot pressure Pso14 is applied to a chamber 177 of the fourth pressure regulating valve 170 through the line 354, and the line 356 is drained. When the shift lever 252 is operated from the NEUTRAL position "N" to the DRIVE, SECOND or LOW position "D", "S" or "L", however, the pressure in the cylinder of the FORWARD clutch 72 is initially raised as a function of time under a pressure absorbing action of the accumulator 342, so that the pressure in the clutch 72 reaches the third line pressure Pl3 when the clutch 72 is completely engaged. It will be understood, therefore, that the pilot pressure Pso14 in the line 348 is applied to the fourth pressure regulating valve 170 via the pilot pressure switch valve 350 before the clutch 72 is completely engaged or the pressure in the chamber 364 reaches the third line pressure Pl3. After the clutch 72 is fully engaged (after the pressure in the chamber 364 is elevated up to the level of the third line pressure Pl3), the spool 358 is moved to the first position, whereby the ports 352b and 352a are connected to each other while the ports 352c and 352d are connected to each other. As a result, the line 354 is drained, and the pilot pressure Pso14 in the line 348 is applied to the second line pressure reducing control valve 380 and lock-up clutch rapid release valve 400, through the switch valve 350 and line 356.

The back pressures of the accumulators 340, 342 are controlled in order to limit a rate of rise in the pressures in the cylinders of the clutch 72 and brake 70, for thereby reducing engaging shocks of the clutch 72 and brake 70, when the shift lever 252 is operated from the NEUTRAL position "N" to the DRIVE position "D" or REVERSE position "R". To this end, the fourth pressure regulating valve 170 is adapted to regulate the fourth line pressure Pl4 which is applied through a fourth pressure line 370 to back pressure ports 366 and 368 of the accumulators 342, 340 for the clutch 72 and brake 70. That is, the fourth pressure regulating valve 170 functions to control the pressure absorbing functions of the accumulators 342, 340, so as to minimize the engaging shocks of the clutch 72 and brake 70.

The fourth pressure regulating valve 170 has a valve spool 171 for selective connection and disconnection of the first pressure line 80 to and from the fourth pressure line 370. The spool 171 is biased by a spring 172 toward its open position, and has a first land 173 and a second land 174. Between the lands 173, 174, there is formed a chamber 176 which is adapted to receive as a feedback pressure the fourth line pressure Pl4 through a flow restrictor 175. Adjacent to one end of the spool 171 on the side of the spring 172, there is formed a chamber 177 adapted to receive the pilot pressure Pso14, such that the pressure Pso14 biases the spool 171 toward the open position. The other end of the spool 171 is exposed to the atmospheric pressure. In the thus constructed fourth pressure regulating valve 170, the spool 171 is moved to a position of equilibrium of a valve closing force based on the feedback pressure corresponding to the fourth line pressure Pl4, and a sum of the valve opening biasing force of the spring 172 and a valve opening force based on the pilot pressure Pso14. As a result, the fourth line pressure Pl4 is adjusted in relation to the pilot pressure Pso14.

Figure 17:
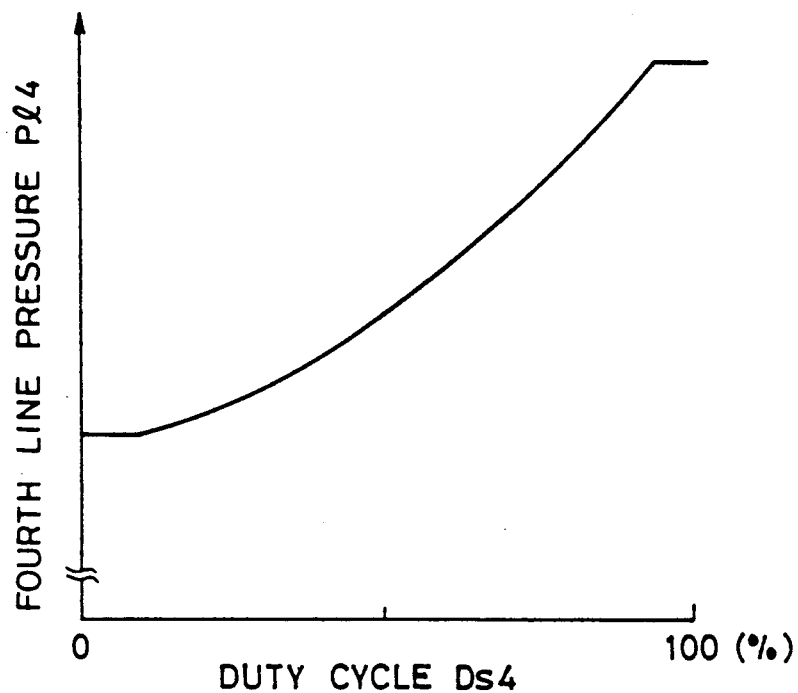
FIG. 17 is a graph indicating a relationship between the duty cycle of the fourth solenoid valve and a fourth line pressure continuously changed with the duty cycle.

Described more specifically, while the pilot pressure Pso14 acts on the fourth pressure regulating valve 170 through the pilot switch valve 350 upon shifting of the shift lever 252 from the position "N" to the position "D" or "R", the fourth line pressure Pl4 is regulated in relation to the duty cycle Ds4 of the fourth solenoid-operated valve 346, as indicated in FIG. 17. In other words, the duty cycle Ds4 of the valve 346 is controlled so as to control the back pressures of the accumulators 342, 340, for minimizing the engaging shocks of the clutch 72 and brake 70. When the pressure in the cylinder of the clutch 72 rises to the third line pressure Pl3, the pilot pressure Pso14 which has been applied to the fourth pressure regulating valve 170 is cut off by the pilot switch valve 350, whereby the chamber 177 is exposed to the atmosphere, and the fourth line pressure Pl4 is regulated to a relatively low level in the neighborhood of 4 kg/cm$^2$, which corresponds to the biasing force of the spring 172 biasing the spool 171 toward the open position. The thus regulated fourth line pressure Pl4 is used primarily for controlling the directional and flow control valves 262, 264 of the shift control valve assembly 260. An accumulator 372 is connected to the line 354, for the purpose of absorbing the pulsation of the pilot pressure Pso14 which would arise in relation to the frequency of the drive pulses to activate the fourth solenoid-operated valve 346 under a controlled duty cycle.

Referring back to FIG. 2, the second line pressure reducing control valve 380 is provided to protect the transmission belt 44 against an overload due to a pressure rise in the driven side hydraulic cylinder 54, 56, which pressure rise is caused by a centrifugal force during rotation of the driven side pulley 40, 42. Described more specifically, when the vehicle is running at a high speed with the output shaft 38 of the CVT 14 rotating at a high speed, the control valve 380 primarily functions to reduce the second line pressure Pl2 applied to the driven side cylinder, for example, the second cylinder 56. The control valve 380 has a port 382a communicating with a line 356, a port 382b communicating with the pressure-reducing chamber 136 of the second pressure regulating valve 102 through a line 384, and a drain port 382c. The valve 380 further has a valve spool 386 which is slidably movable between a first position corresponding to one end (upper end as viewed in FIG. 2) of the operating stroke, and a second position corresponding to the other end (lower end as viewed in FIG. 2) of the stroke. This valve spool 386 is biased by a spring 388 toward the second position. When the third solenoid-operated valve 330 is OFF (open), a chamber 390 formed adjacent to the lower end of the spool 386 corresponding to the second position is drained, whereby the spool 386 is moved to the second position. As a result, the ports 382b and 382c are connected to each other, and the chamber 136 of the second pressure regulating valve is drained, whereby the second line pressure Pl2 is regulated according to the equation (1) indicated above.

When the third solenoid-operated valve 330 is turned ON (closed), on the other hand, the pilot pressure Pso13 (LOCK-UP CLUTCH pressure Pc1) is applied to the chamber 390 of the control valve 380, and the spool 386 is moved to the first position. As a result, the ports 382a and 382b are connected to each other. If the fourth solenoid-operated valve 346 is ON (closed) and the FORWARD clutch 72 is engaged at this time, the LOCK-UP CLUTCH pressure Pc1 is applied to the chamber 136 of the second pressure regulating valve 102 through the line 356, ports 382a, 382b, and line 384. Since this LOCK-UP CLUTCH pressure Pc1 biases the spool 110 of the valve 102 toward the closed position, the second line pressure Pl2 is regulated according to the following equation (3):

$$Pl2 = [A4 \cdot Pth + W - A1 \cdot Pe - (A2 - A1) \cdot Pc1]/(A3 - A2) \qquad (3)$$

Figure 18:
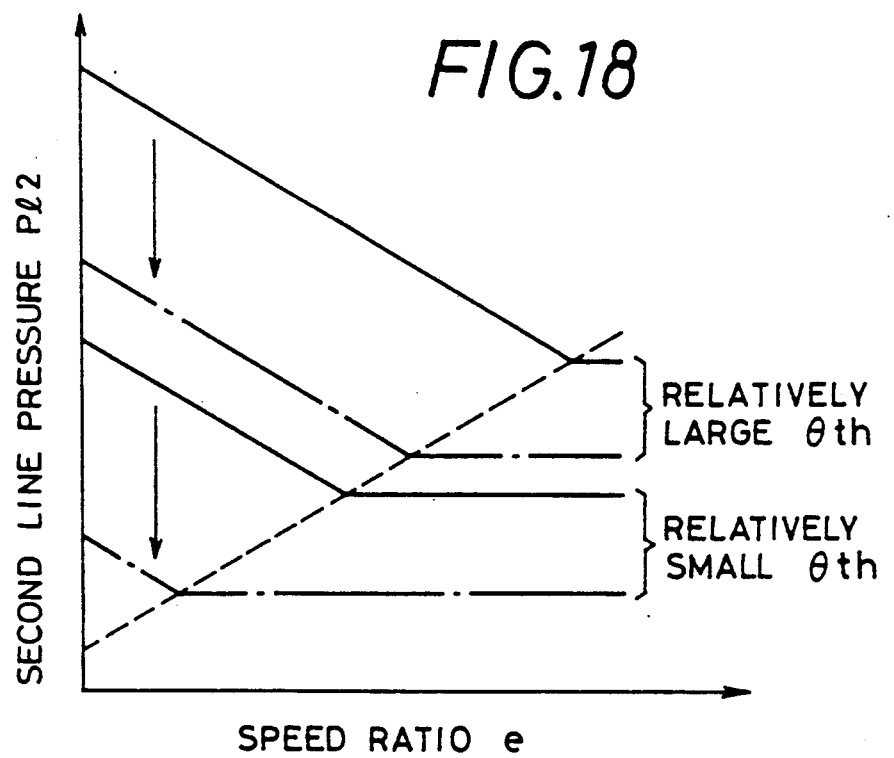
FIG. 18 is a graph indicating the second line pressure which varies with the running speed of the vehicle.

The second line pressure Pl2 as regulated according to the above equation (3) as indicated in one-dot chain lines in FIG. 18 is lowered with respect to the normally regulated second line pressure as indicated in solid lines. Namely, when the vehicle running speed exceeds a predetermined upper limit, the third and fourth solenoid-operated valves 330 and 346 are both turned ON (closed) to lower the second line pressure Pl2. Thus, second line pressure reducing control valve 380 eliminates or minimizes an adverse effect of an excessive rise in the pressure in the second cylinder 56 (driven side cylinder) due to the centrifugal force when the vehicle speed is relatively high. In other words, the control valve 380 prevents an excessive increase in the tension of the transmission belt 44 even when the driven side shaft (output shaft 38) of the CVT 14 is rotated at a relatively high speed.

In the present embodiment, the pilot pressure Pso14 which is applied to the chamber 136 of the second line pressure reducing control valve 380 upon energization of the third and fourth solenoid-operated valves 330 and 346 is used to bias the spool 110 of the second pressure regulating valve 102 so that the spool is moved to the closed position for reducing the second line pressure Pl2 applied to the driven side hydraulic cylinder of the CVT 14. It is noted that even when the third solenoid-operated valve 330 is ON (energized), the second line pressure Pl2 is normally regulated according to the equation (1), rather than the equation (3), if the fourth solenoid-operated valve 346 remains OFF.

There will next be described the lock-up clutch rapid release valve 400 provided to improve the releasing response of the lock-up clutch 36 of the fluid coupling 12.

The rapid release valve 400 has a port 402a communicating with the lock-up clutch line 92, a port 402b communicating with the chamber 316 formed adjacent to the end face of the plunger 317 of the lock-up pressure regulating valve 310, a drain port 402c, a port 402d communicating with the engaging line 322 leading to the lock-up clutch 36, a valve spool 406 slidably movable between a first position corresponding to one end (upper end) of the operating stroke and a second position corresponding to the other end (lower end) of the operating stroke, and a spring 408 biasing the spool 406 toward the second position Adjacent to the lower end of the spool 406, there is formed a chamber 410 adapted to receive the LOCK-UP CLUTCH pressure Pc1 when the fourth solenoid-operated valve 346 is ON with the FORWARD clutch 72 being engaged. When the valve 346 is OFF, the chamber 410 is drained. Adjacent to the upper end of the spool 406 on the side of the spring 408, there is formed a chamber 412 adapted to receive the pilot pressure Pso13 (LOCK-UP CLUTCH pressure Pc1) when the third solenoid-operated valve 330 is ON. The chamber 412 is drained when the valve 330 is OFF.

The lock-up clutch rapid release valve 400 is controlled by the third and fourth solenoid-operated valves 330, 346, such that the valve spool 406 is moved to the first position only when the third solenoid-operated valve 330 is OFF while the fourth solenoid-operated valve 346 is ON. In the first position, the LOCK-UP CLUTCH pressure Pc1 is applied to the chamber 316 of the lock-up pressure regulating valve 310 through the ports 402a, 402b and line 404, whereby the LOCK-UP CLUTCH pressure Pc1 is increased while the fluid discharged from the engaging chamber 33 of the fluid coupling 12 through the engaging line 322 is fed to the drain through the ports 402d and 402c. As a result, the lock-up clutch 36 is rapidly released or disengaged.

When the third and fourth solenoid-operated valves 330, 346 are placed in the other combination of operating states, the spool 406 of the rapid release valve 400 is placed in the second position. In this position, not only the valve 400 functions to reduce the resistance to flow of the fluid out of the engaging chamber 33 of the fluid coupling 12, but also the lock-up pressure regulating valve 310 functions to increase the LOCK-UP CLUTCH pressure Pc1 applied to the releasing chamber 35 of the fluid coupling 12. This arrangement therefore permits a rapid releasing operation of the lock-up clutch 36 when the third solenoid-operated valve 330 is turned OFF and the fourth solenoid-operated valve 346 is turned ON.

The REVERSE INHIBIT valve 420 is provided to inhibit the reversing device 16 from being placed in the reverse position with the REVERSE brake 70 engaged, when the vehicle is running in the forward direction. This valve 420 has a port 422a adapted to receive the third line pressure Pl3 from the output port 256 of the shift lever valve 250 when the valve 250 is placed in the REVERSE position "R". The REVERSE INHIBIT valve 420 further has a port 422b communicating with the cylinder of the REVERSE brake 70 through a line 423, and a drain port 422c. The valve 420 includes a valve spool 424 slidably movable between a first position corresponding to one end (upper end) of the operating stroke and a second position corresponding to the other end (lower end) of the operating stroke. The spool 424 is biased by a spring 426 toward the first position. Adjacent to the upper end of the spool 424, there is formed a chamber 428 adapted to receive the pilot pressure Pso13 (LOCK-UP CLUTCH pressure Pc1) through the line 430 when the third solenoid-operated valve 330 is ON. When the valve 330 is OFF, the chamber 428 is drained. Adjacent to the lower end of the spool 424 (on the side of the spring 426), there is formed a chamber 432 adapted to receive the third line pressure Pl3 from the output port 258 of the shift lever valve 250 when the valve 250 is placed in the DRIVE, SECOND or LOW position "D", "S", "L".

In the REVERSE INHIBIT valve 420, the valve spool 424 is moved to the second position when the third line pressure Pl3 in the chamber 432 is released and the pilot pressure Pso13 (LOCK-UP CLUTCH pressure Pc1) is applied to the chamber 428. In this second position, the ports 422a and 422b are disconnected from each other, to thereby cut off the fluid supply to the REVERSE brake 70, while the ports 422c and 422b are connected to each other, to thereby cause the cylinder of the brake 70 to be drained. As a result, the REVERSE brake 70 is inhibited from being engaged. Namely, the REVERSE INHIBIT valve 420 prevents the reversing device 16 from being placed in the reverse position, even when the shift lever 252 is erroneously moved from the DRIVE position "D" to the REVERSE position "R" past the NEUTRAL position "N" while the vehicle is running in the forward direction. In this event, an electronic control device 460 (which will be described by reference to FIG. 1) commands the third solenoid-operated valve 330 to be turned ON, to thereby cause the reversing device 16 to be placed in the neutral position.

The first line pressure reducing control valve 440 is provided to lower the first line pressure Pl1 by a suitable amount to thereby reduce the operating noise of the belt 44, when the shift lever valve 250 (shift lever 252) is placed in the NEUTRAL or PARKING position "N" or "P". This control valve 440 has a drain port 442a, a port 442b communicating with the chamber 160 between the first and second lands 152, 154 of the first pressure regulating valve 100 through the line 161, a port 442c communicating with the second pressure line 82, a plunger 444, and a valve spool 446 for selective connection and disconnection of the second pressure line 82 to and from the chamber 160 of the valve 100. The spool 446 is biased by a spring 448 toward its open position. Adjacent to the lower end face of the plunger 444, there is formed a chamber 450 which communicates with the output port 258 of the shift lever valve 250 from which the third line pressure Pl3 is applied when the shift lever valve 250 is placed in the DRIVE, SECOND or LOW position "D", "S", "L". Between the plunger 444 and the spool 446, there is formed a chamber 452 which communicates with the output port 256 of the valve 250 from which the third line pressure Pl3 is applied when the valve 250 is placed in the REVERSE position "R".

When the shift lever valve 250 is placed in one of the positions "D", "S", "L" and "R", the spool 446 of the control valve 440 is located at the upper stroke end, whereby the chamber 160 of the first pressure regulating valve 100 is exposed to the atmosphere through the drain port 442a. As a result, the first line pressure Pl1 is normally regulated according to the equation (2) indicated above. When the shift lever valve 250 is operated to the NEUTRAL or PARKING position "N", "P", on the other hand, the spool 446 is moved to its lower stroke end, and the second line pressure Pl2 is applied to the chamber 160 of the first pressure regulating valve 100. As a result, the spool 140 of the valve 100 is biased toward the open position by the second line pressure Pl2 in the chamber 160, whereby the first line pressure Pl1 is lowered. Thus, the tension of the belt 44 is minimized to the extent that prevents the belt 44 from slipping on the pulleys 40, 42. Accordingly, the operating noise of the belt 44 is reduced, and the durability of the belt is improved.

Referring back to FIG. 1, there is indicated the above-indicated electronic control device 460, which serves as control means for controlling the first, second, third and fourth solenoid-operated valves 266, 268, 330, 346 incorporated in the hydraulic circuit shown in FIG. 2, for controlling the speed ratio "e" of the CVT 14, the lock-up clutch 36 of the fluid coupling 12, and the other elements of the power transmitting system of the vehicle. The electronic control device 460 includes a so-called microcomputer which incorporates a central processing unit (CPU), a random-access memory and a read-only memory, as well known in the art.

The control device 460 receives various signals from various sensors, such as: a VEHICLE speed sensor 462 disposed to detect the rotating speed of the drive wheels 24, and generating a vehicle speed signal representative of the detected speed, i.e., a running speed V of the vehicle; an INPUT SHAFT speed sensor 464 disposed to detect the rotating speed of the input shaft 30 of the CVT 14, and generating an input shaft speed signal representative of the detected speed Nin of the input shaft 30; an OUTPUT SHAFT speed sensor 466 disposed to detect the speed of the output shaft 38 of the CVT 14, and generating an output shaft speed signal representative of the detected speed Nout of the output shaft 38; a THROTTLE sensor 468 disposed to detect an angle of opening of the throttle valve disposed in a suction pipe of the engine 10, and generating a throttle signal representative of the opening angle $\theta$th of the throttle valve; a SHIFT LEVER sensor 470 disposed to detect the currently selected operating position of the shift lever 252, and generating a signal representative of the currently selected position Ps of the shift lever 252; and a BRAKE switch 472 disposed to detect an operation of a brake pedal of the vehicle, and generating a signal indicative of the operation of the brake pedal. The CPU of the electronic control device 460 processes these input signals according to control programs stored in the ROM, while utilizing a temporary data storage function of the RAM, and applies appropriate drive or control signals to the first, second, third and fourth solenoid-operated valves 266, 268, 330 and 346.

Upon application of power to the control device 460, a main control routine is executed after the initialization of the device. In the main control routine, the speeds Nin and Nout of the input and output shafts 30, 38, speed ratio "e" of the CVT 14, the vehicle running speed V and other running parameters of the vehicle are calculated based on the input signals received from the various sensors indicated above. Further, the lock-up clutch 36 and the CVT 14 are suitably controlled, in a controlled sequence or as needed, based on the received input signals.

Figure 19:
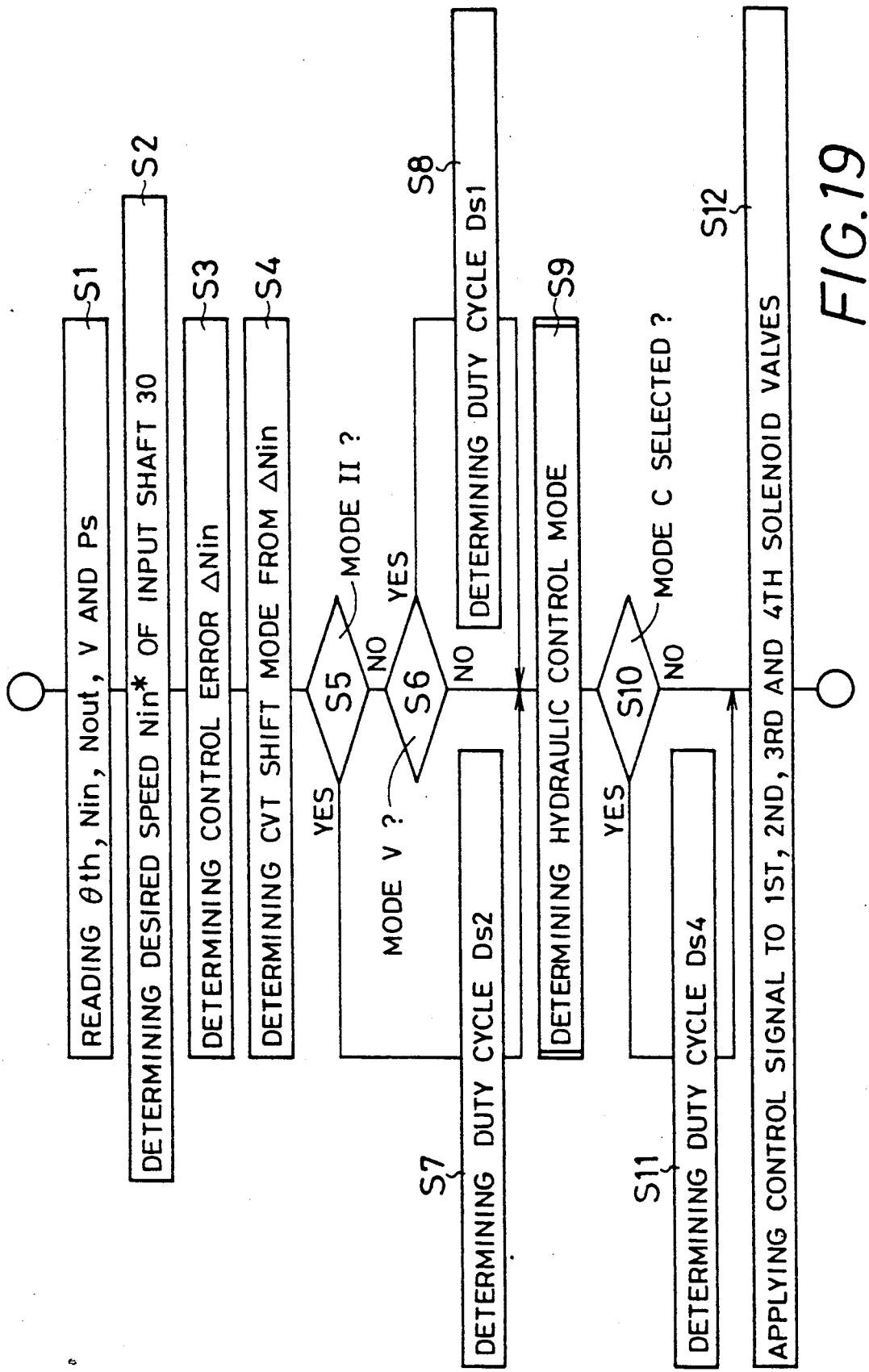
FIG. 19 is a flow chart illustrating an operation of the hydraulic control apparatus of FIG. 2.

The shifting operations of the CVT 14 are controlled, for example, according to a control program as illustrated in the flow chart of FIG. 19.

Initially, step S1 is executed to read in the various input signals from the various sensors, and to calculate the vehicle running speed V, speeds Nin and Nout of the input and output shafts 30, 38, throttle opening angle $\theta$th, and currently selected position Ps of the shift lever 252, based on the received input signals. Then, the control flow goes to step S2 in which a desired or target speed Nin* of the input shaft 30 is determined based on the shift lever position Ps, throttle opening angle $\theta$th and vehicle running speed V, more precisely, according to a predetermined relationship represented by a functional equation Nin*=f($\theta$th, V, Ps) or by the corresponding data map. This relationship, which is stored in the ROM of the control device 460, is determined for each of the DRIVE, SECOND and LOW positions "D", "S" and "L" of the shift lever 252, so that the relevant relationship provides a currently required output of the engine 10 represented by the throttle opening angle $\theta$th, with a minimum fuel consumption by the engine. When the shift lever 252 is placed in the SECOND or LOW position "S", "L", it is generally required or desirable that the vehicle runs in a sporty manner with high drivability, and with a relatively high effect of engine-braking. In view of this requirement, the relationship used for the SECOND or LOW position is determined so that the desired input shaft Nin* is higher than that for the DRIVE position, or so that the speed ratio "e" is comparatively low. While the present power transmitting system (shift lever 250 and shift lever valve 250) has the three forward drive positions, DRIVE (D), SECOND (S) and LOW (L), the forward drive positions may be determined otherwise. For example, three or more forward drive positions may be provided in addition to the DRIVE position.

In the following step S3, the CPU of the control device 460 determines a control error $\Delta$Nin (=Nin*-- Nin) which is a difference between the speed Nin of the input shaft 30 actually detected by the sensor 464 and the determined desired speed Nin*. Step S3 is followed by step S4 to determine or select one of six shift modes I, II, III, IV, V and VI as indicated in the table of FIG. 10, based on the determined control error $\Delta$Nin, more specifically, depending upon one of six ranges of the control error amount $\Delta$Nin as indicated by hatched areas in the right-hand side portion of FIG. 10. The adjacent ranges of the error amount $\Delta$Nin overlap each other at their end portions, so as to avoid control instability when the corresponding adjacent shift modes (as indicated in FIG. 10) are repeatedly alternately selected under some conditions. If the currently detected control error ΔNin falls within the overlapping area of the two adjacent ranges, the currently selected shift mode remains to be selected. For example, if the detected control error ΔNin is reduced from 250 rpm (within the range corresponding to the shift mode II) to 140 rpm within the overlapping area between the ranges corresponding to the shift modes II and III while the shift mode II is selected, the currently selected shift mode is continuously selected. If the control error ΔNin is changed to a value falling within the overlapping area between the ranges corresponding to the shift modes II and III while the shift mode III is selected, the shift mode III is continuously used.

After the shift mode is selected or determined, step S5 is executed to determine whether the shift mode II is currently selected or not, and then step S6 is executed to determine whether the shift mode V is currently selected or not. If the shift mode II has been selected in step S4, an affirmative decision (YES) is obtained in step S5, and the control flow goes to step S7 in which the duty cycle Ds2 of the second solenoid-operated valve 268 is calculated according to the following equation (4). If the shift mode V has been selected in step S4, an affirmative decision (YES) is obtained in step S6, and the control flow goes to step S8 in which the duty cycle Ds2 of the valve 268 is determined according to the following equation (5):

$$Ds2 = 100\% - K1 \cdot \Delta Nin \quad (4)$$

$$Ds2 = 100\% - K2 \cdot \Delta Nin \quad (5)$$

where, K1, K2: Constants

These two different equations (4) and (5) are used for determining the duty cycle Ds2, since the flow characteristic of the flow control valve 264 with respect to the duty cycle Ds2 differs between the shift modes II and V. The graph of FIG. 20 indicates the flow characteristic of the valve 264 when the shift mode II (MEDIUM SHIFT DOWN mode) is selected with the first solenoid-operated valve 266 placed in the ON position, while the graph of FIG. 21 indicates the flow characteristic when the shift mode V (MEDIUM SHIFT UP mode) is selected with the valve 266 placed in the OFF position. The flow rate Q shown in these graphs of FIGS. 20 and 21 is that of the fluid flowing through a passage connecting the two output ports 286b and 286e of the flow control valve 266 when the fluid pressure is held constant.

Figure 20:
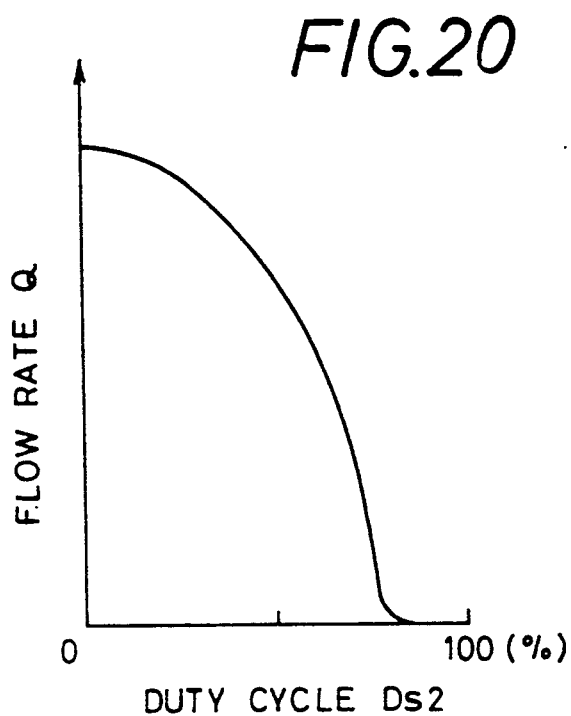
FIGS. 20 and 21 are graphs indicating relationships between the duty cycle of the second solenoid valve, and the flow rate of the flow control valve of the shift control valve assembly, which varies with the duty cycle, where the CVT speed ratio changes to reduce and increase the vehicle speed, respectively.
Figure 21:
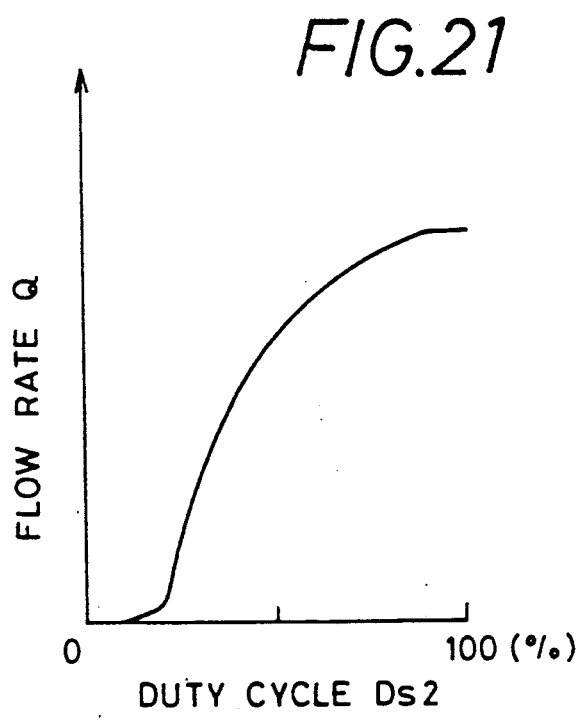

Thus, when the second solenoid-operated valve 268 is turned ON while the first solenoid-operated valve 266 is ON, the flow control valve 264 is fully closed, whereby the flow rate Q is reduced with an increase in the duty cycle Ds2, as indicated in FIG. 20. When the valve 268 is turned ON while the valve 266 is OFF, the flow control valve 264 is fully opened, whereby the flow rate Q is increased with the duty cycle Ds2, as indicated in FIG. 21.

The first and second solenoid-operated valves 266 and 268 are operated in step Sl2 (which will be described in detail), according to the ON-OFF states determined by the shift mode selected in step S4, and according to the duty cycle Ds2 determined in step S7 or S8 (for the second solenoid-operated valve 268 only). The duty cycling operation of the second solenoid-operated valve 268 in the shift modes II and V is effected by alternately turning on and off the solenoid coils in a predetermined cycle time Td, with an ON time Td·Ds2/100 and an OFF time Td·(1Ds2/100). The duty cycle Ds2 of the valve 268 determined according to the equation (4) or (5) causes the flow rate Q of the flow control valve 264 to increase as a function of the amount of control error ΔNin, so that the flow rate Q is controlled so as to reduce the amount of control error ΔNin. Consequently, the actually detected speed Nin eventually coincides with the determined desired or target speed Nin* by controlling the flow control valve 264 in step S12, with the second solenoid-operated valve 268 operated with the duty cycle Ds2 determined in step S7 or S8. Thus, the feedback control of the flow control valve 264 for controlling the speed ratio "e" of the CVT 14 is effected.

Figure 22:
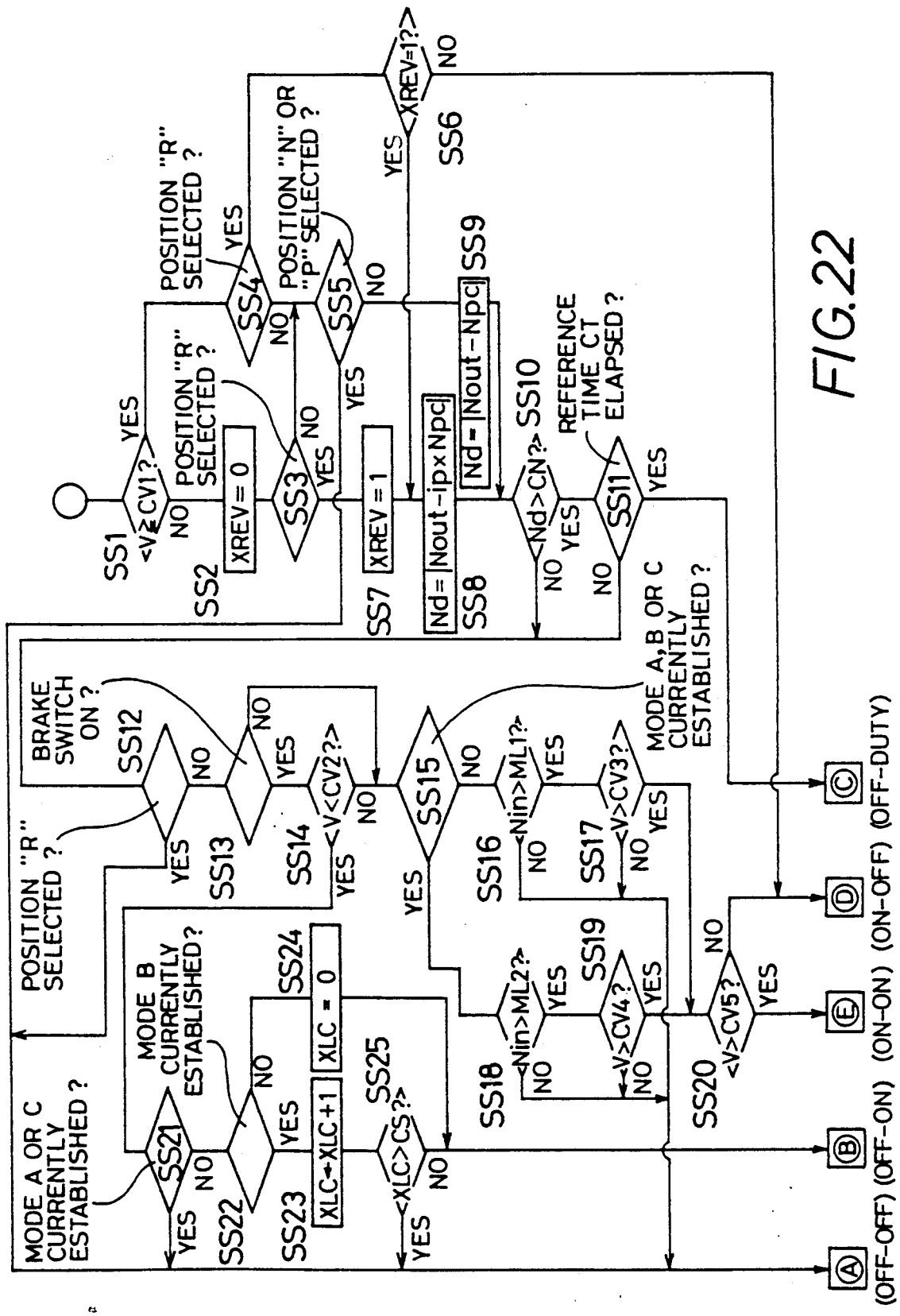
FIG. 22 is a flow chart illustrating a control routine executed in step S9 of the flow chart of FIG. 19.

Steps S7, S6 and S8 are followed by step S9 to determine or select one of five hydraulic control modes A, B, C, D and E which are established by the third and fourth solenoid-operated valves 330 and 346, as indicated in the table of FIG. 23, that is, LOCK-UP CLUTCH RELEASE mode A, LOCK-UP CLUTCH RAPID RELEASE mode B, ACCUMULATOR BACK PRESSURE CONTROL mode C, REVERSE INHIBIT mode D and 2ND LINE PRESSURE REDUCTION mode E. This mode determining routine is effected as indicated in the flow chart of FIG. 22, for example. In FIG. 22, steps SS1 through SS7 relate to the REVERSE INHIBIT mode D.

Initially, step SS1 is executed to determine whether or not the detected vehicle running speed V is equal to or higher than a predetermined reference value Cv1 stored in the ROM of the control device 460. This reference value Cv1, which is set at about 7-10 km/h, is used to determine whether the vehicle running speed V is higher than the level above which the shock produced by the operation of the reversing device 16 to its reverse position will cause a slip of the belt 44. If the vehicle speed V is lower than the reference value Cv1, step SS1 is followed by step SS2 to reset a flag XREV to zero, and step SS3 to determine whether the shift lever 252 is placed in the REVERSE position "R" or not. If the lever 252 is placed in the position "R", step SS7 is executed to set the flag XREV to "1". That is, the flag XREV is set to "1" when the vehicle is started in the REVERSE position "R", and set to "0" when the vehicle is started in the position other than the REVERSE position "R".

If the vehicle running speed V rises to the reference value Cv1, an affirmative decision (YES) is obtained in step SS1, and the control flow goes to step SS4 to determine whether the shift lever 252 is placed in the REVERSE position "R", or not. If not, it is not necessary to effect an operation in the REVERSE INHIBIT mode D. In this case, step SS5 is executed to determine whether or not the shift lever 252 is placed in the NEUTRAL or PARKING position "N", "P". If an affirmative decision (YES) is obtained in step SS5, the LOCK-UP CLUTCH RELEASE mode A is established, for releasing the lock-up clutch 36. As indicated in FIG. 23, the LOCK-UP CLUTCH RELEASE mode A is established by turning OFF both of the third and fourth solenoid-operated valves 330, 346. In this mode, the lock-up clutch 36 is released irrespective of the vehicle running speed V.

If a negative decision (NO) is obtained in step SS5, that is, if the shift lever 252 is placed in any one of the forward drive positions "D", "S" and "L", step SS9 is executed. If an affirmative decision (YES) is obtained in step SS4, i.e., if the REVERSE position "R" is selected, step SS6 is executed to determine whether the flag XREV is set at "1" or not. If the flag XREV is set at "1", this means that the position "R" remains selected, and therefore step SS8 is executed. If the flag XREV is not set at "1", i.e., is set at "0", this means that the shift lever 252 is operated from any forward drive position "D", "S" or "L" to the REVERSE position "R", and therefore the REVERSE INHIBIT mode D is established. Thus, steps SS1, SS2, SS4 and SS6 correspond to means for detecting that the shift lever 252 is operated from one of the forward drive positions "D", "S" and "L" to the REVERSE position "R".

If the shift lever 252 is operated from the DRIVE position "D" to the NEUTRAL position "N" and then to the REVERSE position "R" while the vehicle is running at a comparatively high speed not lower than the reference value Cv1, the negative decision (NO) is obtained in step SS6, and the REVERSE INHIBIT mode D is selected as described above. This mode D is established by turning OFF the third and fourth solenoid-operated valves 330 and 346. In this mode, the REVERSE INHIBIT valve 420 inhibits the supply of the fluid to the REVERSE brake 70, to thereby prevent the reversing device 16 from being brought to the reverse position, even if the shift lever 252 is operated to the REVERSE position "R".

As indicated above, the flag XREV is set to "1", if the vehicle is started with the shift lever 252 placed in the REVERSE position "R", and the vehicle speed V reaches the reference value Cv1, or if the shift lever 252 is operated to the REVERSE position "R" after the shift lever is once operated to the NEUTRAL position "N" at the vehicle speed V not lower than the reference value Cv1. Accordingly, the affirmative decision (YES) is obtained in step SS6, whereby the ACCUMULATOR BACK PRESSURE CONTROL mode C or LOCK-UP CLUTCH RELEASE mode A is eventually established. In these modes C and A, the third solenoid-operated valve 330 is turned OFF, and the reversing device 16 is permitted to be placed in the reverse position.

In the situations where the REVERSE INHIBIT mode D is not established and neither the position "N" nor position "P" is selected, step SS8 is executed if the position "R" is selected, and step SS9 is executed if the position "D", "S" or "L" is selected. In these steps SS8 and SS9, a difference Nd between the input and output shafts 38, 58 of the reversing device 16 is calculated, according to the following equations (6) and (7), respectively:

$$Nd = |Nout - Ip \cdot Npc| \quad (6)$$

$$Nd = Nout - Npc \quad (7)$$

where,
Nout: rotating speed of output shaft 38 of CVT 14
Npc: rotating speed of carrier 60 of device 16
Ip: gear ratio of the device 16 when placed in the reverse position The value Npc is obtained according to the following equation (8) based on the vehicle speed V, and the value Ip is obtained according to the following equation (9), based on the values Nout and Npc when the REVERSE brake 70 is fully engaged:

$$Npc = C/V \quad (8)$$

$$Ip = Nout/Npc \quad (9)$$

where, C: constant

Steps SS8 and SS9 are followed by step SS10 to determine whether the speed difference Nd calculated as described above is larger than a reference value $C_N$ stored in the ROM, or not. This reference value $C_N$, which is about 30 rpm, for example, is used to determine whether the FORWARD clutch 72 or REVERSE brake 70 has been fully engaged or not. If a negative decision (NO) is obtained in step SS10, this means that the clutch 72 or brake 70 has been fully engaged, and therefore step SS12 and subsequent steps are executed. If an affirmative decision (YES) is obtained in step SS10, this means that the clutch 72 or brake 70 has not been fully engaged, and step SS11 is executed to determine whether a time after the start of a shifting operation from the position "N" or "P" to the position "D", "S" or "L" exceeds a predetermined reference time $C_T$ stored in the ROM, or not. This reference time $C_T$ is used to determine whether the time of engagement of the FORWARD clutch 72 or REVERSE brake 70 exceeds a nominal or normal engagement time. The time $C_T$ is slightly longer than the time normally required for the clutch 72 or brake 70 to be fully engaged. If the reference time $C_T$ has not elapsed after the start of shifting, step SS11 is followed by step SS12. If the reference time $C_T$ has elapsed, the ACCUMULATOR BACK PRESSURE CONTROL mode C is established.

If the negative decision (NO) is obtained in step SS10 or SS11 and the ACCUMULATOR BACK PRESSURE CONTROL mode C is not established, step SS12 is executed to determine whether the REVERSE position "R" is selected or not. If the position "R" is selected, the LOCK-UP CLUTCH RELEASE mode A is selected without execution of any subsequent steps. In this mode A, the third solenoid-operated valve 330 is placed in the OFF state with the shift lever 252 placed in the position "R", so as to prevent the reversing device 16 from being placed in the reverse position, namely, so as to permit the REVERSE brake 70 to be engaged to run the vehicle in the reverse direction.

If a negative decision (NO) is obtained in step SS12, step SS13 is implemented to determine whether the BRAKE switch 472 is in the ON state, or not. Then, step SS14 is implemented to determine whether the vehicle running speed is lower than a reference value Cv2 stored in the ROM. This reference value Cv2, which is about 40 km/h, for example, is used to determine whether or not the condition for releasing the lock-up clutch 36 during brake application has been satisfied.

If the BRAKE switch 472 is ON and the vehicle speed V is lower than the reference value Cv2, namely, if the condition for releasing the lock-up clutch 36 has been satisfied, the control flow goes to step SS21 for selecting the LOCK-UP CLUTCH RELEASE mode A or LOCK-UP CLUTCH RAPID RELEASE mode B. More specifically, step SS21 is implemented to determine whether or not the currently selected hydraulic control mode is one of the LOCK-UP CLUTCH RELEASE and ACCUMULATOR BACK PRESSURE CONTROL modes A and C, which do not require a rapid releasing of the lock-up clutch 36. If an affirmative decision (YES) is obtained in step SS21 the LOCK-UP CLUTCH RELEASE mode A is selected. If a negative decision (NO) is obtained in step SS21, the control flow goes to step SS21 to determine whether the currently selected mode is the LOCK-UP CLUTCH RAPID RELEASE mode B or not. If the currently selected mode is not the mode B, step SS24 is executed to reset a time counter XLC to zero, and then the RAPID RELEASE mode B is selected. If the mode B is currently selected, step SS22 is followed by SS23 in which the time counter XLC is incremented. Step SS23 is followed by step SS24 to determine whether or not the current content of the time counter XLC exceeds a predetermined reference value Cs stored in the ROM. If the current count of the counter XLC is smaller than the reference value Cs, the LOCK-UP CLUTCH RAPID RELEASE mode B is maintained. If the count exceeds the reference value Cs, the LOCK-UP CLUTCH RELEASE mode A is selected. Thus, since the LOCK-UP CLUTCH RAPID RELEASE mode B is established for a relatively short time corresponding to the reference value Cs, it is possible to prevent the lock-up clutch rapid release valve 400 from rapidly draining the engaging chamber 33 of the fluid coupling 12 through the engaging line 322, which would cause the pressure in the fluid coupling 12 to be lowered, thereby causing bubbling within the coupling 12. The reference value Cs is determined to be shorter than a time within which the bubbling may occur in the fluid coupling 12.

If the BRAKE switch 472 is not ON or the switch 72 is ON but the vehicle speed V exceeds the reference value Cv2, step SS15 is implemented to determine whether the currently selected mode is one of the modes A, B and C which require the lock-up clutch 36 to be released. Steps SS15 and SS16–SS19 are implemented to determine the engagement or releasing of the lock-up clutch 36. If an affirmative decision (YES) is obtained in step SS15, step SS18 is executed to determine whether the speed Nin of the input shaft 30 is higher than a reference value ML2, or not. If the speed Nin is higher than the reference value ML2, step SS19 is implemented to determine whether the vehicle speed V is higher than a reference value Cv4 stored in the ROM. If the vehicle speed V is higher than the reference value Cv4, step SS20 is executed to determine whether the vehicle speed V is higher than a reference value Cv5. If the speed V is higher than the reference value Cv5, the 2ND LINE PRESSURE REDUCTION mode E is selected. If the speed V is equal to or lower than the reference value Cv5, the REVERSE INHIBIT mode D is selected. In these modes E and D wherein the third solenoid-operated valve 330 is placed in the ON state, the lock-up clutch 36 is engaged. If a negative decision (NO) is obtained in both steps SS18 and SS19, the normal LOCK-UP CLUTCH RELEASE mode A is selected. Namely, the lock-up clutch 36 is kept in the released state.

If the checking in step SS15 reveals that none of the modes A, B and C is selected, the control flow goes to step SS16 to determine whether the speed Nin is higher than a predetermined reference value ML1, or not. If an affirmative decision (YES) is obtained in step SS16, the control flow goes to step SS17 to determine whether the vehicle running speed V is higher than a predetermined reference value Cv3 stored in the ROM. If a negative decision (NO) is obtained in step SS16 or SS17, the LOCK-UP CLUTCH RELEASE mode A is selected. If an affirmative decision (YES) is obtained in both steps SS16 and SS17, step SS20 is executed to determine whether the vehicle speed V is higher than a reference value Cv5. If the vehicle speed V is higher than the reference value Cv5, the 2ND LINE PRESSURE REDUCTION mode E is selected. In this mode, the third and fourth solenoid-operated valves 330 and 346 are both placed in the ON state, so that the second line pressure Pl2 is lowered. If the vehicle speed V is equal to or lower than the reference value Cv5, the REVERSE INHIBIT mode D is selected, and the second line pressure Pl2 is normally regulated.

It will be understood from the foregoing explanation on steps SS15 through SS19 that the lock-up clutch 36 is engaged if the inequalities Nin>ML2 and V>Cv4 are satisfied when the lock-up clutch 36 is in the released state, and that the lock-up clutch 36 is released if the inequalities Nin<ML1 and V<Cv3 are satisfied when the lock-up clutch 36 is in the engaged state. The reference values ML1 and ML2 are determined based on the detected throttle opening angle $\theta$th, according to a function stored in the ROM of the control device 460, so that the reference values ML1 and ML2 increase with an increase in the throttle opening angle $\theta$th. For the same throttle opening angle $\theta$th, the reference value ML1 is set larger than the reference value ML2, for avoiding the control instability. The reference values Cv3 and Cv4 are set at values about 20 km/h, and the reference value Cv3 is set larger than the reference value Cv4 for the same reason as indicated above.

Referring back to the flow chart of FIG. 19, the control flow goes to step S10 after one of the hydraulic control modes A–E is selected. In step S10, the CPU of the control device 460 determines whether the ACCUMULATOR BACK PRESSURE CONTROL mode C is selected, or not. If the mode C is selected, step S10 is followed by step S11 in which the duty cycle Ds4 of the fourth solenoid-operated valve 346 is determined. Step S11 is followed by step S12. If the mode C is not selected, the control flow goes directly to step S12.

The duty cycle Ds4 is determined so that the accumulators 342 and 340 are given suitable levels of back pressures for assuring smooth engagement of the FORWARD clutch 72 and REVERSE brake 70 when the shift lever 252 is shifted to any one of the forward drive positions "D", "S" and "L" or to the REVERSE position "R". The duty cycle Ds4 is determined from time to time, according to one of two predetermined functions (stored in the ROM) which include control parameters such as the speed Nin of the input shaft 30 upon shifting of the shift lever 252, and a time elapse "t" after the start of the shifting operation. The two functions correspond to the forward and reverse shiftings. The graph of FIG. 24 indicates a change in the duty cycle Ds4 with time in relation to the speed Nout of the output shaft 38, when the shift lever 252 is shifted from the NEUTRAL position "N" to the DRIVE position "D" while the vehicle is stopped.

In step S12, the control device 460 applies control signals to the first, second, third and fourth solenoid-operated valves 266, 268, 330 and 346, so that the solenoid coils of these valves are placed in the appropriate ON or OFF state or energized in the controlled duty cycle (for the valves 268 and 346), depending upon the CVT shift mode selected in step S4 and the hydraulic control mode selected in step S9.

As described above, the hydraulic circuit shown in FIG. 2 includes the second pressure regulating valve 102 having the spool 110 for regulating the second line pressure Pl2 to be applied to the driven side hydraulic cylinder 54 or 56 (normally cylinder 56), and the pressure-reducing chamber 136 adapted to receive the pressure-reducing pilot pressure Pso14 which acts on the spool 110 in the direction that causes the second line pressure Pl2 to be lowered. The hydraulic circuit further includes the means for generating the above-indicated pressure-reducing pilot pressure Pso14 to be applied to the chamber 136 of the pressure regulating valve 102 when the vehicle running speed V exceeds the predetermined reference value Cv5. According to this arrangement, when the vehicle speed V becomes higher than the reference value Cv5, the second line pressure Pl2 to be applied to the driven side hydraulic cylinder 54, 56 of the CVT 14 is lowered, as indicated in FIG. 18, due to a movement of the spool 110 by the pressure-reducing pilot pressure Pso14 applied to the chamber 136 of the second pressure regulating valve 102. Thus, the instant arrangement prevents an excessive tension of the transmission belt 44 due to a pressure rise in the driven side cylinder (56) which arises from the centrifugal force during rotation of the driven side pulley at a relatively high speed, i.e., during running of the vehicle at a speed higher than the reference value Cv5. In other words, the tension of the belt 44 is maintained within a suitable range even while the vehicle speed V is relatively high. Since the second pressure regulating valve 102 does not employ an expensive pressure regulating servo valve equipped with a linear solenoid, the device for regulating the second line pressure may be available at a relatively low cost.

It will be understood that the means for generating the pressure-reducing pilot pressure Pso14 is constituted by: the second line pressure reducing control valve 380 for supplying the pilot pressure Pso14 to the pressure-reducing chamber 136 of the second pressure regulating valve 102; the electronic control device 460 which selects the 2ND LINE PRESSURE REDUCTION mode E in step S9 of the flow chart of FIG. 19; and the third and fourth solenoid-operated valves 330 and 346 which are operated when the mode E is selected.

Modified embodiments of the present invention will be described by reference to FIGS. 25-53. In the interest of brevity and simplification, the same reference numerals as used in the first embodiment described above will be used in connection with these modified embodiments, to identify the functionally corresponding components. Redundant description of these components will not be provided.

Figure 25:
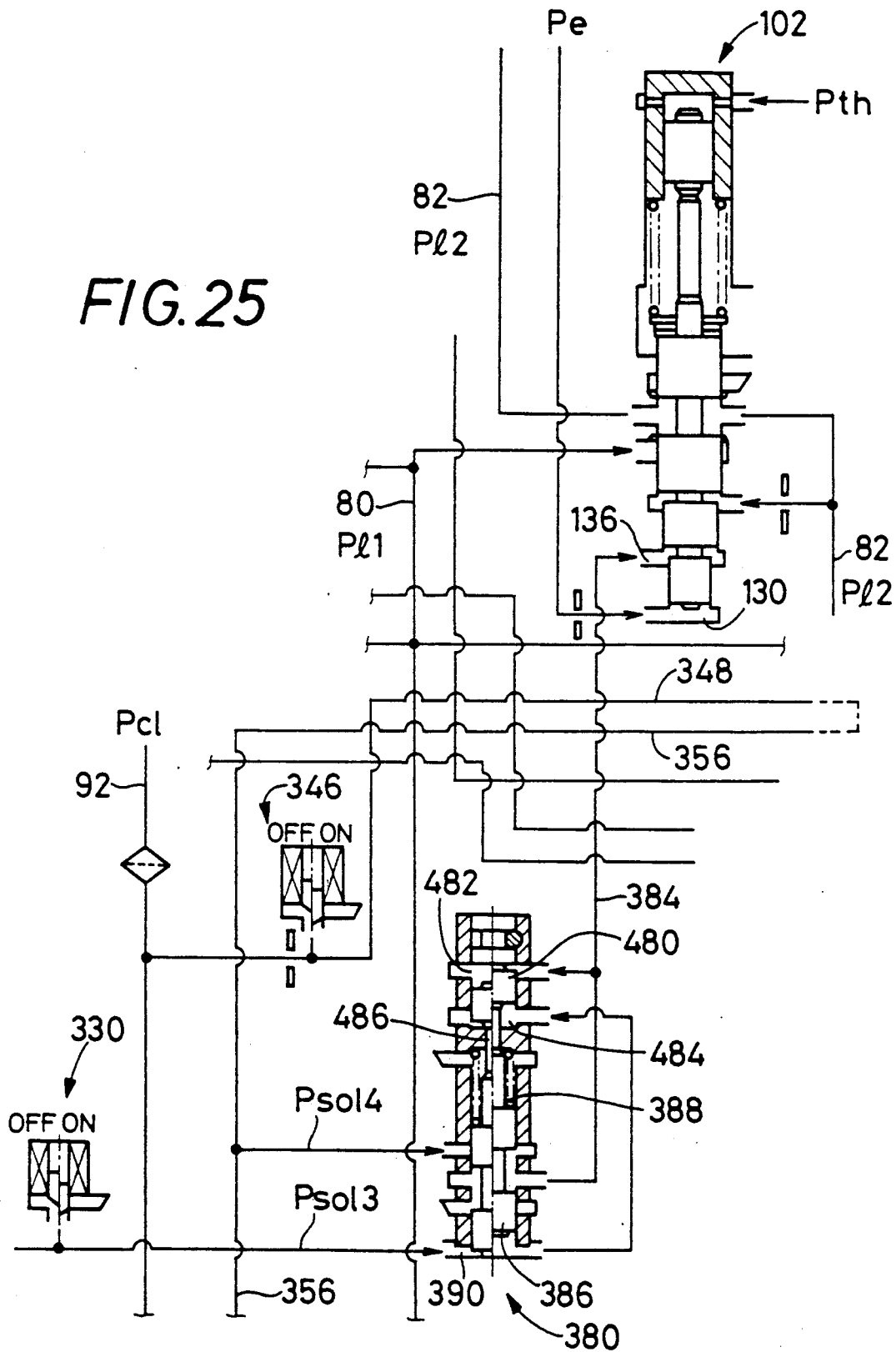
FIG. 25 is a fragmentary view showing another embodiment of the hydraulic control apparatus of the present invention.

Referring to FIG. 25, there is shown a modified second line pressure reducing control valve 380 used in the second embodiment of the invention. This control valve 380 has, in addition to the mechanism used in the first embodiment, a plunger 480, a chamber 482 and a chamber 484. The plunger 480 is disposed coaxially with the spool 386 such that the plunger 480 is abutable against the spool 386 via a pin 486. The chamber 482 is formed adjacent to the end face of the plunger 480 remote from the pin 486. This chamber 482 is adapted to receive the pilot pressure Pso14 from the chamber 136 of the second pressure regulating valve 102. The chamber 484 is formed adjacent to the other end face of the plunger 480 on the side of the pin 486. This chamber 484 is adapted to receive the pilot pressure Pso13. This added mechanism consisting of the plunger 480 and chambers 482, 484 is provided for avoiding inconvenience in the event of sticking of the valve spool 386 of the valve 380. Namely, the added mechanism prevents an abnormal reduction in the second line pressure Pl2 and consequent slipping of the belt 44, which would otherwise occur upon the sticking of the spool 386.

Described more specifically, the sticking of the valve spool 386 and consequent reduction of the second line pressure Pl2 may occur, if the third and fourth solenoid-operated valves 330, 346 are turned OFF and ON, respectively, while the third valve 330 is ON and the fourth valve 346 is in the ON, OFF or duty cycling state. In the arrangement of FIG. 25, however, if the sticking spool 386 does not move in the biasing direction of the spring 388 when the third valve 330 is brought from the ON state to the OFF state and the fourth valve 346 is turned ON, the pressure-reducing pilot pressure Pso14 in the chamber 482 acts on the plunger 480 so that the plunger 480 pushes the spool 386 in the biasing direction of the spring 388.

In this second embodiment, there is provided another 2ND LINE PRESSURE REDUCTION mode F for continuously reducing the second line pressure Pl2 by continuously reducing the pressure applied to the chamber 136 of the second pressure regulating valve 102. In this pressure reduction mode F, the fourth solenoid-operated valve 346 is operated in the controlled duty cycling while the third solenoid-operated valve 330 is held ON.

Figure 26:
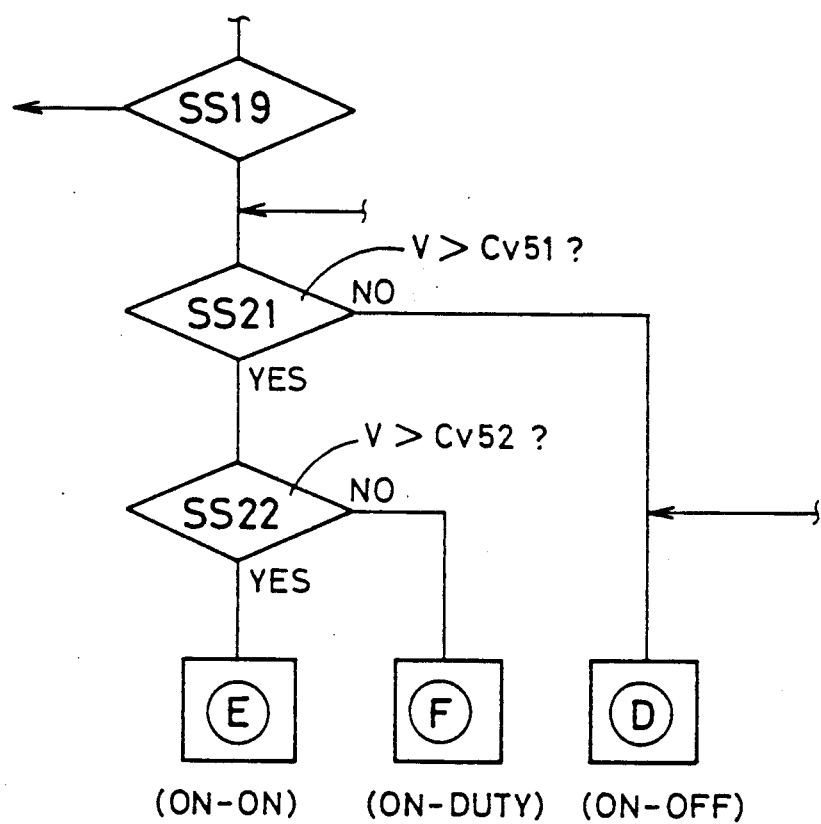
FIG. 26 is a flow chart illustrating a part of the control flow in the embodiment of FIG. 25.

Accordingly, the control program is modified as indicated in FIG. 26, in which steps SS21 and SS22 are substituted for step SS20 of FIG. 22. Step SS21 following step SS19 is provided to determine whether the vehicle running speed V is higher than a reference value Cv51 and Cv52, or not. If the speed V is equal to or lower than the reference value Cv51, the REVERSE INHIBIT mode D is selected. In this mode, the third and fourth solenoid-operated valves 330, 346 are held in the ON and OFF states, respectively, so as to prevent the REVERSE brake 70 of the reversing device 16 from being engaged when the shift lever 252 is operated from one of the forward drive positions to the REVERSE position "R". If the speed V is higher than the value Cv51, the control flow goes to step SS22 to determine whether the speed V is higher than a reference value Cv52. If the speed V is equal to or lower than the reference value Cv52, the 2ND LINE PRESSURE REDUCTION mode F added in this second embodiment is selected. In this mode, the fourth solenoid-operated valve 346 is operated with a controlled duty cycle according to the flow chart of FIG. 27, while the third solenoid-operated valve 330 is held ON. Accordingly, the second line pressure Pl2 is continuously lowered. If the vehicle speed V is higher than the reference value Cv52, step SS22 is followed by the selection of the 2ND LINE PRESSURE REDUCTION mode E in which the third and fourth solenoid-operated valves 330 and 346 are both held ON, so as to reduce the second line pressure Pl2 by a suitable amount, as previously described.

Figure 27:
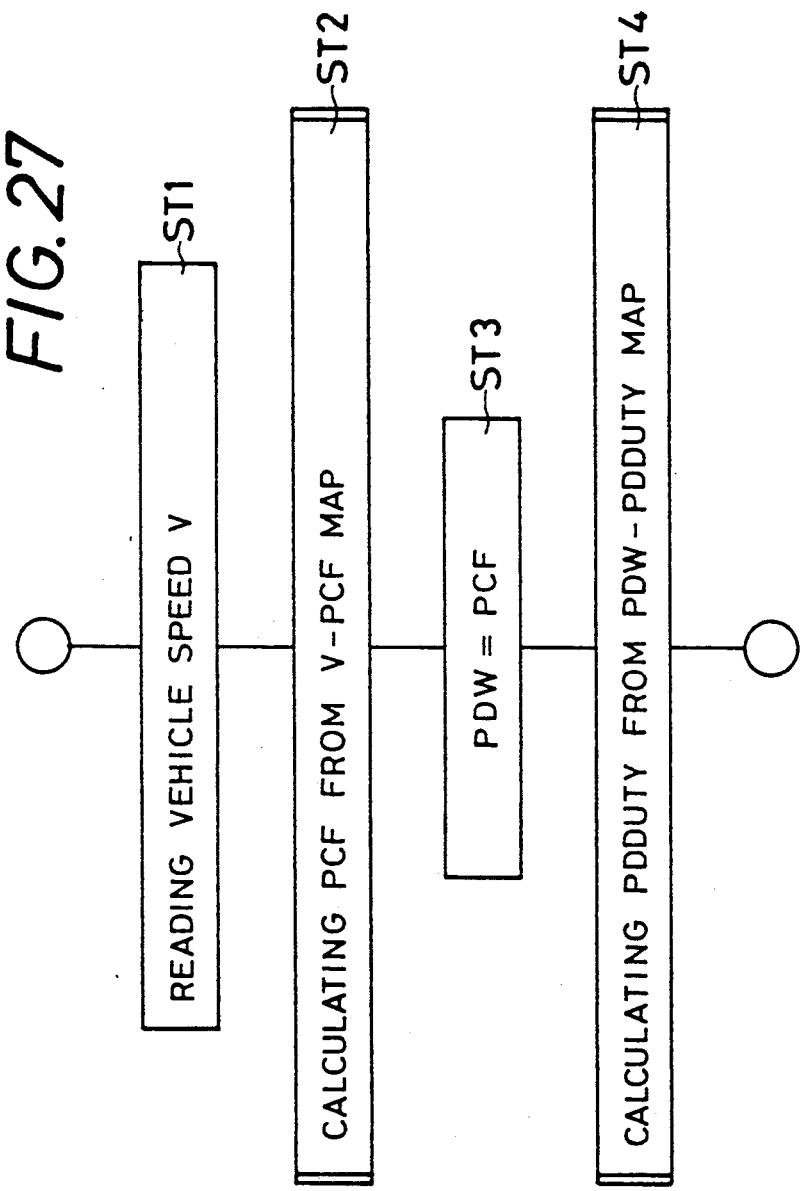
FIG. 27 is a flow chart illustrating an operation to control the duty cycle of the fourth solenoid valve in a control mode F in the control flow of FIG. 16, for reducing the second line pressure.

In the flow chart of FIG. 27, step ST1 is initially executed to read the currently detected vehicle running speed V. Step ST1 is followed by step ST2 in which an average centrifugal pressure rise PCF in the second hydraulic cylinder 56 (driven side cylinder) due to the centrifugal force is calculated based on the detected speed V, according to a predetermined relationship stored in the ROM of the control device 460. Then, the control flow goes to step ST3 in which the calculated centrifugal pressure rise PCF is defined as a reduction amount PDW of the second line pressure Pl2. Step ST3 is followed by step ST4 wherein the duty cycle PDDUTY of the fourth solenoid-operated valve 346 is calculated based on the pressure reduction amount PDW, according to a predetermined relationship stored in the ROM.

Figure 28:
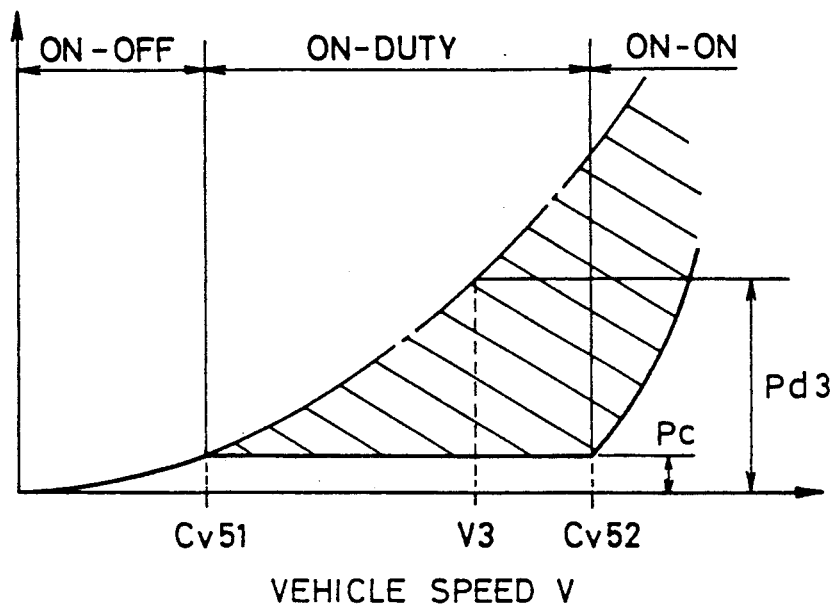
FIG. 28 is a graph for explaining the reduction in the second line pressure in the embodiment of FIG. 25.

The relationship used in step ST2 is defined by a data map representative of a relation between the centrifugal pressure rise PCF and the vehicle speed V, as indicated by hatched area in FIG. 28. The relationship used in step ST4 is obtained by experiments, so that the operation of the fourth solenoid-operated valve 346 with the calculated duty cycle PDDUTY causes the second line pressure Pl2 to be lowered by the reduction amount PDW.

While the vehicle speed V is not higher than the reference value Cv51, the second line pressure Pl2 is not reduced. However, when the vehicle speed V exceeds the reference value Cv51, the 2ND LINE PRESSURE REDUCTION mode F is established to change the pilot pressure Pso14 applied to the chamber 136 of the second pressure regulating valve 102, with the duty cycle PDDUTY of the fourth solenoid-operated valve 346 controlled as described above. Thus, the second line pressure Pl2 is continuously lowered to a suitable level in the mode F before the pressure Pl2 is lowered by a suitable amount in the mode E which is selected when the vehicle speed V exceeds the reference value Cv52. For instance, when the vehicle speed V is V3, the centrifugal pressure rise PDW is equal to Pd3, as indicated in FIG. 28. In this case, the duty cycle at which the valve 346 is turned on and off is determined so that the second line pressure Pl2 is lowered by an amount equal to Pd3 or (Pd3-Pc). When the vehicle speed V exceeds the reference value Cv52, the normal 2ND PRESSURE REDUCTION mode E is established, whereby the pilot pressure Pso14 is applied to the chamber 136 of the valve 102 to reduce the pressure Pl2 by a suitable amount.

Figure 29:
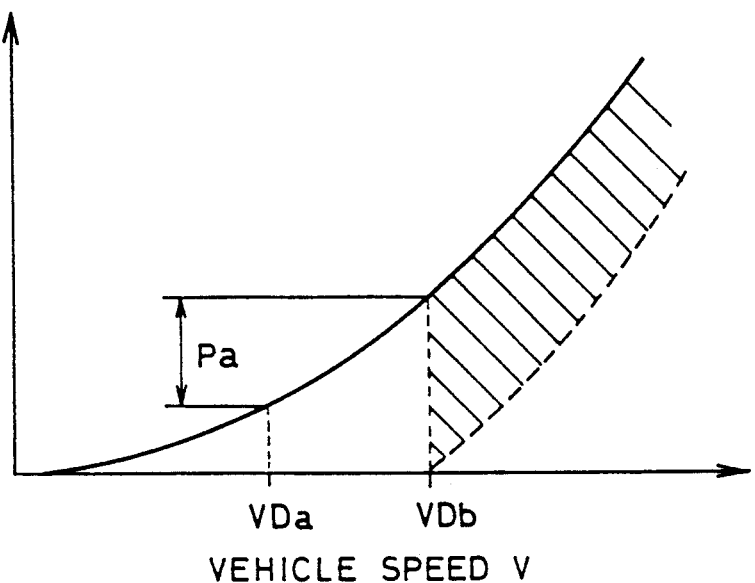
FIGS. 29 and 30 are graphs for explaining the reduction in the second line pressure at a given running speed of the vehicle.
Figure 30:
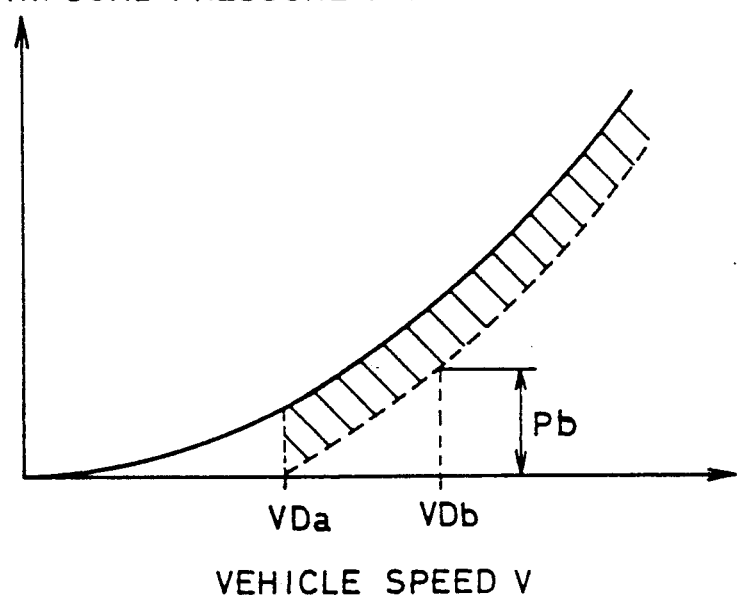

In the present second embodiment having the modified 2ND LINE PRESSURE REDUCTION mode F in addition to the normal 2ND LINE PRESSURE REDUCTION mode E, the second line pressure Pl2 is continuously lowered as the amount of the centrifugal pressure rise in the driven side cylinder 56 increases with the vehicle running speed V. This arrangement assures an optimum tension of the belt 44 for improved durability and a minimum power loss, over the wide range of the vehicle speed V from a normal cruising speed to an extra high speed. In the first embodiment having only the pressure reduction mode E, the second line pressure Pl2 may be lowered by an excessive or insufficient amount. For example, FIG. 29 shows a case where the reduction amount of the second line pressure Pl2 is determined when the vehicle speed is $V_{Db}$. If the mode E is established at the vehicle speed of $V_{Da}$, the amount of reduction of the pressure Pl2 actually attained in the mode E is larger by Pa than the optimum amount. FIG. 30 shows a different case where the reduction amount of the pressure Pl2 is determined at the vehicle speed of $V_{Da}$. If the mode E is established at the vehicle speed of $V_{Db}$, the pressure Pl2 lowered in the mode E is higher by Pb than the optimum value.

FIGS. 31-34 illustrate further modifications of the hydraulic circuit which are operated according to the flow chart of FIG. 22.

The modified embodiment of FIG. 31 uses a modified second line pressure reducing control valve 380, which has additional ports as described below, and is connected to a second line pressure increasing control valve 490 for increasing the second line pressure Pl2 by a suitable amount. The control valve 380 has ports 492a and 494a communicating with the line 86 for introducing the SPEED-RATIO pressure Pe, a port 492b communicating with the chamber 130 of the second pressure regulating valve 102, a port 494b communicating with the second line pressure increasing control valve 490, and drain ports 492c and 494c. When the spool 386 is moved by the pilot pressure Pso13 against the biasing force of the spring 388, the SPEED-RATIO pressure Pe is applied to the pressure-increasing chamber 130 of the second pressure regulating valve 102 and the second pressure increasing control valve 490, whereby the pilot pressure Pso13 is offset and the spool 386 is moved by the biasing force of the spring 388. Then, the SPEED-RATIO pressure Pe which has been applied to the chamber 130 and the control valve 490 is released to the atmosphere.

The second line pressure increasing control valve 490 has a port 496a communicating with the port 494b of the second line pressure reducing control valve 380, a port 496b communicating with the pressure-reducing chamber 136 of the second pressure regulating valve 102, and a drain port 496c. The control valve 490 includes a valve spool 498 for selective communication of the chamber 136 of the valve 102 with one of the port 494b of the control valve 380 and the atmosphere. The spool 498 is biased by a spring 500. When the spool 498 is moved by the pilot pressure Pso14 against the biasing force of the spring 500, the SPEED-RATIO pressure Pe is applied to the chamber 136 of the pressure regulating valve 102 through the control valve 380, whereby the pilot pressure Pso14 is offset and the spool 498 is moved by the biasing force of the spring 500. As a result, the chamber 136 of the valve 102 is exposed to the atmosphere.

Figure 36:
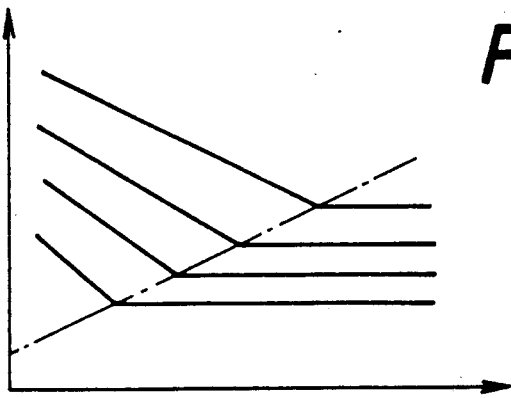
FIG. 36 is a graph indicating a relationship between the second line pressure and the CVT speed ratio in the embodiment of FIG. 31 during a normal operation for controlling the second line pressure.
Figure 37:
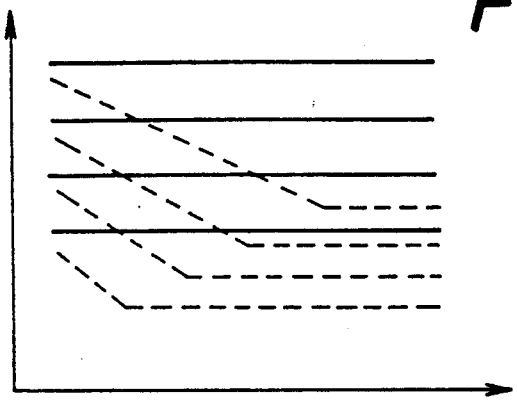
FIG. 37 is a graph indicating the same relationship during an operation for increasing the second line pressure.
Figure 38:
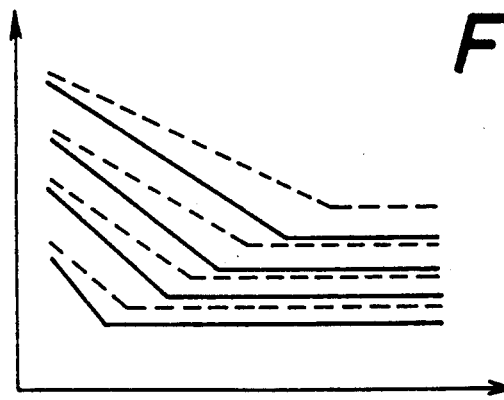
FIG. 38 is a graph indicating the same relationship during an operation for reducing the second line pressure.
Figure 42:
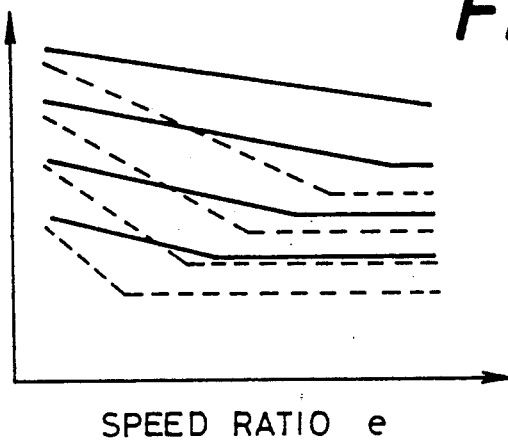
FIGS. 42 and 43 are graphs indicating the relationships between the second line pressure and the CVT speed ratio during operations for increasing and reducing the second line pressure in the embodiment of FIG. 34, respectively.
Figure 43:
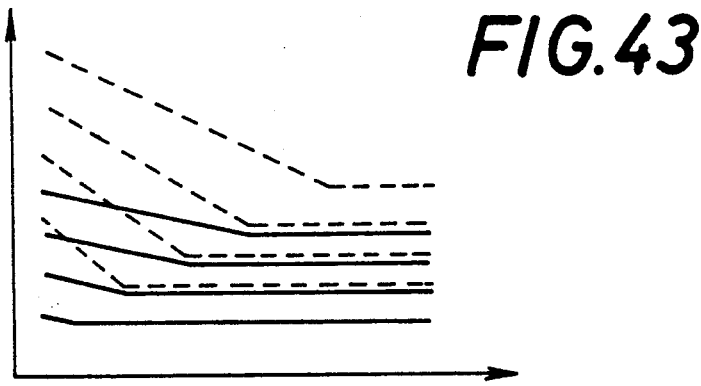

In the arrangement described above, the pressure-reducing chamber 136 of the second pressure regulating valve 102 is exposed to the atmospheric pressure while the pressure-increasing chamber 130 receives the SPEED-RATIO pressure Pe, when the lock-up clutch 36 is engaged with the third and fourth solenoid-operated valves 330 and 346 placed in the ON and OFF states, respectively, as indicated at 3 in FIG. 35. In this condition, the second line pressure Pl2 is normally regulated as indicated in FIG. 36, in the same manner as indicated in FIG. 7. However, when the third solenoid-operated valve 330 is ON and the fourth solenoid-operated valve 346 is ON or OFF, the chamber 130 and 136 of the pressure regulating valve 102 are both exposed to the atmosphere, as indicated at 1 and 2 in FIG. 35, and the second line pressure Pl2 is held constant irrespective of the change in the speed ratio "e" of the CVT 14, as indicated in solid lines in FIG. 37. Therefore, when the vehicle is running at a relatively low speed with the lock-up clutch 36 released, the second line pressure Pl2 is comparatively high particularly when the speed ratio "e" is relatively high. This means that the speed ratio "e" of the CVT 14 can be rapidly reduced when the vehicle is stopped.

Where the third and fourth solenoid-operated valves 330 and 346 are both ON, the SPEED-RATIO pressure Pe is applied to both of the chambers 130 and 136 of the second pressure regulating valve 102, as indicated at 4 in FIG. 35. In this case, the second line pressure Pl2 is regulated as indicated in solid lines in FIG. 38, as to be lower than the normally regulated value as indicated in dashed lines. Accordingly, it is possible to avoid an excessive tension of the belt 44 due to a centrifugal pressure rise in the second hydraulic cylinder 56 during high-speed running of the vehicle. Thus, the durability of the belt 44 is improved, and the power loss is minimized.

Figure 31:
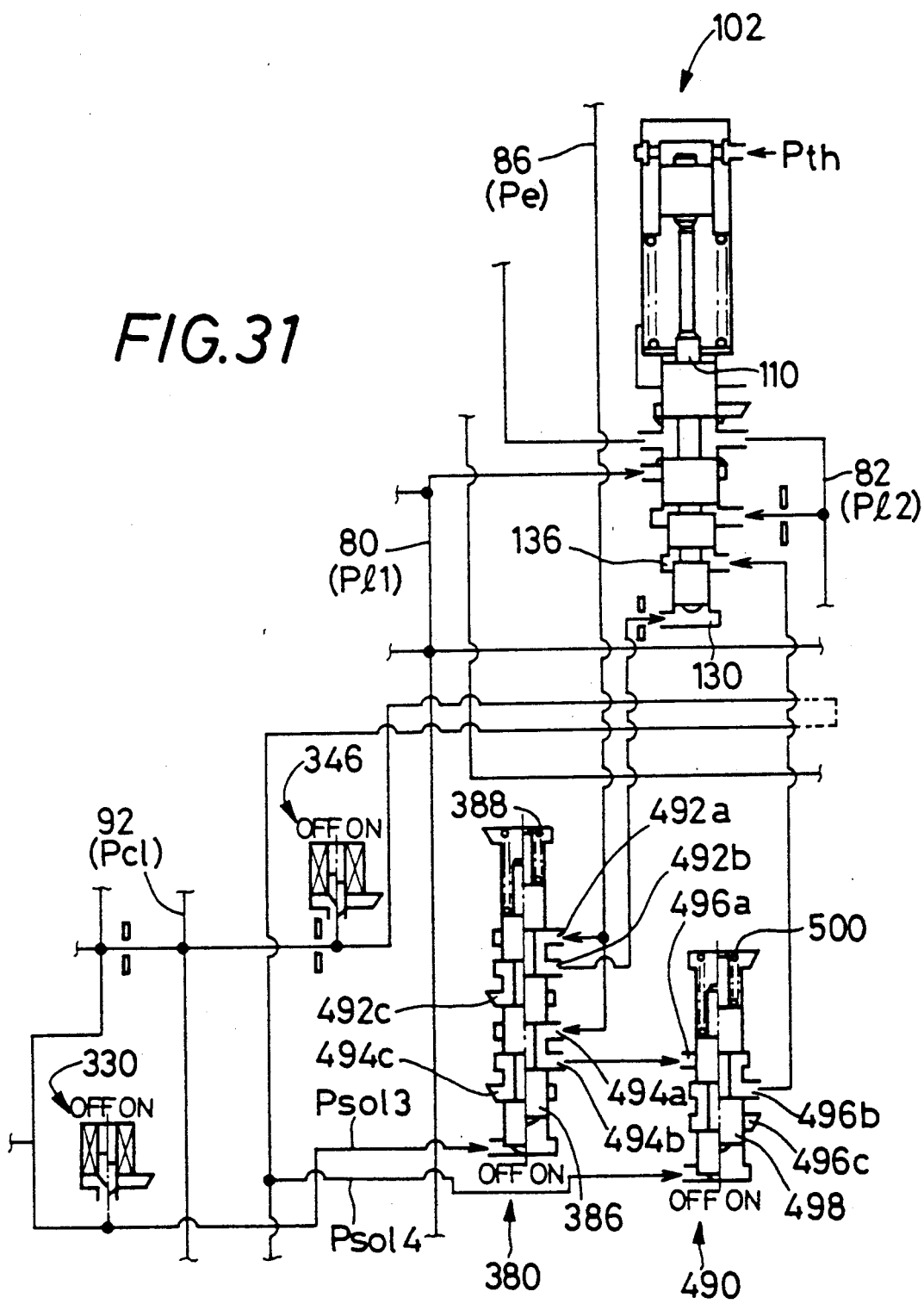
FIGS. 31, 32, 33 and 34 are fragmentary hydraulic circuit diagrams showing further embodiments of the invention.

In the present third embodiment of FIG. 31 wherein the SPEED-RATIO pressure Pe is applied to the chamber 136 of the second pressure regulating valve 102, the amount of reduction in the second line pressure Pl2 is advantageously increased with an increase in the speed ratio "e". While the pressure Pe is applied to the chamber 136 of the valve 102, the pressure Pout in the second hydraulic cylinder 56 or the second line pressure Pl2 may be applied to the ports 492a and 494a of the second line pressure reducing control valve 380.

Figure 32:
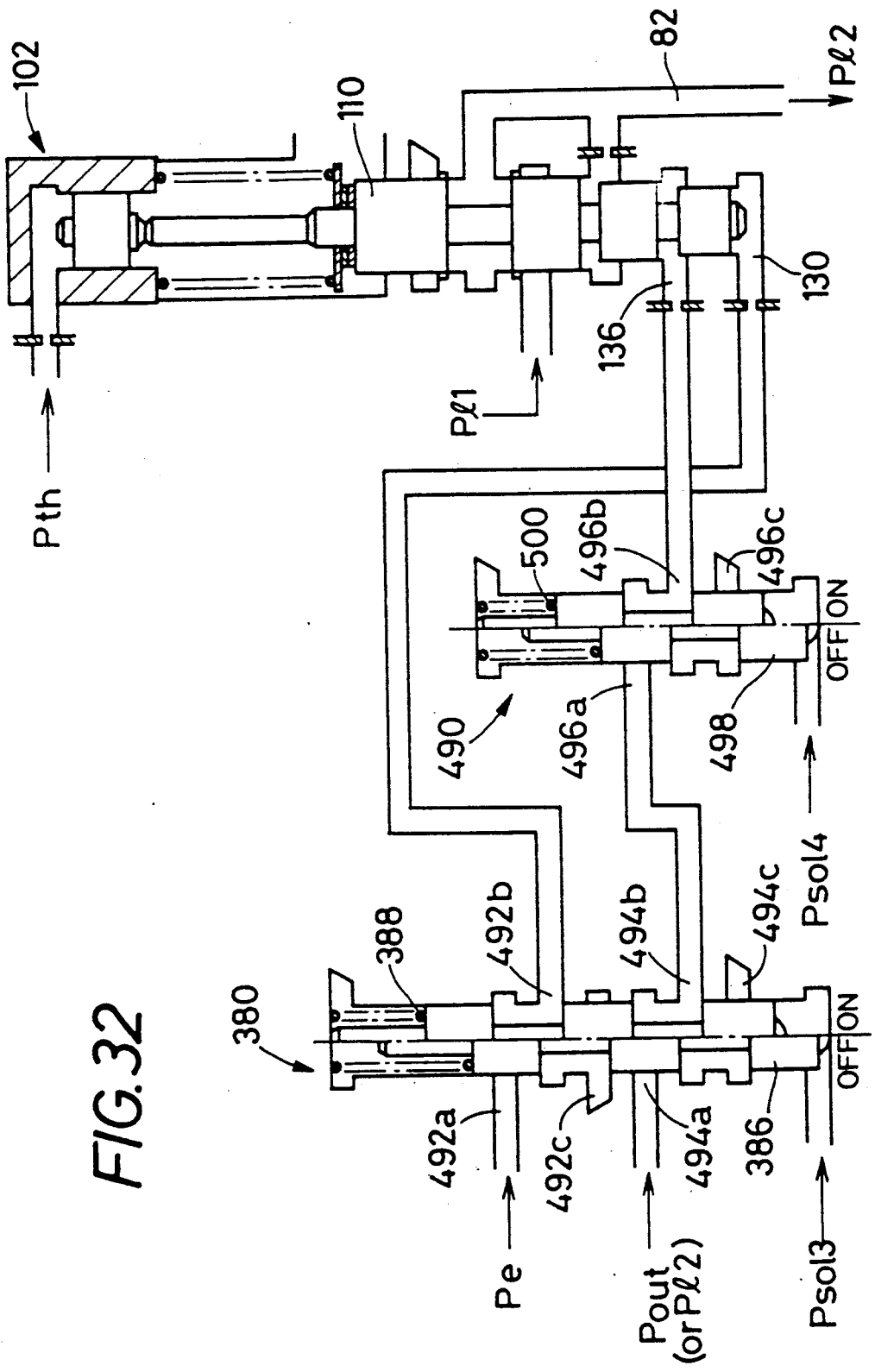

In the fourth embodiment shown in FIG. 32, the pressure Pout in the second cylinder 56 or the second line pressure Pl2 is applied to the port 494a of the second line pressure reducing control valve 380, while the spool 498 of the second line pressure increasing control valve 490 is operated by the pilot pressure Pso14 which is controlled by the fourth solenoid-operated valve 346. In this arrangement, the chambers 130 and 136 of the valve 102 are both exposed to the atmosphere irrespective of the operation of the second line pressure increasing control valve 490, where the third solenoid-operated valve 330 is placed in the OFF state and the pilot pressure Pso13 is not applied to the control valve 380. When the pilot pressure Pso13 is applied to the control valve 380 in relation to the energization of the third solenoid-operated valve 330, the SPEED-RATIO pressure Pe is applied to the chamber 130 of the second pressure regulating valve 102. Therefore, in response to the operation of the second line pressure increasing control valve 490, the chamber 136 is drained or supplied with the pressure Pout or second line pressure Pl2.

Figure 33:
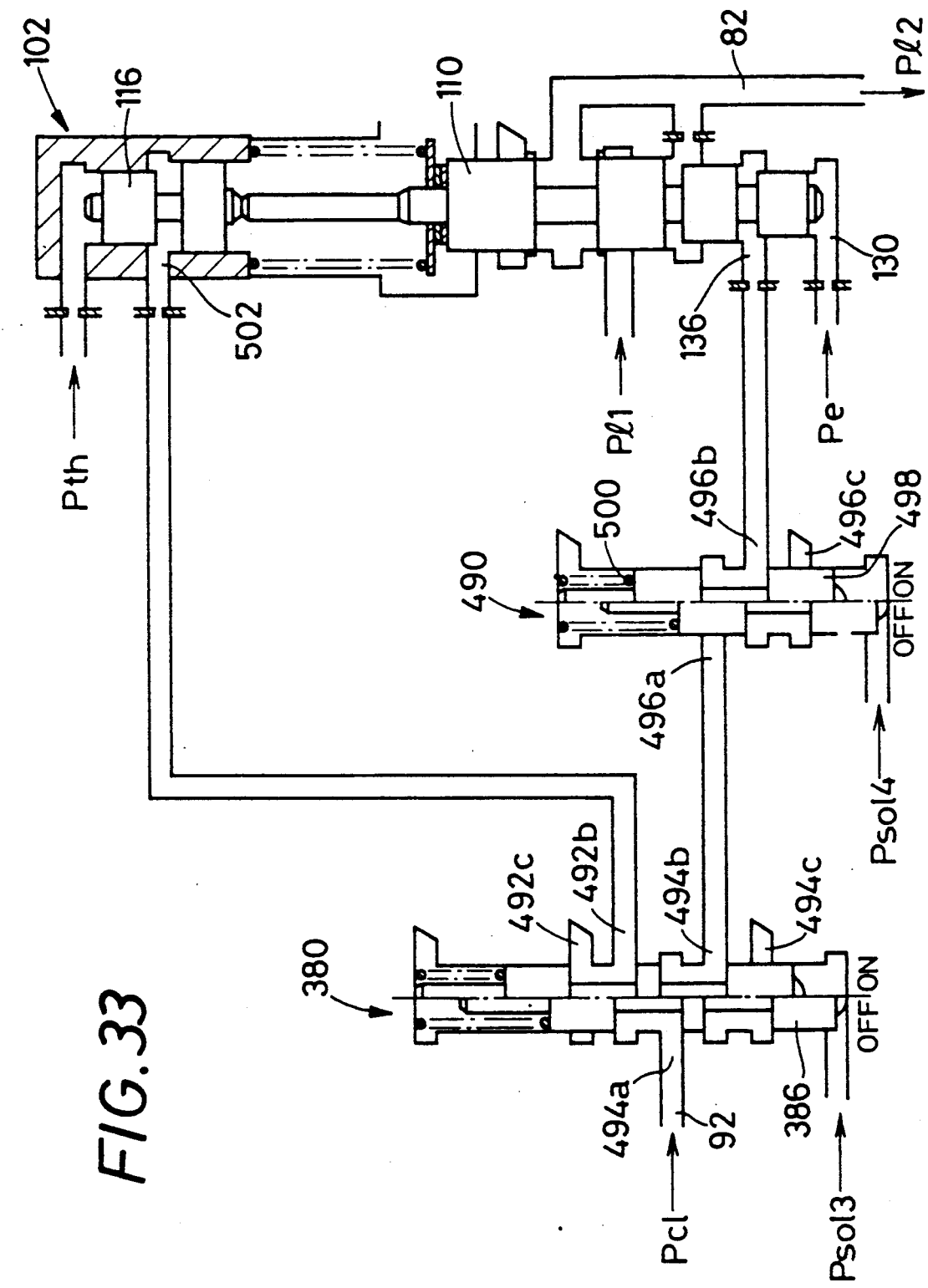

In the fifth embodiment of FIG. 33, the second line pressure reducing control valve 380 is not provided with the port 492a provided in the preceding embodiment. The port 494a is adapted to receive the LOCK-UP CLUTCH pressure Pc1, while the port 492b is connected to a chamber 502 formed adjacent to the plunger 116 of the valve 102. When the LOCK-UP CLUTCH pressure Pc1 is applied to the chamber 502, the plunger 116 biases the spool 110 so as to increase the second line pressure Pl2. The chamber 130 of the valve 102 is always supplied with the SPEED-RATIO pressure Pe. In the present arrangement, when the third solenoid-operated valve 330 is OFF and the pilot pressure Pso13 is not applied to the control valve 380, the LOCK-UP CLUTCH pressure Pc1 is applied to the chamber 502 of the second pressure regulating valve 102, and the chamber 136 is exposed to the atmosphere irrespective of the operating state of the fourth solenoid-operated valve 346. When the pilot pressure Pso13 is applied to the control valve 380 in relation to the energization of the valve 330, the chamber 502 of the valve 102 is exposed to the atmosphere. In this condition, chamber 136 is drained or supplied with the LOCK-UP CLUTCH pressure Pc1, depending upon the operating state of the fourth solenoid-operated valve 346.

Figure 40:
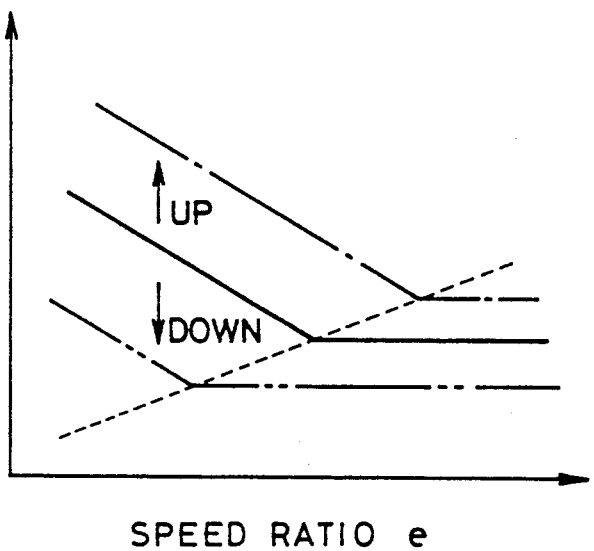

In the embodiments of FIGS. 32 and 33, the second line pressure Pl2 is increased by a suitable amount as indicated in one-dot chain line in FIG. 40, with respect to the normal value as indicated in solid line in FIG. 40, when the third solenoid-operated valve 330 is OFF while the fourth solenoid-operated valve 346 is ON or OFF, as indicated in FIG. 39. When the lock-up clutch 36 is engaged with the third and fourth solenoid-operated valves 330, 346 placed in the ON and OFF states, respectively, the second line pressure Pl2 is normally regulated as indicated in solid line in FIG. 40, since the vehicle speed is relatively low. When the lock-up clutch 36 is engaged with the valves 330 and 346 both placed in the ON state, the second line pressure Pl2 is lowered by a suitable amount as indicated in two-dot chain line in FIG. 40, with respect to the normal value, since the vehicle speed is high.

Figure 34:
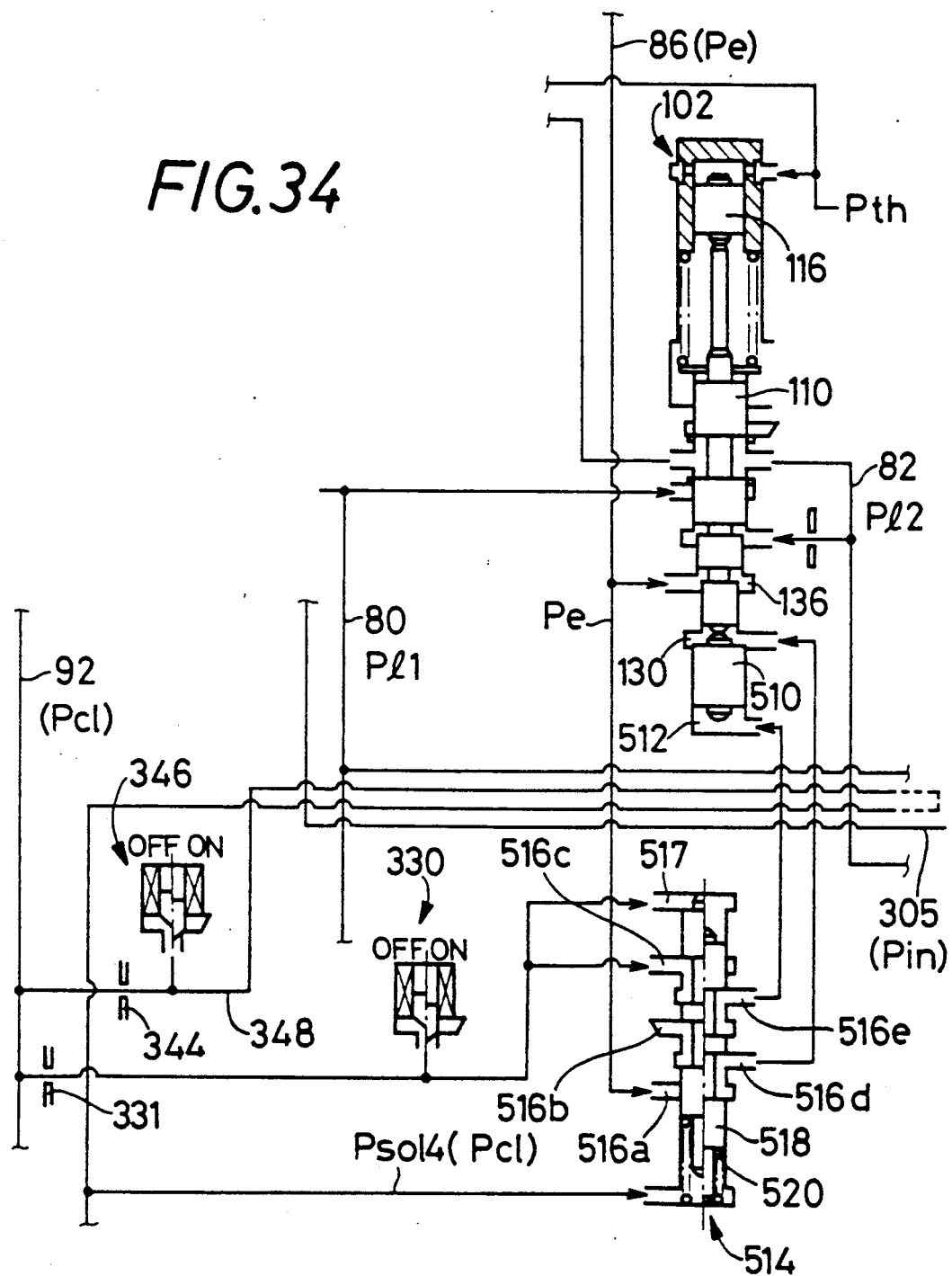

The sixth embodiment of FIG. 34 uses a single control valve 514 for increasing and lowering the second line pressure Pl2 regulated by the second pressure regulating valve 102. In this embodiment, the valve 102 has a plunger 510 disposed adjacent to one end of the spool 110 such that the plunger 510 is abuttable against the spool 110 and such that the pressure-increasing chamber 130 is defined between the above-indicated one end of the spool 110 and the plunger 510. Adjacent to the end face of the plunger 510 remote from the chamber 130, there is formed a pressure-reducing chamber 512. The second line pressure increasing/reducing control valve 514 has a port 516a adapted to receive the SPEED-RATIO pressure Pe through the line 86, a drain port 516b, a port 516c adapted to receive the pilot pressure Pso13, a chamber 517, a port 516d communicating with the chamber 130 of the valve 102, and a port 516e communicating with the chamber 512 of the valve 102. The control valve 514 includes a valve spool 518 for effecting connection and disconnection of the above-indicated ports, and a spring 520 for biasing the spool 518 in one axial direction.

In the sixth embodiment of FIG. 34, when the third solenoid-operated valve 330 is OFF while the fourth solenoid-operated valve 346 is ON or OFF, the pressure-increasing and pressure-reducing chambers 130 and 512 are both exposed to the atmosphere, as indicated at 1 and 2 in FIG. 41, since the spool 518 is moved by the biasing force of the spring 520. As a result, the second line pressure P(2 is raised with respect to the normal value, as indicated in solid lines in FIG. 42. When the third solenoid-operated valve 330 is ON, the pilot pressure Pso13 acts on the end face of the spool 518 remote from the spring 520. If the fourth solenoid-operated valve 346 is OFF as indicated at 3 in FIG. 41, the spool 518 is moved against the biasing force of the spring 520, whereby the SPEED-RATIO pressure Pe is applied to the pressure-increasing chamber 130 of the second pressure regulating valve 102, while the pressure-reducing chamber 512 is exposed to the atmosphere. Therefore, the second line pressure Pl2 is normally controlled as indicated in FIG. 36. When the third and fourth valves 330 and 346 are both ON as indicated at 4 in FIG. 41, the spool 518 is moved under the biasing action of the spring 520, whereby the chamber 130 is exposed to the atmosphere while the chamber 512 is supplied with the pilot pressure Pso13. As a result, the second line pressure Pl2 is lowered with respect to the normal value, as indicated in solid line in FIG. 43.

It will be understood that the second pressure regulating valve 102 used in the embodiments of FIGS. 31-34 has the pressure-reducing chamber 136 or 512 for receiving the pressure-reducing pilot pressure (pressure Pe, Pout, Pl2 or Pso13) for biasing the spool 110 in the direction for reducing the second line pressure Pl2. The pressure-reducing pilot pressure is applied to the pressure-reducing chamber 136, 512 when the vehicle speed exceeds the reference value Cv5, which is an upper limit of the speed range Cv2–Cv5.

It will further be understood that the second pressure regulating valve 102 has the pressure-increasing chamber 130 or 502 for receiving the pressure-increasing pilot pressure (atmospheric pressure or LOCK-UP CLUTCH pressure Pc1) for biasing the spool 110 in the direction that causes the second line pressure Pl2 to be increased, and that the hydraulic circuit used in the embodiments of FIGS. 31–34 also includes the means for generating the pressure-increasing pilot pressure to be applied to the pressure-increasing chamber 130 or 502 when the vehicle running speed V falls below the reference value Cv2, which is the lower limit of the speed range Cv2–Cv5. When the lock-up clutch 36 is released with the vehicle speed V lowered below the reference value Cv2, the actuating pressure in the second cylinder 56 is increased because of the generation of the pressure-increasing pilot pressure. Accordingly, the speed ratio "e" of the CVT 14 may be smoothly reduced when an abrupt or rapid stop of the vehicle is desired.

In the embodiments of FIGS. 31–34, the means for generating the pressure-reducing and pressure-increasing pilot pressures are constituted by: control device 460 which selectively establishes the 2ND LINE PRESSURE REDUCTION mode E, LOCK-UP CLUTCH RELEASE mode A, LOCK-UP CLUTCH RAPID RELEASE mode B and ACCUMULATOR BACK PRESSURE CONTROL mode C; third and fourth solenoid-operated valves 330, 346 operated according to the selected hydraulic control mode; and second line pressure reducing control valve 380 and second line pressure increasing control valve 490 (or second line pressure increasing/reducing control valve 514 used for the embodiment of FIG. 34).

Figure 44:
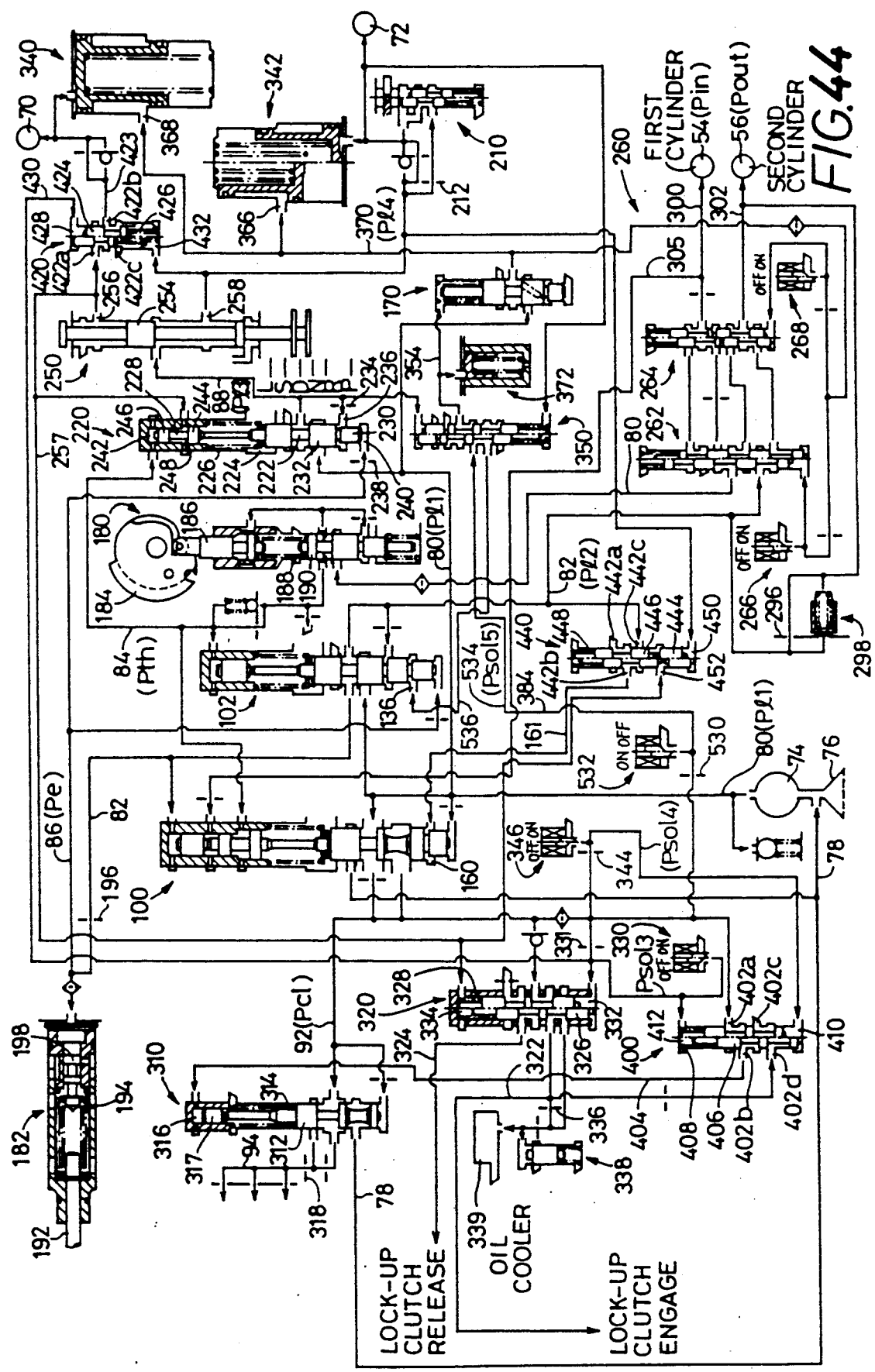
FIG. 44 is a view corresponding to that of FIG. 1, showing a still further embodiment of the present invention.

Referring to FIG. 44, a seventh embodiment of the invention will be described. In this embodiment, the second line pressure Pl2 is regulated, irrespective of the operating state of the third solenoid-operated valve 330, i.e., irrespective of the operating state of the lock-up clutch 36.

The hydraulic control circuit shown in FIG. 44 is a modification of that of FIG. 1. In the FIG. 1 embodiment, the pilot pressure Pso14 generated by the fourth solenoid-operated valve 346 is applied to the chamber 410 of the lock-up clutch rapid release valve 400 via the second line pressure reducing control valve 380 and pilot pressure switch valve 350. In this modified embodiment of FIG. 44, the pilot pressure Pso14 is directly applied to the chamber 410. Further, a flow restrictor 530 and a fifth solenoid-operated valve 532 are provided for generating a pilot pressure Pso15 from the LOCK-UP CLUTCH pressure Pc1. This pilot pressure Pso15 is applied to the pressure-reducing chamber 136 of the second pressure regulating valve 102, through the pilot pressure switch valve 350 and a line 536. In the present arrangement, the third solenoid-operated valve 330 is utilized primarily for engaging the lock-up clutch 36, while the fourth solenoid-operated valve 346 is utilized primarily for releasing the clutch 36.

Figure 24:
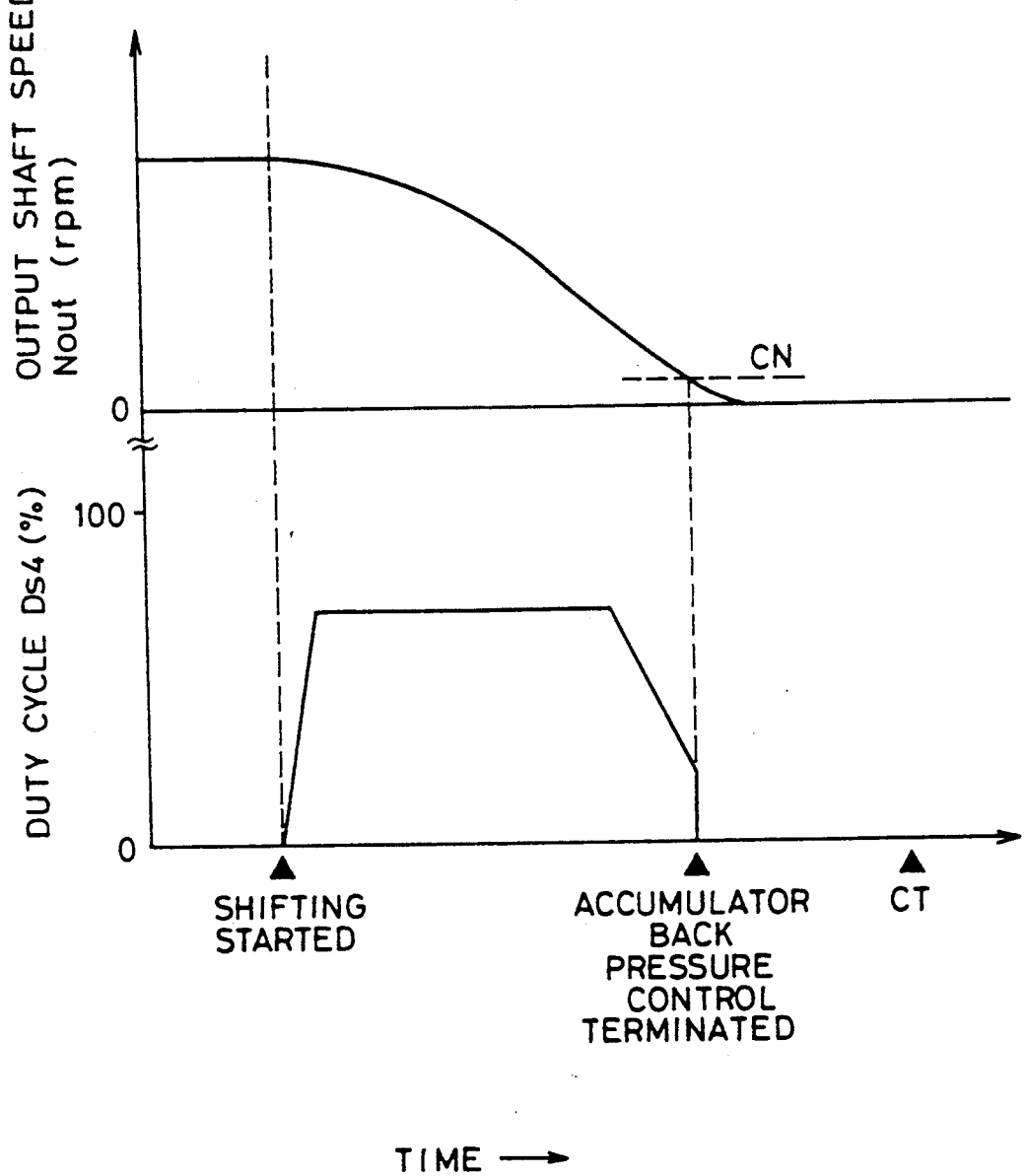
FIG. 24 is a time chart showing changes in the CVT output shaft speed and the duty cycle of the fourth solenoid valve, when the CVT is shifted to DRIVE position D.

In the present embodiment, when the 2ND LINE PRESSURE REDUCTION mode E of FIG. 22 is not selected, that is, when the vehicle running speed V is lower than the reference value Cv5, the fifth solenoid-operated valve 532 is placed in the open position, whereby the pilot pressure Pso15 is not generated. When the mode E is selected, that is, when the vehicle speed V exceeds the reference value Cv5, the fifth solenoid-operated valve 532 is energized or closed to produce the pilot pressure Pso15. In this condition, the pilot pressure Pso15 is applied to the pressure-reducing chamber 136 of the pressure regulating valve 102, through the pilot pressure switch valve 350 which connects a line 534 communicating with the valve 532 and a line 536 communicating with the chamber 136. As a result, the second line pressure Pl2 is lowered by a suitable amount, reducing the operating noise and heat of the transmission belt 44. If the ACCUMULATOR BACK PRESSURE CONTROL mode C indicated in FIG. 22 is selected, the fifth solenoid-operated valve 532 is operated in a controlled duty cycle as illustrated in FIG. 24 by way of example, so that the FORWARD clutch 72 or REVERSE brake 70 is smoothly engaged.

In the embodiment of FIG. 44, the fifth solenoid-operated valve 532 is used exclusively for controlling the back pressure of the accumulator 342 and reducing the second line pressure Pl2. Hence, the reduction of the second line pressure Pl2 for compensating the centrifugal pressure rise in the driven side cylinder may be effected independently of the operating state of the lock-up clutch 36. This provides an advantage that the second line pressure Pl2 can be lowered to compensate for the centrifugal pressure rise, even while the lock-up clutch 36 is in the released state.

Figure 45:
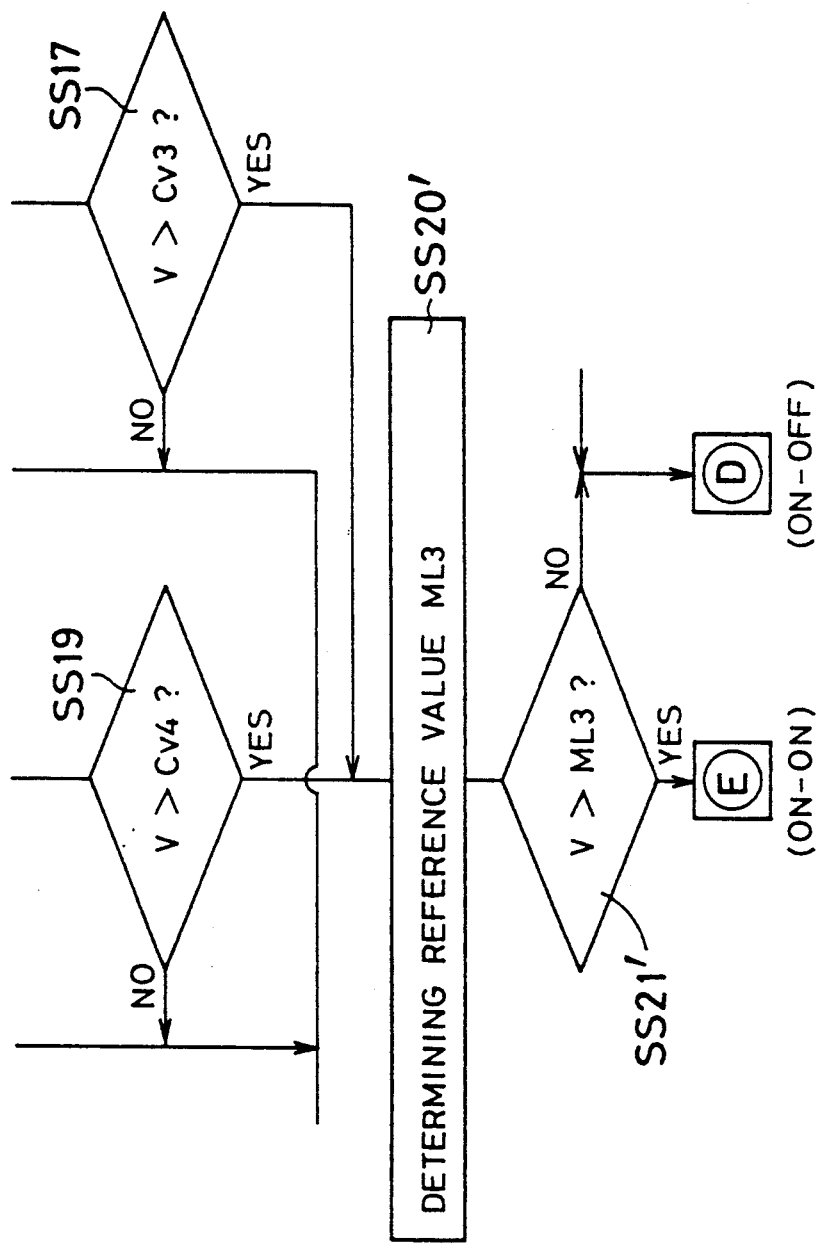
FIG. 45 is a fragmentary flow chart showing a control program used in a yet further embodiment of the invention.
Figure 47:
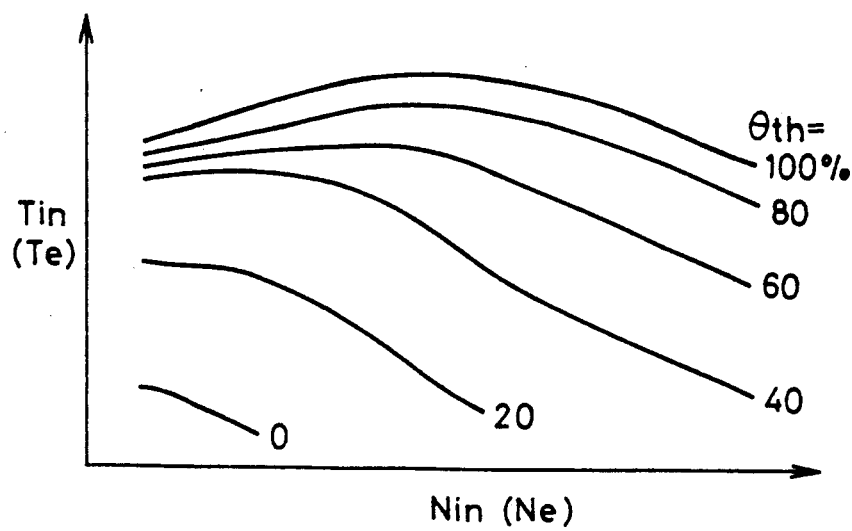
FIG. 47 is a view indicating an output characteristic of the engine in the embodiment of FIG. 45.

Referring to FIG. 45, there is illustrated a further modified embodiment of the invention, in which steps SS20' and SS21' are substituted for step S20 of FIG. 22. Step SS20' is provided to determine a reference value ML3 (km/h) based on the throttle opening angle $\theta$th and the input shaft speed Nin, according to a predetermined relationship stored in the ROM of the control device 460. An example of a data map representative of the relationship is indicated in FIG. 46. When the detected values of the throttle opening angle $\theta$th and input shaft speed Nin are intermediate between the two adjacent values indicated in FIG. 46, the corresponding reference value ML3 is determined by interpolation. Step SS21' is executed to determine whether the vehicle running speed V is higher than the determined reference value ML3, or not. If the speed V is higher than the reference value ML3, the 2ND LINE PRESSURE REDUCTION mode E is selected. Namely, the third and fourth solenoid-operated valves 330, 346 are both turned ON, to reduce the second line pressure Pl2. If the speed V is equal to or lower than the value ML3, the REVERSE INHIBIT mode D is established. In this case, the second line pressure Pl2 is regulated in the normal manner.

The hydraulic control apparatus in the present eighth embodiment includes: the second pressure regulating valve 102 which has the spool 110 for regulating the second line pressure Pl2 to be applied to the driven side cylinder, and the pressure-reducing chamber 136 for receiving the pressure-reducing pilot pressure (Pso14) for biasing the spool 110 to reduce the second line pressure; judging means (corresponding to steps SS20' and SS21') for determining the reference value ML3 based on the throttle opening angle $\theta$th and input shaft speed Nin, according to the relationship as indicated in FIG. 46, and determining, when the vehicle speed V exceeds the reference value ML3, that the running condition of the vehicle satisfies a predetermined condition in which the second line pressure Pl2 should be lowered; and pilot pressure generating means (fourth solenoid-area valve 346) for generating the pressure-reducing pilot pressure (Pso14) to the pressure-reducing chamber 136 of the valve 102 when the vehicle speed V exceeds the reference value ML3.

In the present embodiment, when the vehicle speed V exceeds the reference value ML3, the second line pressure Pl2 to be applied to the driven side cylinder or actuator is lowered as indicated in FIG. 18 by the second pressure regulating valve 102, with the pressure-reducing pilot pressure applied to the pressure-reducing chamber 136. Thus, the excessive tension of the belt 44 may be avoided even when the vehicle speed V is high. It will be understood that the control device 460 which executes steps SS20' and SS21' serves as the judging means for determining the reference value ML3 and selecting the 2ND LINE PRESSURE REDUCTION mode E when the speed V exceeds the determined value ML3. Further, the pilot pressure generating means is constituted by the valves 330 and 346 and the second line pressure reducing control valve 380.

As described above, the present embodiment is adapted such that the reference value ML3 is determined in step SS20' according to the predetermined relationship among the value ML3, throttle opening angle $\theta$th (currently required output of the engine 10) and input shaft speed Nin. In other words, the second line pressure Pl2 is lowered where the vehicle running condition represented by not only the speed V, but also the throttle opening angle $\theta$th and input shaft speed Nin satisfies the specific condition in which the pressure P(2 should be lowered. This arrangement permits better regulation of the pressure in the driven side cylinder (and the tension of the belt 44), than the arrangement in which the pressure Pl2 is lowered when the vehicle speed V exceeds a predetermined constant reference value, as in the embodiment of FIG. 22. Described more particularly, an input torque Tin of the CVT 14 (actual output torque Te of the engine 10) changes with the engine speed Ne, as well as with the throttle opening angle $\theta$th. Accordingly, the actuating pressure in the driven side cylinder of the CVT 14 cannot be adjusted to an optimum level, generally higher than required, for each specific value of the torque transmitted through the CVT 14, if the second line pressure Pl2 is determined by the throttle opening angle $\theta$th and speed ratio "e", and if the reference value of the vehicle speed used to effect the reduction in the actuating pressure is a fixed constant value. According to the present embodiment, however, the pressure Pl2 applied to the driven side cylinder can be suitably adjusted, since the reference value ML3 is determined by the throttle opening angle $\theta$th and the engine speed Ne (reflected by the input shaft speed Nin).

An optimum pressure Pi in the driven side cylinder, which enables the belt 44 of the CVT 14 to transmit power without slipping, is represented by the following equation:

$$Pi = \frac{C1 \cdot |Tin| \cdot (e+1)/e}{1 - C2 \cdot \{(e-1)/(e+1)\}^2} - C3 \cdot (e \cdot Nin)^2 \quad (10)$$

where, C1, C2, C3: constants

The first term of the right member of the equation (10) represents the pressure value determined by the input torque Tin and speed ratio "e" so as to transmit the input torque Tin without slipping of the belt 44. The second term of the right member represents a compensation value for compensating for an increase in the belt tension which arises from a centrifugal pressure rise in the second cylinder 56 which rotates with the output shaft 38. When the lock-up clutch 36 is engaged, the input torque Tin of the CVT 14 and the output torque Te of the engine 10 are equal to each other, and the speed Nin of the input shaft 30 and the speed Ne of the engine 10 are equal to each other. In this condition, therefore, the input torque Tin of the CVT 14 (output torque Te of the engine 10) is obtained from the following equation (11), or determined based on the input shaft speed Nin (engine speed Ne) and throttle opening angle $\theta$th, according to a function as represented by the curves shown in FIG. 47.

$$Tin = Te = f(\theta th, Ne) = f(\theta th, Nin) \quad (11)$$

Figure 48:
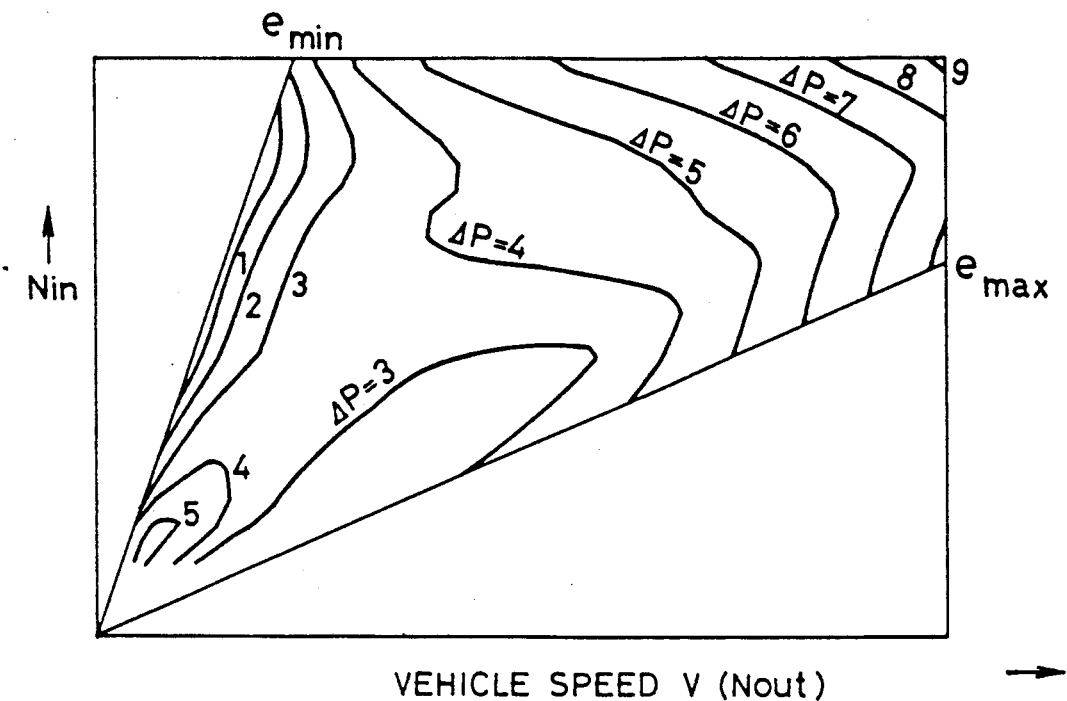
FIG. 48 is a graph showing an extra value $\Delta P$ for the second line pressure at a given throttle opening angle.

As described above, the optimum pressure Pi is determined according to the function f ($\theta$th, e, Nin) or f($\theta$th, Nin, Nout), while the second line pressure Pl2 is controlled based on the throttle opening angle $\theta$th and speed ratio "e". At a given value of the throttle opening angle $\theta$th, a difference between the actual second line pressure Pl2 and the optimum pressure Pi is obtained as an extra value $\Delta$P, as indicated in FIG. 48. The figure shows a general tendency that the extra value $\Delta$P increases with the vehicle speed V, since the centrifugal pressure rise in the driven side cylinder increases with the vehicle speed V.

Figure 49:
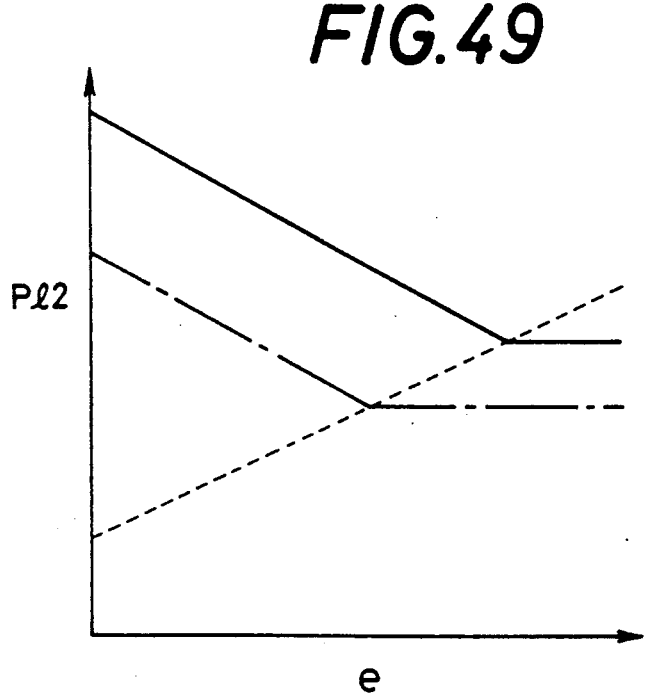
FIG. 49 is a graph showing reduction of the second line pressure in the embodiment of FIG. 45.
Figure 50:
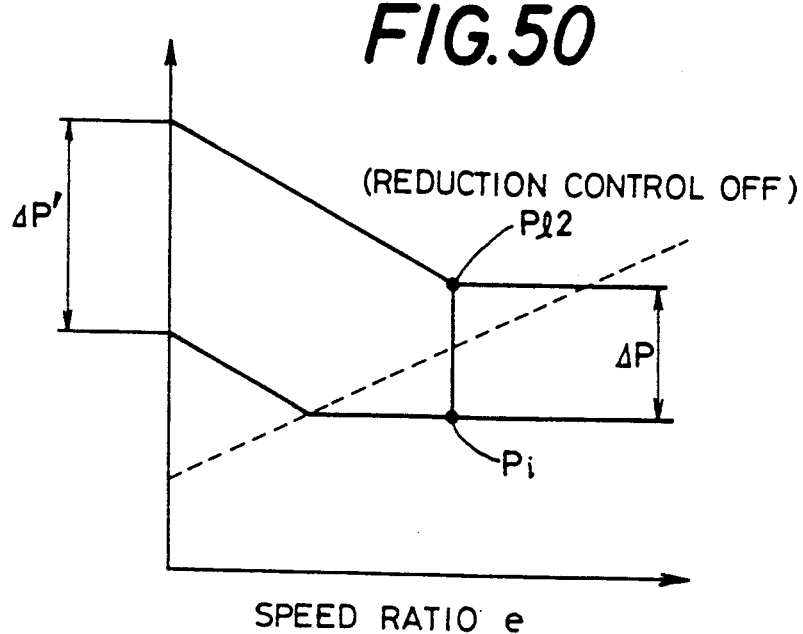
FIG. 50 is a graph explaining a relationship between the extra value $\Delta P$ and an actual reduction value $\Delta P'$ by which the second line pressure is lowered.

The centrifugal pressure rise is not always compensated for by merely reducing the second line pressure Pl2 by an amount equal to the extra value $\Delta$P. Described in more detail, FIG. 49 indicates in solid line the normal or non-adjusted level of the second line pressure Pl2, and in one-dot chain line the level to which the pressure Pl2 is reduced based on the extra value $\Delta$P. Since the throttle sensing valve 182 utilizes the second line pressure Pl2 to produce the THROTTLE pressure Pe representative of the speed ratio "e", the SPEED-RATIO pressure Pe is equal to the second line pressure Pl2, for the area of the graph of FIG. 49 below an inclined dashed line. Accordingly, to compensate the pressure Pl2 for the extra value $\Delta$P, the pressure Pl2 should be actually reduced by an amount of $\Delta$P', as indicated in FIG. 50. The actual reduction amount $\Delta$P' is obtained in the following manner:

If the normal or non-adjusted second line pressure Pl2 not regulated in the 2ND LINE PRESSURE REDUCTION mode E and the optimum pressure Pi are both within an area of the graph of FIG. 49 below the dashed line, two straight inclined lines having the same angle of inclination as the Pl2−e curve of FIG. 49 are drawn so as to extend from respective two points of intersection between the dashed line and respective two parallel horizontal straight lines which pass the points representing the non-adjusted pressure Pl2 and the optimum pressure Pi. A distance between the two straight inclined lines in an area above the dashed line of FIG. 49 represents the actually required amount of reduction $\Delta$P' at a given value of the speed ratio "e". In the case where the non-adjusted pressure Pl2 at a given value of the speed ratio "e" is in the area above the dashed line while the corresponding optimum pressure Pi is in the area below the dashed line, as indicated in FIG. 50, a point of intersection between the dashed line and the horizontal line passing the point Pi is obtained, and a straight inclined line as indicated above is drawn so as to extend from the obtained point of intersection. Further, a straight inclined line parallel to the above inclined line is drawn so as to extend from the point of the non-adjusted pressure Pl2. A distance between the two straight inclined lines in the area above the dashed line (as indicated in FIG. 50) represents the actually required reduction amount $\Delta P'$ at a give value of the speed ratio "e". In the case where the non-adjusted pressure Pl2 and the optimum value Pi are both in the area above the dashed line of FIG. 49, the actually required reduction amount $\Delta P'$ is equal to the extra value $\Delta P$ difference between the non-adjusted pressure Pl2 and the optimum value Pi).

Figure 51:
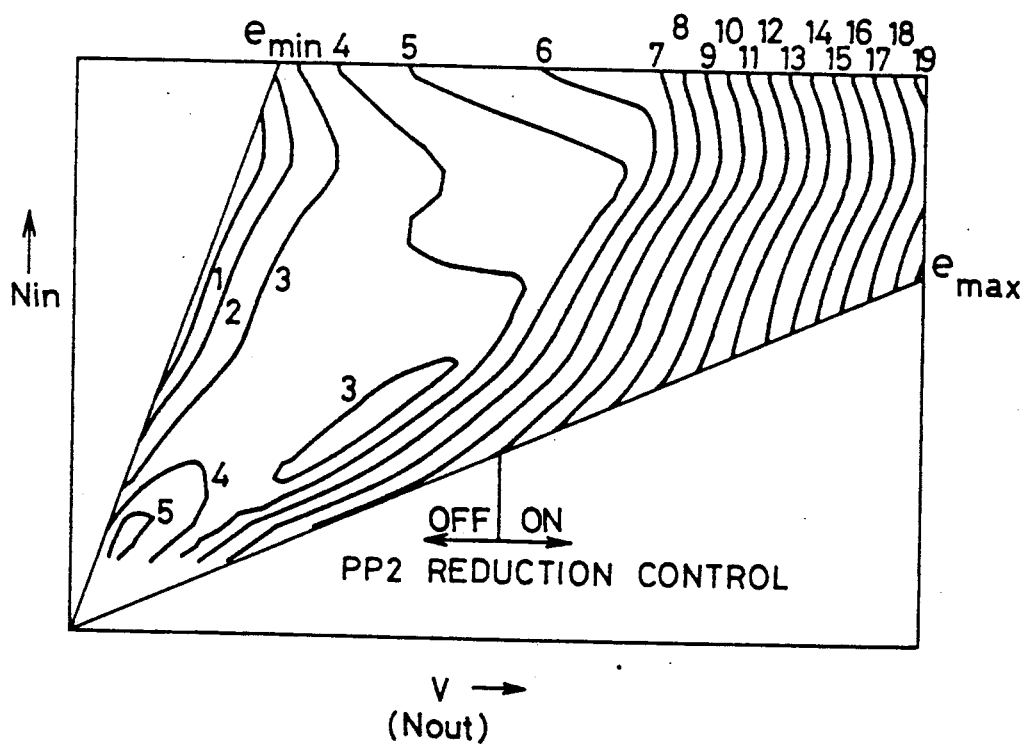
FIG. 51 is a view corresponding to that of FIG. 48, showing the reduction value $\Delta P'$.
Figure 52:
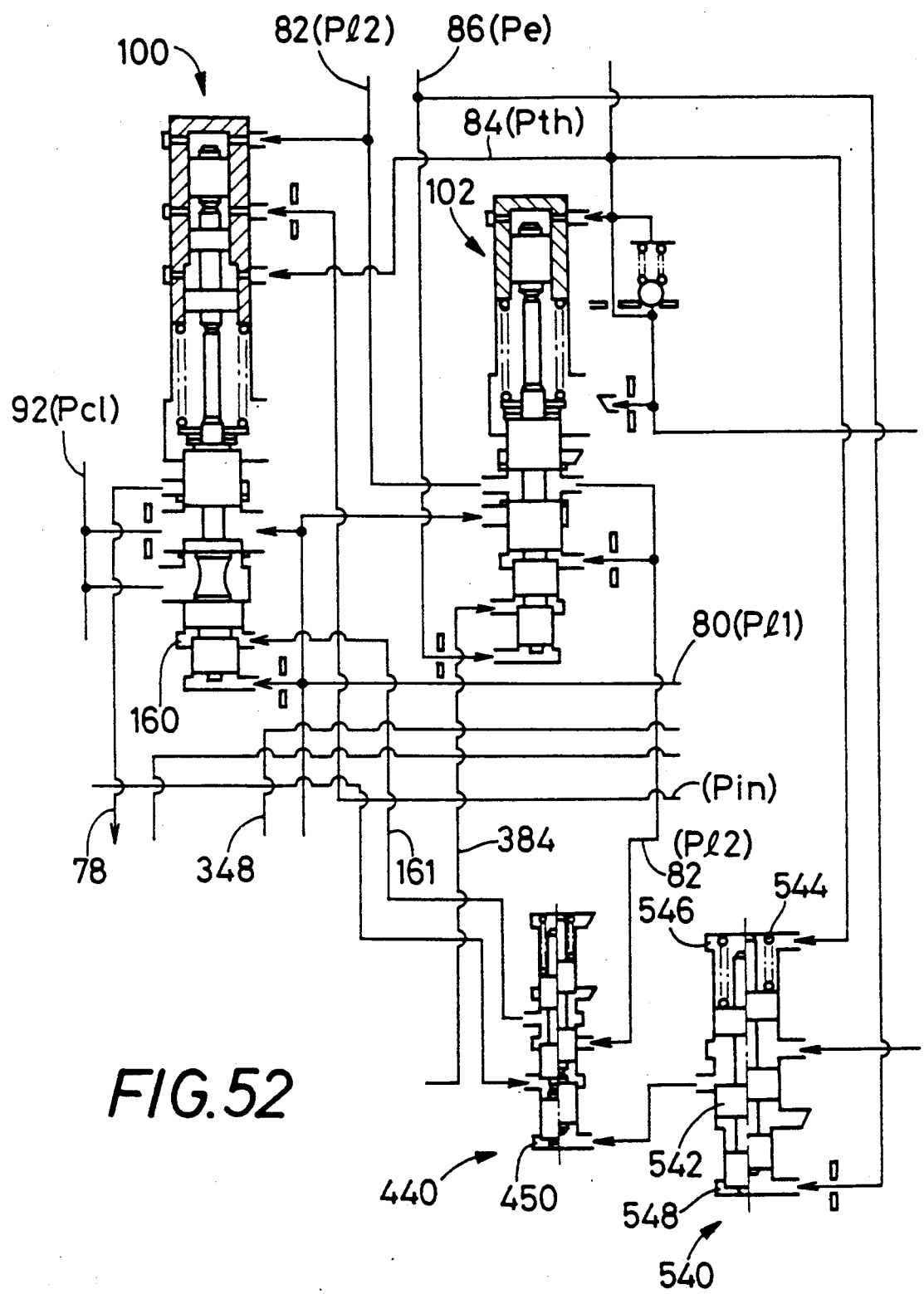
FIG. 52 is a fragmentary view of a hydraulic circuit used in another embodiment of the invention.

FIG. 51 shows the curves of the actually required amount of reduction $\Delta P'$ obtained as indicated above corresponding to the extra value $\Delta P$ of FIG. 49. If the reduction amount $\Delta P'$ is 8 kgf/cm$^3$, the 2ND LINE PRESSURE REDUCTION mode E is established when the vehicle running condition satisfies the condition corresponding to the right-hand side area of the iso-$\Delta P'$ curve of $\Delta P' = 8$ kgf/cm$^3$. The data map of FIG. 46 for determining the reference value ML3 based on the throttle opening angle $\theta$th and input shaft speed Nin is prepared from the iso-$\Delta P'$ curves of FIG. 51.

While the throttle opening angle $\theta$th and input shaft speed Nin are used to determine the reference value ML3 in step S20' of FIG. 45, the throttle opening angle $\theta$th may be replaced by other parameters indicative of a currently required output of the engine 10, such as an amount of air intake into the engine 10, an amount of a fuel supplied to the engine 10 and an amount of operation of an accelerator pedal. Since the speed ratio "e" of the CVT 14 is a ratio Nout/Nin (speed of the input shaft 30/speed of the output shaft 38), and the vehicle speed V is represented by the speed Nout of the output shaft 38, the determination as to whether the second line pressure Pl2 should be reduced or not may be made based on the throttle opening angle $\theta$th, speed ratio "e" and input or output shaft speed Nin or Nout, or on the throttle opening angle $\theta$th and the input and output shaft speeds Nin and Nout.

It is noted that the principle of the eighth embodiment of FIG. 45 is applicable to the embodiments of FIGS. 31-34.

In the preceding embodiments, the first line pressure Pl1 is lowered by a suitable amount when the shift lever 252 is placed in the NEUTRAL or PARKING position "N" or "P". However, the hydraulic arrangement may be modified so that the first line pressure Pl1 is lowered even when the shift lever 252 is placed in one of the forward drive positions, if the vehicle is running in a cruising mode at a relatively small opening angle $\theta$th of the throttle valve and with the CVT 14 operating at a relatively low speed ratio "e". An example of this modification is illustrated in FIG. 51, which shows a cutback valve 540 disposed in a line between the output port 258 of the shift lever valve 250 and the chamber 450 of the first line pressure reducing control valve 440.

The cut-back valve 540 has a spool 542 for selective connection and disconnection of the output port 258 of the shift lever valve 250 to and from the chamber 450 of the first line pressure reducing control valve 440. The spool 542 is biased to its open position by a spring 544, a chamber 546 formed adjacent to one end of the spool 542 on the side of the spring 544, and a chamber 548 formed adjacent to the other end of the spool 542. The chamber 546 is adapted to receive the THROTTLE PRESSURE Pth, while the chamber 548 is adapted to receive the SPEED-RATIO pressure Pe. The spool 542 is moved to a position of equilibrium between a valve closing force based on the SPEED-RATIO pressure Pe, and a valve opening force which is a sum of the biasing force of the spring 544 and a force based on the THROTTLE pressure Pth. Thus, when the shift lever valve 250 is placed in one of the forward drive positions, the cut-back valve 540 prevents the third line pressure Pl3 from being applied from the output port 258 of the shift lever valve 250 to the chamber 450 of the first line pressure reducing control valve 440, if the following formula (12) is satisfied:

$$Pe \geq Pth \cdot A_{1c}/A_{0c} + W_{1c}/A_{0c} \qquad (12)$$

where,
$A_{0c}$: area of spool 542 receiving pressure Pe
$A_{1c}$: area of spool 542 receiving pressure Pth
$W_{1c}$: biasing force of spring 544

Figure 53:
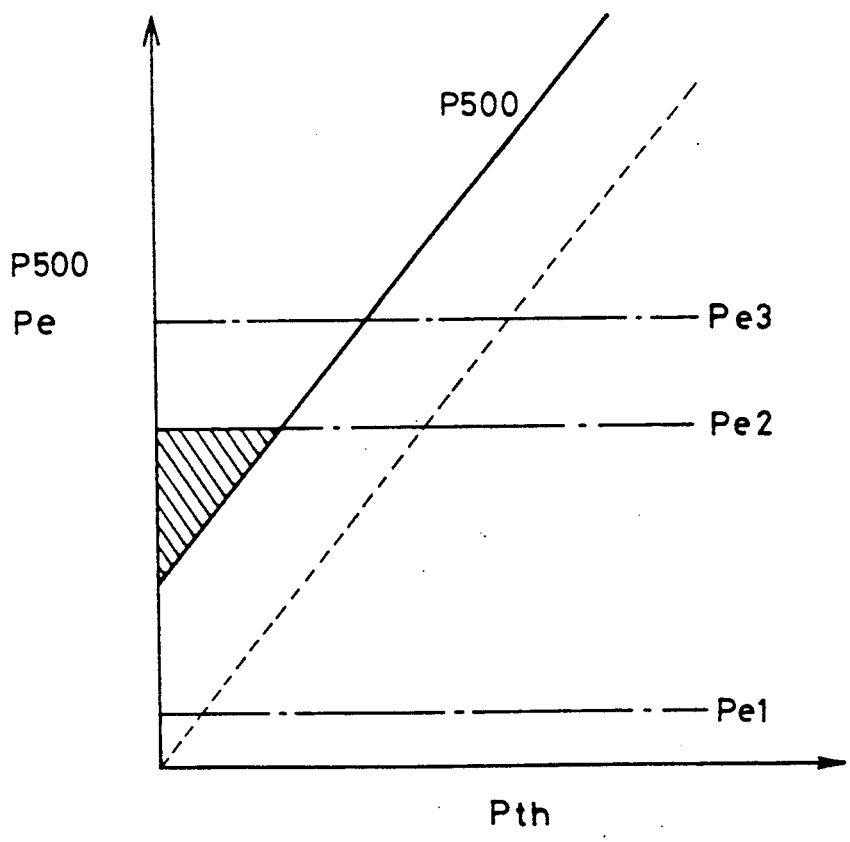
FIG. 53 is a view explaining an operation of a cutback valve used in the embodiment of FIG. 52.

The THROTTLE pressure Pth decreases with a decrease in the throttle opening angle $\theta$th, as indicated in FIG. 5, while the SPEED-RATIO pressure Pe increases with an increase in the speed ratio "e", as indicated in FIG. 6. The biasing force $W_{1c}$ of the spring 544 and pressure-receiving areas $A_{0c}$ and $A_{1c}$ of the spool 542 are determined so that the third line pressure Pl3 is prevented from being applied to the chamber 450 of the first line pressure reducing control valve 440 when the speed ratio "e" is relatively high while the THROTTLE pressure Pth is relatively low, as indicated in FIG. 53. In the figure, dashed line represents the first term of the right member of the formula (12), and line P500 parallel to the dashed line represents a sum of the terms of the right member of the formula. Suppose the SPEED-RATIO pressure Pe corresponding to the detected speed ratio "e" is Pe2, for example, the first line pressure Pl1 is lowered when the condition indicated by hatched area is satisfied. This arrangement maintains the first line pressure Pl1 at a relatively low level, reducing required drive power for the oil pump 74 and improving the fuel economy of the vehicle, while the vehicle is cruising with the throttle valve opened at a relatively small angle and with the CVT 14 operating at a relatively high speed ratio.

While the several presently preferred embodiments of the invention have been described, various changes, modifications and improvements may be made in the invention.

For example, the speed ratio "e" of the CVT 14 may be controlled otherwise. In the illustrated embodiments described above, the speed ratio "e" is changed by the shift control valve assembly 260 such that the pressurized fluid is fed into one of the first and second cylinders 54, 56 while the fluid is discharged from the other cylinder. However, the speed ratio "e" may be controlled such that the line pressure for controlling the tension of the belt 44 is always applied to the second cylinder 56, while the pressurized fluid is fed or discharged into or from the first cylinder 54 under the control of a shift control valve.

In the embodiment of FIG. 31, a first line pressure reducing control valve may be provided so that the spool 140 is biased toward its open position by the second line pressure Pl2 which is applied to the chamber 160 of the first pressure regulating valve 100, in relation to the output pressure of the shift lever valve 250, in order to lower the first line pressure Pl1 by a suitable amount and thereby reduce noises of the belt 44 while the shift lever valve 252 is placed in the NEUTRAL or PARKING position "N" or "P".

While the shift control valve assembly 260 used in the illustrated embodiments consists of the directional control valve 262 and the flow control valve 264, the assembly 260 may be replaced by a four-way flow control valve using a linear solenoid capable of continuously changing the flow rate.

In the illustrated embodiments, the THROTTLE pressure Pth produced by the throttle sensing valve 180 which detects the throttle opening angle θth is used as a pressure representative of the currently required output of the engine 10. Where the hydraulic control apparatus of the invention is used for a vehicle having a diesel engine without a throttle valve, the pressure Pth may be replaced by a pressure which represents an amount corresponding to an amount of operation of an accelerator pedal of the vehicle. In this case, the cam 184 is mechanically linked with the accelerator pedal, so that the cam 184 is rotated as the pedal is depressed.

While the illustrated embodiments are adapted such that the speed ratio "e" of the CVT 14 is controlled so that the actually detected speed Nin of the input shaft 30 coincides with a determined desired or target speed Nin*, it is possible to control the speed ratio "e" so that the actually detected speed ratio "e" coincides with a determined desired ratio "e*", since the speed ratio "e" is equal to Nout/Nin.

The reversing device 16 which is located between the output shaft 38 of the CVT 14 and the intermediate gear device 18 in the illustrated embodiments, may be disposed between the fluid coupling 12 and the input shaft 30 of the CVT 14. The reversing device 16 may have two or more forward drive positions in addition to the reverse position.

The fluid coupling 12 may be replaced by other couplings such as an electromagnetic clutch and a wet-type clutch.

What is claimed is:

1. A hydraulic control apparatus for a power transmitting system for an automotive vehicle having a continuously variable transmission which has a first and a second shaft, a pair of variable-diameter pulleys provided on the first and second shafts, a belt connecting the pulleys, and a pair of hydraulic actuators for changing diameters of the pair of pulleys, wherein a tension of the belt is controlled by directly or indirectly regulating an actuating pressure in a driven side actuator of said pair of hydraulic actuators which is provided on a driven one of said first and second shafts, and wherein the improvement comprises:

detecting means for detecting a running speed of the vehicle; and a pressure regulating valve including a valve spool for regulating the actuating pressure in said driven side actuator, and having a pressure-reducing chamber for receiving a pressure-reducing pilot pressure which varies with the vehicle running speed for biasing said spool in one direction for reducing said actuating pressure; and pilot pressure generating means for generating said pressure-reducing pilot pressure to be applied to said pressure-reducing chamber, when said running speed of the vehicle exceeds a predetermined value.

2. A hydraulic control apparatus according to claim 1, wherein said pressure regulating valve further has a pressure-increasing chamber for receiving a pressure-increasing pilot pressure for biasing said spool in a direction opposite to said one direction, for increasing said actuating pressure, and wherein said pilot pressure generating means generates said pressure-reducing pilot pressure and applies the pressure-reducing pilot pressure to said pressure-reducing chamber when said running speed of the vehicle exceeds an upper limit of a predetermined range, and generates said pressure-increasing pilot pressure and applying the pressure-increasing pilot pressure to said pressure-increasing chamber when said running speed of the vehicle falls below a lower limit of said predetermined range.

3. A hydraulic control apparatus according to claim 1, further comprising:

detecting means for detecting a currently required output of an engine of the vehicle;

detecting means for detecting a speed of said engine;

judging means for determining, based on the detected currently required output and speed of said engine and the detected running speed of the vehicle, whether or not a running condition of the vehicle satisfies a predetermined condition in which said actuating pressure in said driven side actuator should be lowered, and wherein said pilot pressure generating means generating said pressure-reducing pilot pressure and applying the pressure-reducing pilot pressure to said pressure-reducing chamber, when said judging means determines that said running condition of the vehicle satisfied said predetermined condition.

4. A hydraulic control apparatus according to claim 1, further comprising:

means for generating a first line pressure, and a second line pressure as said actuating pressure lower than said first line pressure, said first and second line pressures being applied to a drive side actuator and said driven side actuator of said pair of hydraulic actuators, respectively, so as to change a speed ratio of said continuously variable transmission;

a speed-ratio sensing valve for regulating said second line pressure into a speed-ratio pressure which varies with said speed ratio of the continuously variable transmission; and said pressure regulating valve being responsive to said speed-ratio pressure, for reducing said actuating pressure in said driven side actuator.

5. A hydraulic control apparatus according to claim 1, further comprising:

a first pressure regulating valve for regulating a first line pressure applied to a drive side actuator of said pair of hydraulic actuators which is provided on the other of said first and second shafts; and a second pressure regulating valve as said pressure regulating valve for regulating said actuating pressure in said driven side actuator, for regulating a second line pressure applied to said driven side actuator, said first and second line pressures being regulated so as to change a speed ratio of said continuously variable transmission, said first pressure regulating valve including a valve spool for regulating a pressure of a pressurized fluid delivered from a hydraulic source through a first pressure line, into said first line pressure, and a plunger receiving said second line pressure and a pressure in one of said pair of hydraulic actuators which is located nearer to an engine of the vehicle, said plunger biasing said valve spool by a force corresponding to a higher one of said actuating pressure and said second line pressure.

6. A hydraulic control apparatus according to claim 5, wherein said first pressure regulating valve has a pressure-reducing chamber for receiving a pilot pressure for reducing said first line pressure, said apparatus further comprising:
a shift lever valve which generates a pressure relating to an operation of a shift lever to a forward drive position;
a first line pressure reducing control valve responsive to said pressure relating to the operation of said shift lever, for preventing said pilot pressure for reducing said first line pressure from being applied to said pressure-reducing chamber of said first pressure regulating valve; and
a cut-back valve disposed between said first line pressure reducing control valve and said shift lever valve, for preventing said pressure relating to the operation of said shift lever from being applied to said first line pressure reducing control valve.

7. A hydraulic control apparatus for a power transmitting system for an automotive vehicle having a continuously variable transmission which has a first and a second shaft, a pair of variable-diameter pulleys provided on the first and second shafts, a belt connecting the pulleys, and a pair of hydraulic actuators for changing diameters of the pair of pulleys, wherein a first line pressure and a second line pressure lower than said first line pressure are applied to one and the other of said pair of hydraulic actuators, so as to change a speed ratio of said continuously variable transmission, and wherein the improvement comprises:
a speed-ratio sensing valve for regulating said second line pressure into a speed-ratio pressure which varies with said speed ratio of the continuously variable transmission; and
a pressure regulating valve responsive to said speed-ratio pressure, for reducing said second line pressure in relation to said speed ratio.

8. A hydraulic control apparatus for a power transmitting system connected to an engine of an automotive vehicle having a continuously variable transmission which has a first and a second shaft, a pair of variable-diameter pulleys provided on the first and second shafts, a belt connecting the pulleys, and a pair of hydraulic actuators for changing diameters of the pair of pulleys, wherein a first line pressure and a second line pressure lower than said first line pressure are applied to one and the other of said pair of hydraulic actuators, so as to change a speed ratio of said continuously variable transmission, and wherein the improvement comprises:
a pressure regulating valve for generating said first line pressure, said pressure regulating valve including a valve spool for regulating a pressure of a pressurized fluid delivered from a hydraulic source through a first pressure line, into, said first line pressure, and a plunger simultaneously receiving both said second line pressure and a pressure in one of said pair of hydraulic actuators which is located nearer to said engine, said plunger biasing said valve spool by a force corresponding to a higher one of said actuating pressure and said second line pressure.

9. The hydraulic control apparatus of claim 8 wherein said pressure regulating valve includes a chamber located between said valve spool and said plunger, said chamber including a port receiving said pressure in one of said hydraulic regulators, and wherein said pressure regulating valve also includes another chamber located at a side of said plunger opposite said valve spool, said another chamber including a port receiving said second line pressure.

* * * * *